(12) United States Patent
Takahara

(10) Patent No.: US 10,362,212 B2
(45) Date of Patent: *Jul. 23, 2019

(54) EXCHANGEABLE LENS HAVING A SETTABLE APERTURE AND CAMERA BODY THAT CAPTURES AN IMAGE BY AN OPTICAL SYSTEM WHICH HAS A SETTABLE APERTURE

(71) Applicant: NIKON CORPORATION, Tokyo (JP)

(72) Inventor: Hiroaki Takahara, Matsudo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,617

(22) Filed: Sep. 15, 2017

(65) Prior Publication Data
US 2018/0063408 A1 Mar. 1, 2018

Related U.S. Application Data

(63) Continuation of application No. 13/485,361, filed on May 31, 2012, now Pat. No. 9,769,370.
(Continued)

(30) Foreign Application Priority Data

May 31, 2011 (JP) .................................. 2011-121337
Jun. 30, 2011 (JP) .................................. 2011-146205
(Continued)

(51) Int. Cl.
*G02B 7/34* (2006.01)
*G03B 13/34* (2006.01)
(Continued)

(52) U.S. Cl.
CPC ........... *H04N 5/23209* (2013.01); *G02B 7/34* (2013.01); *G03B 13/34* (2013.01); *G03B 17/14* (2013.01);
(Continued)

(58) Field of Classification Search
CPC .. H04N 5/23209; H04N 5/23212; G02B 7/34; G03B 17/14; G03B 13/34; G03B 2206/00
See application file for complete search history.

(56) References Cited

U.S. PATENT DOCUMENTS 5,386,262 A 1/1995 Ishibashi et al.
7,796,350 B2 9/2010 Yumiki et al.
(Continued)

FOREIGN PATENT DOCUMENTS

CN 101038363 A 9/2007
CN 101075073 A 11/2007
(Continued)

OTHER PUBLICATIONS

Translation of Jul. 23, 2014 Office Action issued in Chinese Application No. 201210177599.7.
(Continued)

*Primary Examiner* — Gevell V Selby
(74) *Attorney, Agent, or Firm* — Oliff PLC

(57) ABSTRACT

A lens barrel including: an optical system which includes a focus adjustment optical system; an aperture which limits the light beam which pass through the optical system to predetermined range at the time of detection of the focus state of the optical system; a drive which drives the focus adjustment optical system; a memory which stores a first predetermined value which is a aperture value within the predetermined range; and a transmitter which sends the first predetermined value to the camera body.

34 Claims, 23 Drawing Sheets

Related U.S. Application Data

(60) Provisional application No. 61/587,328, filed on Jan. 17, 2012, provisional application No. 61/587,366, filed on Jan. 17, 2012, provisional application No. 61/587,378, filed on Jan. 17, 2012, provisional application No. 61/586,430, filed on Jan. 13, 2012, provisional application No. 61/586,433, filed on Jan. 13, 2012, provisional application No. 61/586,456, filed on Jan. 13, 2012.

(30) Foreign Application Priority Data

| Jul. 8, 2011 | (JP) | 2011-151501 |
|---|---|---|
| Sep. 2, 2011 | (JP) | 2011-191352 |
| Sep. 2, 2011 | (JP) | 2011-191359 |
| Sep. 7, 2011 | (JP) | 2011-195110 |

(51) Int. Cl.
*G03B 17/14* (2006.01)
*H04N 5/232* (2006.01)

(52) U.S. Cl.
CPC ..... *H04N 5/23212* (2013.01); *G03B 2206/00* (2013.01)

(56) References Cited

U.S. PATENT DOCUMENTS

| 9,769,370 | B2* | 9/2017 | Takahara | G02B 7/34 |
|---|---|---|---|---|
| 2007/0230937 | A1 | 10/2007 | Ide et al. | |
| 2007/0269197 | A1 | 11/2007 | Ide et al. | |
| 2008/0007644 | A1 | 1/2008 | Matsumoto | |
| 2009/0034955 | A1 | 2/2009 | Kunishige et al. | |
| 2009/0284612 | A1* | 11/2009 | Abe | G03B 7/085 |
| | | | | 348/221.1 |
| 2010/0110277 | A1 | 5/2010 | Shibuno et al. | |
| 2010/0238343 | A1* | 9/2010 | Kawarada | H04N 5/23212 |
| | | | | 348/345 |
| 2011/0001870 | A1 | 1/2011 | Yamamoto | |
| 2011/0135292 | A1 | 6/2011 | Iwane | |
| 2011/0164169 | A1 | 7/2011 | Yamasaki | |
| 2011/0293256 | A1 | 12/2011 | Ishiwata et al. | |

FOREIGN PATENT DOCUMENTS

| CN | 101360190 A | 2/2009 |
|---|---|---|
| CN | 101841656 A | 9/2010 |
| JP | H02-181109 A | 7/1990 |
| JP | H03-10580 A | 1/1991 |
| JP | H06-205288 A | 7/1994 |
| JP | H08-262529 A | 10/1996 |
| JP | H11-142724 A | 5/1999 |
| JP | 2002-072283 A | 3/2002 |
| JP | 2002-341424 A | 11/2002 |
| JP | 2004-109690 A | 4/2004 |
| JP | 2004-109691 A | 4/2004 |
| JP | 2005-10367 A | 1/2005 |
| JP | 2005-037963 A | 2/2005 |
| JP | 2005-084426 A | 3/2005 |
| JP | 2005-121819 A | 5/2005 |
| JP | 2005-283776 A | 10/2005 |
| JP | 2006-84995 A | 3/2006 |
| JP | 2007-322922 A | 12/2007 |
| JP | 2008-042404 A | 2/2008 |
| JP | 2008-052009 A | 3/2008 |
| JP | 2008-096796 A | 4/2008 |
| JP | 2008-134390 A | 6/2008 |
| JP | 2008-203428 A | 9/2008 |
| JP | 2008-242182 A | 10/2008 |
| JP | 2008-249966 A | 10/2008 |
| JP | 2009-058966 A | 3/2009 |
| JP | 2009-271523 A | 11/2009 |
| JP | 2009-288778 A | 12/2009 |
| JP | 2010-054730 A | 3/2010 |
| JP | 2010-74795 A | 4/2010 |
| JP | 2010-139942 A | 6/2010 |
| JP | 2010-217618 A | 9/2010 |
| JP | 2011-85871 A | 4/2011 |
| WO | 2010/050386 A1 | 5/2010 |

OTHER PUBLICATIONS

Jul. 20, 2017 Office Action issued in Indian Patent Application No. 1638/DEL/2012.
Translation of Nov. 12, 2013 Office Action issued in Japanese Patent Application No. 2011-195110.
Aug. 27, 2013 Office Action issued in Japanese Patent Application No. 2011-146205.
Aug. 27, 2013 Office Action issued in Japanese Patent Application No. 2011-151501.
Jul. 30, 2013 Office Action issued in Japanese Patent Application No. 2011-191352.
Jul. 16, 2013 Office Action issued in Japanese Patent Application No. 2011-191359.
Jul. 16, 2013 Office Action issued in Japanese Patent Application No. 2011-195110.
Apr. 9, 2013 Office Action issued in Japanese Patent Application No. 2011-146205.
Apr. 9, 2013 Office Action issued in Japanese Patent Application No. 2011-151501.
Apr. 9, 2013 Office Action issued in Japanese Patent Application No. 2011-121337.
Mar. 21, 2014 Office Action Issued in U.S. Appl. No. 13/485,361.
Jul. 24, 2014 Office Action Issued in U.S. Appl. No. 13/485,361.
Apr. 16, 2015 Office Action Issued in U.S. Appl. No. 13/485,361.
Nov. 5, 2015 Office Action Issued in U.S. Appl. No. 13/485,361.
Apr. 15, 2016 Office Action Issued in U.S. Appl. No. 13/485,361.
Nov. 10, 2016 Office Action Issued in U.S Appl. No. 13/485,361.
May 5, 2017 Notice of Allowance Issued in U.S. Appl. No. 13/485,361.
Aug. 15, 2017 Notice of Allowance Issued in U.S. Appl. No. 13/485,361.
May 22, 2018 Office Action issued in Chinese Patent Application No. 201610251874.3.
Jul. 10, 2018 Office Action issued in Chinese Patent Application No. 201610251491.6.
Feb. 11, 2019 Office Action issued in Chinese Patent Application No. 201610251874.3.
Feb. 22, 2019 Office Action issued in Chinese Patent Application No. 201610251491.6.

* cited by examiner

EXCHANGEABLE LENS HAVING A SETTABLE APERTURE AND CAMERA BODY THAT CAPTURES AN IMAGE BY AN OPTICAL SYSTEM WHICH HAS A SETTABLE APERTURE

CROSS REFERENCE TO RELATED APPLICATIONS

This is a Continuation of application Ser. No. 13/485,361 filed May 31, 2012, which claims the benefit of U.S. Provisional Application No. 61/587,378 filed Jan. 17, 2012; U.S. Provisional Application No. 61/587,366 filed Jan. 17, 2012; U.S. Provisional Application No. 61/587,328 filed Jan. 17, 2012; U.S. Provisional Application No. 61/586,456 filed Jan. 13, 2012; U.S. Provisional Application No. 61/586,433 filed Jan. 13, 2012; and U.S. Provisional Application No. 61/586,430 filed Jan. 13, 2012, which claims the benefit of Japanese Patent Application No. 2011-191352 filed Sep. 2, 2011; Japanese Patent Application No. 2011-195110 filed Sep. 7, 2011; Japanese Patent Application No. 2011-191359 filed Sep. 2, 2011; Japanese Patent Application No. 2011-151501 filed Jul. 8, 2011; Japanese Patent Application No. 2011-146205 filed Jun. 30, 2011; and Japanese Patent Application No. 2011-121337 filed May 31, 2011. The disclosure of the prior applications is hereby incorporated by reference herein in its entirety.

BACKGROUND OF THE INVENTION

1. Field of the Invention

The present invention relates to a lens barrel and camera body.

2. Description of the Related Art

In the past, there has been known an imaging apparatus which uses the output of focus detection pixels which are provided at the imaging pickup device as the basis to detect the shift amount of an image plane of an optical system and thereby detect a focus state of the optical system. As such an imaging apparatus, for example, one is known which prevents the occurrence of vignetting at the time of focus detection by performing focus detection while setting the aperture value of the optical system at a value smaller (more opening side) than a predetermined aperture value (for example, see Japanese Patent Publication (A) No. 2010-217618).

SUMMARY OF THE INVENTION

However, in the prior art, when changing the aperture value of the optical system from the aperture value at the time of focus detection to the capture aperture value to capture an image, sometimes the change of the aperture value led to movement of the image plane of the optical system and as a result it was not possible to capture an image focused on the object.

The problem to be solved by the present invention is to provide a lens barrel which can capture an image well.

The present invention solves the above problem by the following means. Note that, below, the explanation will be given while attaching reference numerals which correspond to parts in the drawings which show embodiments of the present invention, but the reference numerals are only for facilitating understanding of the invention and do not limit the invention.

A lens barrel according to a first aspect of the present invention comprising; an optical system which includes a focus adjustment optical system (32); an aperture (34) which limits the light beam which pass through the optical system to predetermined range at the time of detection of the focus state of the optical system; a drive (36) which drives the focus adjustment optical system; a memory (37) which stores a first predetermined value which is a aperture value within the predetermined range; and a transmitter (37) which sends the first predetermined value to the camera body.

In the lens barrel according to the present invention, the first predetermined value is a limit value of the opening side of the aperture value of the optical system at the time of detection of the focus state of the optical system.

In the lens barrel according to the present invention, the drive (36) uses a focus state of the optical system as the basis to drive the focus adjustment optical system (32) in an optical axis direction.

In the lens barrel according to the present invention, the memory (39) stores the first predetermined value as a number of closing steps from an open aperture value of the optical system.

A lens barrel according to a second aspect of the present invention comprising; an optical system which includes a focus adjustment optical system (32); an aperture (34) which limits the light beam; a drive (36) which drives the focus adjustment optical system; a memory (39) which stores a variable amount, defined as an amount by which the aperture value of the optical system can be changed from the capture aperture value when capturing an image at the time of detection of the focus state of the optical system, in accordance with the capture aperture value; and a transmitter (37) which sends the variable amount to the camera body.

In the lens barrel according to the present invention, the aperture (34) limits a light beam which pass through the optical system, the drive (36) uses a focus state of the optical system as the basis to drive the focus adjustment optical system in an optical axis direction.

In the lens barrel according to the present invention, the memory (39) stores as an opening side variable amount a variable amount of an opening side from the capture aperture value in the variable amounts and stores as a closing side variable amount a variable amount of a closing side from the capture aperture value in the variable amounts, and the opening side variable amount is smaller than the closing side variable amount.

In the lens barrel according to the present invention, the memory (39) stores the variable amount as a number of closing steps from the capture aperture value.

A lens adapter according to the present invention is a lens adapter which is interposed between a lens barrel (3) and a camera body (2) so as to connect the lens barrel and the camera body, comprising: a first communicator (51) which communicates with the lens barrel; a second communicator (51) which communicates with the camera body; a memory (52) which stores an opening side limit value, defined as a limit value of an opening side of the aperture value of the optical system, for each type of lens barrel; an identifier (51) which makes the first communicator acquire lens information from the lens barrel and which uses the lens information as the basis to identify the type of the lens barrel; and a transmitter (51) which sends an opening side limit value which corresponds to the identified lens barrel by the second communicator to the camera body.

In the lens adapter according to the present invention, the memory (52) stores an opening side limit value, defined as the limit value of the opening side of the aperture value of the optical system at the time of detection of the focus state of the optical system, for each type of lens barrel (3).

In the lens adapter according to the present invention, the transmitter (51) sends a preset predetermined opening side limit value by the second communicator (51) to the camera body (2) when the lens information which was acquired from the lens barrel (3) cannot be used as the basis to identify the type of the lens barrel.

In the lens adapter according to the present invention, the memory (52) stores the opening side limit value as a number of closing steps from an open aperture value of the optical system.

A camera body according to a first aspect of the present invention comprising: an imaging unit (22) which captures an image obtained by an optical system and outputs an image signal which corresponds to the captured image; a focus detector (21) which uses the image signal as the basis to detect a focus state of the optical system; a receiver (21) which receives from a lens barrel (3) a first predetermined value, defined as a limit value of the opening side of the aperture value of the optical system at the time of focus detection by the focus detector; a memory (29) which stores as a second predetermined value a limit value of the closing side of the aperture value of the optical system at the time of using the focus detector for focus detection; a controller (21) which sets the aperture value of the optical system in a range between the first predetermined value and the second predetermined value at the time of using the focus detector for focus detection; and a transmitter (21) which sends the aperture value which was set by the controller to the lens barrel.

In the camera body according to the present invention, the first predetermined value is a limit value of the opening side of the aperture value of the optical system at the time of focus detection, the second predetermined value is a limit value of the closing side of the aperture value of the optical system at the time of focus detection.

In the camera body according to the present invention, the controller (21) sets the aperture value of the optical system at the time of using the focus detector (21) for focus detection to the capture aperture value when capturing an image or a value at the opening side from the capture aperture value.

In the camera body according to the present invention, the controller (21) sets the aperture value of the optical system at the time of using the focus detector (21) for focus detection at a value at the closing side from the open aperture value of the optical system.

In the camera body according to the present invention, the imaging unit (22) has a plurality of capture-use pixels (221) which are arranged two dimensionally and a plurality of focus detection-use pixels (222a, 222b) which are arranged one dimensionally or two dimensionally while mixed with the capture-use pixels; and the focus detector (21) can perform focus detection by at least one system of focus detection by the phase difference detection system which uses the image signals which were output from the focus detection-use pixels as the basis to detect a shift amount of an image plane obtained by the optical system and thereby detect a focus state of the optical system and focus detection by the contrast detection system which uses the image signals which were output from the capture-use pixels as the basis to calculate an evaluation value relating to the contrast of an image obtained by the optical system and uses the calculated evaluation value as the basis to detect a focus state of the optical system.

In the camera body according to the present invention, the controller (21) sets the aperture value of the optical system at the time of using the focus detector (21) for focus detection at the capture aperture value when the capture aperture value when capturing an image is a value at the opening side from the opening side limit value.

In the camera body according to the present invention, the controller (21) sets the aperture value of the optical system at the time of using the focus detector (21) for focus detection at the closing side limit value when the capture aperture value when capturing an image is a value at the closing side from the second predetermined value.

In the camera body according to the present invention, the controller (21) sets the aperture value of the optical system at the time of using the focus detector (21) for focus detection in a range of the first predetermined value and the second predetermined value when the capture aperture value when capturing an image is a value at the closing side from the second predetermined value and sets the aperture value of the optical system at the time of using the focus detector for focus detection in a range of the first predetermined value and the second predetermined value when the capture aperture value is a value the same as the second predetermined value or a value at the opening side from the second predetermined value.

In the camera body according to the present invention, the lens barrel (3) is designed to be able to be mounted through a lens adapter, and, when mounting the lens barrel through the lens adapter, the controller (21) sets the aperture value of the optical system at the time of using the focus detector (21) for focus detection at the second predetermined value when the capture aperture value when capturing an image is a value at the closing side from the second predetermined value and sets the aperture value of the optical system at the time of using the focus detector for focus detection at the capture aperture value when the capture aperture value is a value the same as the second predetermined value or a value at the opening side from the second predetermined value.

A camera body according to a second aspect of the present invention comprising: an imaging unit (22) which captures an image obtained by an optical system and outputs an image signal which corresponds to the captured image; a focus detector (21) which uses the image signal as the basis to detect a focus state of the optical system; an acquiring unit (21) which acquires a variable amount which corresponds to a current capture aperture value from the lens barrel (3) from variable amounts which can change the aperture value of the optical system from the capture aperture value when capturing an image at the time of detection of the focus state of the optical system; a controller (21) which sets the aperture value of the optical system in the range of the variable amount which corresponds to the capture aperture value at the time of using the focus detector for focus detection; and a transmitter (21) which sends the aperture value which is set by the controller to the lens barrel.

In the camera body according to the present invention, the imaging unit (22) has a plurality of capture-use pixels (221) which are arranged two dimensionally and a plurality of focus detection-use pixels (222a, 222b) which are arranged one dimensionally or two dimensionally while mixed with the capture-use pixels, and the focus detector (21) can perform focus detection by at least one system of focus detection by the phase difference detection system which uses the image signals which were output from the focus detection-use pixels as the basis to detect a shift amount of an image plane obtained by the optical system and thereby detect a focus state of the optical system and focus detection by the contrast detection system which uses the image signals which were output from the capture-use pixels as the basis to calculate an evaluation value relating to the contrast of an image obtained by the optical system and uses the calculated evaluation value as the basis to detect a focus state of the optical system.

A camera body according to a third aspect of the present invention is a camera body which enables a lens barrel (3) to be mounted by a lens adapter (5a), wherein an imaging unit (22) which captures an image obtained by an optical system, and which outputs an image signal which corresponds to the captured image; a focus detector (21) which uses the image signal as the basis to detect a focus state of the optical system; a receiver (21) which receives from the lens adapter an opening side limit value, defined as a limit value of an opening side of an aperture value of the optical system at the time of using the focus detector for focus detection; a memory (29) which stores as a closing side limit value a limit value of a closing side of the aperture value of the optical system at the time of using the focus detector for focus detection; a controller (21) which sets the aperture value of the optical system in a range between the opening side limit value and the closing side limit value at the time of using the focus detector for focus detection; and a transmitter (21) which sends the aperture value which is set by the controller through the lens adapter to the lens barrel.

In the camera body according to the present invention, the controller (21) sets the aperture value of the optical system at the time of using the focus detector (21) for focus detection at the capture aperture value when capturing an image or a value at the opening side from the capture aperture value.

In the camera body according to the present invention, the controller (21) sets the aperture value of the optical system at the time of using the focus detector (21) for focus detection at a value at the closing side from an open aperture value of the optical system.

In the camera body according to the present invention, the imaging unit (22) has a plurality of capture-use pixels (221) which are arranged two dimensionally and a plurality of focus detection-use pixels (222a, 222b) which are arranged one dimensionally or two dimensionally while mixed with the capture-use pixels, and the focus detector (21) can perform focus detection by at least one system of focus detection by the phase difference detection system which uses the image signals which were output from the focus detection-use pixels as the basis to detect a shift amount of an image plane obtained by the optical system and thereby detect a focus state of the optical system and focus detection by the contrast detection system which uses the image signals which were output from the capture-use pixels as the basis to calculate an evaluation value relating to the contrast of an image obtained by the optical system and uses the calculated evaluation value as the basis to detect a focus state of the optical system.

In the camera body according to the present invention, the controller (21) sets the aperture value of the optical system at the time of using the focus detector (21) for focus detection at the capture aperture value when the capture aperture value when capturing an image is a value at the opening side from the opening side limit value.

In the camera body according to the present invention, the controller (21) sets the aperture value of the optical system at the time of using the focus detector (21) for focus detection at the closing side limit value when the capture aperture value when capturing an image is a value at a closing side from the closing side limit value.

In the camera body according to the present invention, the controller (21) sets the aperture value of the optical system at the time of using the focus detector (21) for focus detection in the range of the opening side limit value and the closing side limit value when the capture aperture value when capturing an image is a value at the closing side from the closing side limit value and sets the aperture value of the optical system at the time of using the focus detector for focus detection in a range of the opening side limit value and the capture aperture value when the capture aperture value is a value the same as the closing side limit value or a value at the opening side from the closing side limit value.

A camera body according to a fourth aspect of the present invention comprising: an imaging unit (22) which outputs an image signal which corresponds to a captured image; a focus detector (21) which detects a focus state of an optical system; a focus adjusting controller (21) which controls the drive of the focus adjustment optical system (32); and a controller (21) which makes the focus detector perform focus detection in the state making the aperture value the open aperture value, which closes the aperture while driving the focus adjustment optical system based on the results of the focus detection, and which makes the focus detector perform focus detection in the state where the aperture is closed.

In the camera body according to the present invention, the imaging unit (22) captures an image obtained by the optical system and outputs an image signal which corresponds to the captured image, the focus detector (21) uses the image signal as the basis to detect a focus state of the optical system, the focus adjusting controller (21) uses the result of focus detection by the focus detector as the basis to drive the focus adjustment optical system in the optical axis direction so as to adjust the focus of the optical system, and the controller (21) makes the focus detector detect the focus in the state where the aperture value of the optical system is made the open aperture value, uses the results of the focus detection as the basis to make the focus adjusting controller start the drive of the focus adjustment optical system, closes the aperture during the drive operation of the focus adjustment optical system, and makes the focus detector detect the focus in the state where the aperture is closed.

In the camera body according to the present invention, further comprising a judgment unit (21) which detects a brightness of the object and uses the detected brightness of the object as the basis to judge if illumination by a light which emits illumination light at an object is necessary, wherein when it is judged that illumination by the light is necessary, the controller (21) makes the focus detector (21) detect the focus in the state where the aperture value of the optical system is made the open aperture value, uses the results of the focus detection as the basis to make the focus adjusting controller (21) stall the drive of the focus adjustment optical system, closes the aperture (34) during the drive operation of the focus adjustment optical system, and makes the focus detector detect the focus in the state where the aperture is closed.

In the camera body according to the present invention, further comprising an acquiring unit (21) which acquires the limit value of the opening side of the aperture value of the optical system at the time of using the focus detector (21) for focus detection as the opening side limit value from the lens barrel (3), wherein the controller (21) closes the aperture (34) so that the aperture value of the optical system becomes the same value as the opening side limit value or a value at the closing side from the opening side limit value during the drive operation of the focus adjustment optical system when the opening side limit value could be obtained from the lens barrel.

In the camera body according to the present invention, further comprising an acquiring unit (21) which acquires the limit value of the opening side of the aperture value of the optical system at the time of using the focus detector (21) for focus detection as the opening side limit value from the lens barrel (3), wherein the controller (21) makes the focus detector (21) detect the focus in the state where the aperture value of the optical system is made the opening side limit value, uses the results of the focus detection as the basis to make the focus adjusting controller (21) start the drive operation of the focus adjustment optical system, closes the aperture (34) during the drive operation of the focus adjustment optical system (32), and makes the focus detector detect the focus in the state where the aperture is closed when the opening side limit value could be obtained from the lens barrel.

In the camera body according to the present invention, the controller (21) makes the focus detector (21) detect the focus while using the aperture value of the optical system as the open aperture value when the focus state of the optical system cannot be detected in the state where the aperture value of the optical system is made the opening side limit value, uses the results of the focus detection as the basis to make the focus adjusting controller (21) start the drive operation of the focus adjustment optical system, closes the aperture (34) during the drive operation of the focus adjustment optical system, and makes the focus detector detect the focus in the state where the aperture is closed.

In the camera body according to the present invention, the controller (21) closes the aperture (34) so that the aperture value of the optical system becomes the capture aperture value when capturing an image during the drive operation of the focus adjustment optical system (32).

In the camera body according to the present invention, further comprising a memory (29) which stores the limit value of the closing side of the aperture value of the optical system at the time of using the focus detector for focus detection as the closing side limit value, wherein the controller (21) closes the aperture (34) so that the aperture value of the optical system becomes the closing side limit value during the drive operation of the focus adjustment optical system (32) when the capture aperture value when capturing an image is a value at the closing side from the closing side limit value.

In the camera body according to the present invention, the imaging unit (22) has a plurality of capture-use pixels (221) which are arranged two dimensionally and a plurality of focus detection-use pixels (222a, 222b) which are arranged one dimensionally or two dimensionally while mixed with the capture-use pixels, and the focus detector (21) can perform focus detection by at least one system of focus detection by the phase difference detection system which uses the image signals which were output from the focus detection-use pixels as the basis to detect a shift amount of an image plane obtained by the optical system and thereby detect a focus state of the optical system and focus detection by the contrast detection system which uses the image signals which were output from the capture-use pixels as the basis to calculate an evaluation value relating to the contrast of an image obtained by the optical system and uses the calculated evaluation value as the basis to detect a focus state of the optical system.

A camera body according to a fifth aspect of the present invention comprising: an imaging unit (22) which outputs an image signal which corresponds to a captured image; a focus detector (21) which detects a focus state of an optical system; and a controller (21) which controls an aperture (34) so that the aperture value of the optical system is limited to a value of the predetermined aperture value or less at the time of focus detection by the focus detector when a capture aperture value at the time of capturing an image obtained by the optical system is larger than a predetermined aperture value.

In the camera body according to the present invention, the imaging unit (22) captures an image formed by the optical system and outputs an image signal which corresponds to the captured image, and the focus detector (21) uses the output of a focus detection pixel (222a, 222b) which is provided at the light receiving surface of the imaging unit as the basis to detect a shift amount of an image plane which is obtained by the optical system so as to detect a focus state of the optical system.

In the camera body according to the present invention, further comprising an exposure controller (21) which uses exposure control values which include an exposure time, capture sensitivity, and aperture value as the basis for exposure control for the imaging unit (22), wherein the exposure controller performs exposure control while changing at least one of the exposure time and the capture sensitivity when exposure suitable for focus detection can be obtained by changing at least one of the exposure time and the capture sensitivity while leaving the aperture value of the optical system fixed at the time of using the focus detector (21) for focus detection and makes the controller (21) change the aperture value of the optical system when exposure suitable for focus detection cannot be obtained while leaving the aperture value of the optical system fixed.

In the camera body according to the present invention, the controller (21) changes the aperture value of the optical system in the range of the predetermined aperture value or less when exposure suitable for focus detection cannot be obtained while leaving the aperture value of the optical system fixed.

In the camera body according to the present invention, the camera body is further provided with a focus adjuster which drives a focus adjustment optical system (32) in the optical axis direction so as to adjust the focus of the optical system and a starter (28) which starts up focus adjustment by the focus adjuster, and the exposure controller (21) uses the starter to perform exposure control before the focus adjustment is started up.

In the camera body according to the present invention, further comprising a display (26) which displays a through-the-lens image which corresponds to an image which is repeatedly captured by the imaging unit (22).

In the camera body according to the present invention, further comprising a mode setter (28) which can set a moving image capture mode, wherein the controller (21) sets the aperture value of the optical system at the capture aperture value when the moving image capture mode is set.

In the camera body according to the present invention, the controller (21) sets the aperture value of the optical system at the capture aperture value at the time of capturing an image obtained by the optical system.

A camera body according to a sixth aspect of the present invention comprising: an imaging unit (22) which outputs an image signal which corresponds to a captured image; a focus detector (21) which detects a focus state of an optical system; and a controller (21) which sets an aperture value of an aperture at a second for focus detection or a value at the opening side from the second predetermined value before a shutter release button is half pressed.

In the camera body according to the present invention, further comprising a display (26) which displays a through-the-lens image which corresponds to an image which is repeatedly captured by the imaging unit (22), wherein the imaging unit captures an image obtained by the optical system and outputs an image signal which corresponds to the captured image, the focus detector (21) uses outputs of the focus detection pixels (221) which are provided at the light receiving surface of the imaging unit as the basis to detect a shift amount of an image plane obtained by the optical system so as to detect a focus state of the optical system, and the controller (21) sets the aperture value of the optical system at the second predetermined value or a value at the opening side from the second predetermined value in the period after the start of display of the through-the-lens image by the display and before a half press operation of a shutter release button.

In the camera body according to the present invention, the controller (21) sets the aperture value of the optical system at a capture aperture value when capturing a moving image by recording an image which is repeatedly captured by the imaging unit (22).

In the camera body according to the present invention, the controller (21) sets the aperture value of the optical system so that the aperture value of the optical system becomes a value in the range of the second predetermined value and a first predetermined value which is at the opening side from the second predetermined value for focus detection in the period after the start of display of the through-the-lens image by the display (26) and before a half press operation of a shutter release button.

In the camera body according to the present invention, further comprising a judging unit (21) which detects a brightness of the object and uses the detected brightness of the object as the basis to judge if lighting by a light which emit illumination light to an object is necessary at the time of using the focus detector (21) for focus detection, wherein the controller (21) sets the aperture value of the optical system at a first predetermined value for focus detection or a value at the opening side from the first predetermined value in the period after the display of the through-the-lens image is started by the display (26) and before a half press operation of a shutter release button when it is judged that illumination by the light is necessary.

In the camera body according to the present invention, the controller (21) changes the aperture value of the optical system from a value before a shutter release button is half pressed when a reliability of the shift amount which was detected by the focus detector (21) is a predetermined value or less after a half press operation of the shutter release button is performed.

In the camera body according to the present invention, the controller (21) sets the aperture value of the optical system at the capture aperture value in the period after the start of the display of the through-the-lens image by the display (26) and before a shutter release button is half pressed when a capture aperture value at the time of capturing an image is a value at the opening side from a first predetermined value for focus detection.

In the camera body according to the present invention, the controller (21) sets the aperture value of the optical system at the second predetermined value in the period after the start of the display of the through-the-lens image by the display (26) and before a shutter release button is half pressed when a capture aperture value at the time of capturing an image is a value at the closing side from the second predetermined value.

In the camera body according to the present invention, the controller (21) sets the aperture value of the optical system so that the aperture value of the optical system becomes a value within the range of the second predetermined value and a first predetermined value which is at the opening side from the second predetermined value for focus detection in the period after the display of the through-the-lens image is started by the display (26) and before a shutter release button is half pressed when the capture aperture value when capturing an image is a value at a closing side from the second predetermined value and sets the aperture value of the optical system so that the aperture value of the optical system becomes a value within the range between the capture aperture value and the first predetermined value for focus detection in the period after the display of the through-the-lens image is started by the display and before a shutter release button is half pressed when the capture aperture value when capturing an image is a value the same as the second predetermined value or a value at the opening side from the second predetermined value.

A lens barrel according to a third aspect of the present invention comprising: an optical system which includes a focus adjustment optical system (32); an aperture (34) which limits the light beam which pass through the optical system to predetermined range at the time of detection of the focus state of the optical system; a drive (36) which drives the focus adjustment optical system; a memory (37) which stores a minimum aperture value of the predetermined range; and a transmitter (37) which sends the minimum aperture value to the camera body.

According to the present invention, it is possible to capture an image well.

BRIEF DESCRIPTION OF THE DRAWINGS

FIG. 5A is a front view which shows one of the focus detection pixels 222a enlarged, while

FIG. 7A is a cross-sectional view which shows one of the focus detection pixels 222a enlarged, while

DESCRIPTION OF EMBODIMENTS

Below, embodiments of the present invention will be explained based on the drawings.

First Embodiment

Figure 1:
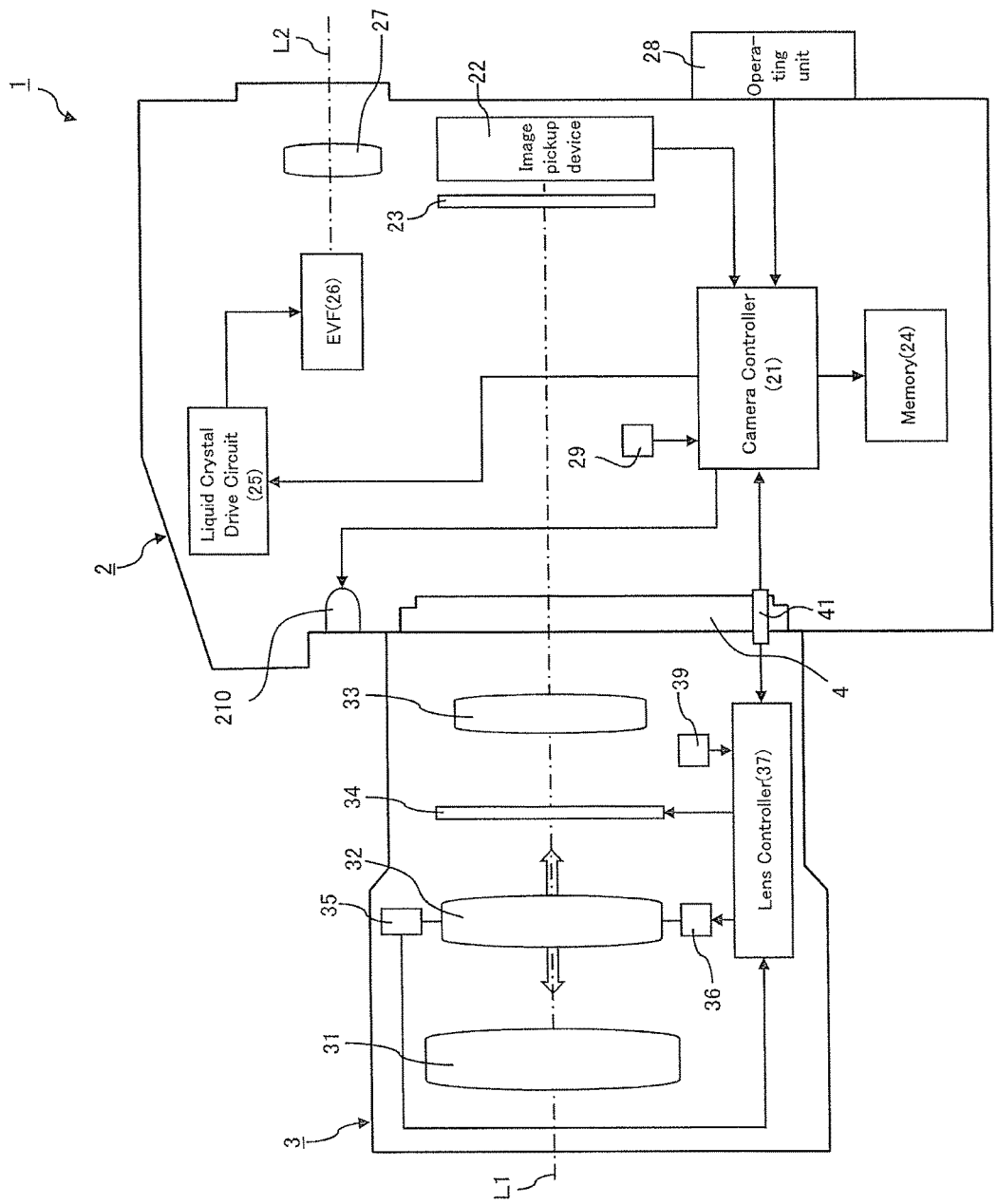
FIG. 1 is a block diagram which shows a camera according to a first embodiment.

FIG. 1 is a view of the configuration of principal parts which shows a digital camera 1 according to an embodiment of the present invention. The digital camera 1 of the present embodiment (below, simply referred to as the "camera 1") is comprised of a camera body 2 and a lens barrel 3. These camera body 2 and lens barrel 3 are detachably connected by a mount 4.

The lens barrel 3 is an exchangeable lens which can be detachably attached to the camera body 2. As shown in FIG. 1, the lens barrel 3 houses a capture optical system which includes lenses 31, 32, and 33 and an aperture 34.

The lens 32 is a focus lens which can move along the optical axis L1 direction so as to adjust the focal distance of a capture optical system. The focus lens 32 is provided to be able to move along the optical axis L1 of the lens barrel 3 and is detected in position by an encoder 35 while being adjusted in position by a focus lens drive motor 36.

The specific configuration of the movement mechanism along the optical axis L1 of this focus lens 32 is not particularly limited. If giving one example, a rotating barrel is inserted in a rotatable manner inside a fixed barrel which is fixed to the lens barrel 3, a helicoid groove is formed at an inner circumference of this rotating barrel, and an end part of a lens frame which fixes the focus lens 32 is engaged with the helicoid groove. Further, the focus lens drive motor 36 is used to make the rotating barrel rotate by making the focus lens 32 which is fixed to the lens frame move linearly along the optical axis L1.

As explained above, the rotating barrel is made to rotate with respect to the lens barrel 3 so as to make the focus lens 32 which is fixed to the lens frame move linearly in the optical axis L1 direction, but the drive source, constituted by the focus lens drive motor 36, is provided at the lens barrel 3. The focus lens drive motor 36 and the rotating barrel are coupled by, for example, a transmission which is comprised of a plurality of gears. If driving a drive shaft of the focus lens drive motor 36 to rotate in either direction, the drive force is transmitted to the rotating barrel by a predetermined gear ratio and, further, the rotating barrel rotates in either of the directions whereby the focus lens 32 which is fixed to the lens frame moves linearly in either direction of the optical axis L1. Note that, if the drive shaft of the focus lens drive motor 36 is driven to rotate in the opposite direction, the plurality of gears which form the transmission also rotate in the opposite direction and the focus lens 32 moves linearly in the opposite direction of the optical axis L1.

The position of the focus lens 32 is detected by an encoder 35. As already explained, the position of the focus lens 32 in the optical axis L1 direction is correlated with the rotational angle of the rotating barrel, so for example can be found if detecting the relative rotational angle of the rotating barrel with respect to the lens barrel 3.

As the encoder 35 of the present embodiment, one which detects rotation of a rotating disk which is coupled with rotational drive of the rotating barrel is detected by a photo interpreter or other photo sensor and outputs a pulse signal corresponding to the rotational speed, one which makes a brush contact which is provided at one of a fixed barrel and rotating barrel contact an encoder pattern on the surface of a flexible printed circuit board which is provided at the other and detects a change in a contact position corresponding to an amount of movement of the rotating barrel (either in the rotational direction or optical axis direction) by a detection circuit etc. can be used.

The focus lens 32 can move in the optical axis L1 direction in the interval from the end at the camera body side (also called the "near end") to the end at the object side (also called the "infinite end") due to rotation of the above-mentioned rotating barrel. Incidentally, the current position information of the focus lens 32 which was detected by an encoder 35 is sent through a lens controller 37 to a later explained camera controller 21. The focus lens drive motor 36 is driven by the drive position of the focus lens 32 which is computed based on the information being sent from the camera controller 21 through the lens controller 37.

The aperture 34 is configured to limit the amount of light beam which pass through the capture optical system to reach the image pickup device 22 and to adjust the aperture size centered at the optical axis L1 for adjusting the amount of defocus. The aperture size by the aperture 34 is adjusted by sending the aperture size corresponding to the aperture value which was computed in, for example, the automatic exposure mode from the camera controller 21 through the lens controller 37. Further, by manual operation by the operating unit 28 which is provided at the camera body 2, the aperture size corresponding to the set capture aperture value is input from the camera controller 21 to the lens controller 37. The aperture size of the aperture 34 is detected by a not shown aperture sensor, while the current aperture size is found by the lens controller 37.

Further, in the present embodiment, the lens controller 37 stores the limit value of the opening side of the aperture value of the optical system at the time of detection of the focus state of the optical system as the opening side limit value in advance in a memory 39. Here, for example, when making the aperture value at the time of detection of the focus state of the optical system F1.4 and making the capture aperture value at the time of capturing the image F2.8, since the capture operation is performed after focus detection, when changing the aperture value of the optical system from the aperture value F1.4 at the time of focus detection to the capture aperture value F2.8, sometimes the movement of the image plane accompanying a change of the aperture value causes the focal position which was detected at the time of focus detection to end up deviating from the depth of field of the optical system at the time of capturing an image and makes it impossible to capture an image focused at the object which had been focused at the time of focus detection. In particular, this trend becomes greater the more to the opening side the aperture value of the optical system. Therefore, in such a case, for example, by limiting the aperture value at the time of detection of the focus state of the optical system not at F1.4, but up to F2, it is possible to suppress the amount of movement of the image plane accompanying change of the aperture value and to capture an image focused on the object even if changing the aperture value of the optical system from the aperture value at the time of detection of the focus state to the capture aperture value. The opening side limit value, in this way, is the limit value of the opening side of the aperture value of the optical system which enables an image to be captured well even if changing the aperture value of the optical system from the aperture value at the time of focus detection to the capture aperture value and is stored in advance at the lens controller 37 as a unique value for each lens barrel 3.

Further, in the present embodiment, the lens controller 37 stores the opening side limit value as the number of closing steps from the open aperture value in the memory 39. For example, when the opening side limit value is an aperture value (F-value) of F2, the open aperture value is F1.2, and the number of closing steps of the aperture 34 for changing the aperture value of the optical system from the open aperture value F1.2 to the opening side limit value F2 is two steps, the camera controller 37 stores the opening side limit value as two steps. By storing the opening side limit value as the number of closing steps from the open aperture value in this way, for example, even when the lens position of the zoom lens is changed, the open aperture value corresponding to the lens position of the zoom lens may be used as the basis to find the opening side limit value corresponding to the lens position of the zoom lens. There is no need to store the open aperture value for each lens position of the zoom lens. Note that, the above-mentioned open aperture value, opening side limit value, and number of closing steps are examples. The invention is not limited to these values.

On the other hand, the camera body 2 is provided with an image pickup device 22 which receives a light beam L1 from the capture optical system at a predetermined focal plane of the capture optical system and is provided with a shutter 23 at a front surface of the same. The image pickup device 22 is comprised of a CCD, CMOS, or other device. It converts a received optical signal to an electric signal which it sends to the camera controller 21. The capture image information which is sent to the camera controller 21 is successively sent to a liquid crystal drive circuit 25 and displayed at an electronic viewfinder (EVF) 26 of the viewing optical system. When the release button (not shown) which is provided at the operating unit 28 is fully pressed, the capture image information is recorded at a recording medium, that is, a memory 24. The memory 24 used may be either of a detachable card type memory or built-in type memory. At the front of the surface of the image pickup device 22, an infrared ray cut filter for cutting infrared light and an optical low pass filter for preventing aliasing noise of the image are arranged. The details of the structure of the image pickup device 22 will be explained later.

The camera body 2 is provided with a camera controller 21. The camera controller 21 is electrically connected with the lens controller 37 by an electrical signal contact 41 which is provided at the mount 4, receives the lens information from this lens controller 37, and sends the amount of defocus, the aperture size, and other information to the lens controller 37. Further, the camera controller 21, as explained above, reads the pixel output from the image pickup device 22, processes the read pixel output in accordance with need by predetermined information processing so as to generate image information, and outputs the generated image information to the liquid crystal drive circuit 25 of the electronic viewfinder 26 or the memory 24. Further, the camera controller 21 corrects the image information from the image pickup device 22, detects the focus adjusting state of the lens barrel 3, the aperture adjusting state, etc., and otherwise oversees the control of the camera 1 as a whole.

Further, the camera controller 21 also uses the pixel data which was read out from the image pickup device 22 as the basis to detect the focus state of the capture optical system by the phase detection system and to detect the focus state of the optical system by the contrast detection system. Note that, the method of detection of the focus state will be explained later.

In addition, the camera controller 21 stores in advance the limit value of the closing side of the aperture value of the optical system at the time of focus detection in the memory 29 as the closing side limit value. This closing side limit value can be made the value the most at the closing side among the aperture values which enable effective prevention of, for example, vignetting at the time of focus detection and enable good focus detection precision to be obtained. Further, the camera controller 21 uses the opening side limit value which was received from the lens controller 37 and the closing side limit value which was stored in the memory 29 as the basis for exposure control at the time of focus detection. Note that, details of the exposure control at the time of focus detection will be explained later.

The operating unit 28 includes a shutter release button, moving image capture button, and input switch for a photographer to set various operating modes of the camera 1 and is designed to enable switching between an autofocus mode/manual focus mode. Further, the operating unit 28 is also designed to be able to switch between a still image capture mode/moving image capture mode. The various modes which are set by this operating unit 28 are sent to the camera controller 21. The camera controller 21 is used to control the operation of the camera 1 as a whole. Further, the shutter release button includes a first switch SW1 which becomes on by half pressing of the button and a second switch SW2 which becomes on by full pressing of the button.

Further, the camera body 2 of the present embodiment is provided with a light 210 which emits illumination light for focus detection. The emission of illumination light by the light 210 is controlled by a control signal from the camera controller 21 based on the output of the image pickup device 22.

Next, the image pickup device 22 according to the present embodiment will be explained.

Figure 2:
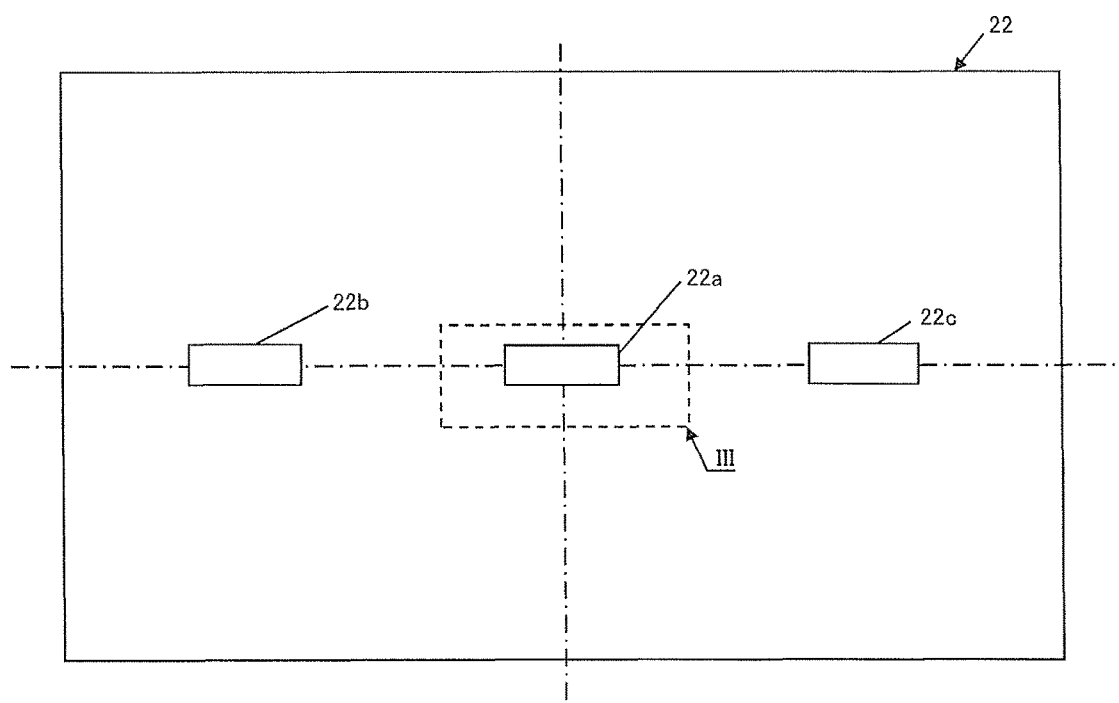
FIG. 2 is a front view which shows a focus detection position in an image pickup device which is shown in FIG. 1.
Figure 3:
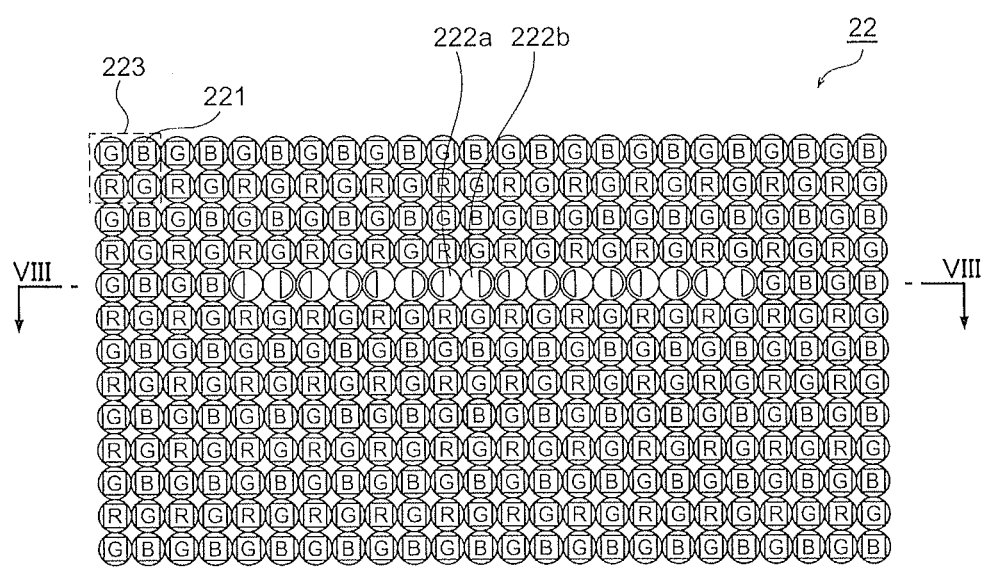
FIG. 3 is a front view which enlarges the part III of FIG. 2 and schematically shows an array of focus detection pixels 222a, 222b.

FIG. 2 is a front view which shows an imaging plane of the image pickup device 22, while FIG. 3 is a front view which enlarges the part III of FIG. 2 and schematically shows the arrangement of the focus detection pixels 222a and 222b.

The image pickup device 22 of the present embodiment, as shown in FIG. 3, is comprised of a plurality of capture pixels 221 arranged two dimensionally on the plane of the imaging plane, that is, is comprised of green pixels G which have color filters which pass the wavelength region of the green color, red pixels R which have color filters which pass the wavelength region of the red color, and blue pixels B which have color filters which pass the wavelength region of the blue color in a so-called "Bayer arrangement". That is, two green pixels are arranged on one diagonal line in four adjoining pixel groups 223 (dense square lattice array), while one red pixel and blue pixel each are arranged on the other diagonal line. This Bayer arrangement group of pixels 223 is used as a unit and the group of pixels 223 is repeatedly arranged two dimensionally on the imaging plane of the image pickup device 22 whereby an image pickup device 22 is configured.

Note that, the arrangement of the unit pixel groups 223 can for example be made a dense hexagonal lattice arrangement in place of the illustrated dense square lattice. Further, the configuration and arrangement of the color filters are not limited to these. It is also possible to employ an arrangement of color correction filters (green: G, yellow: Ye, magenta: Mg, cyan: Cy).

Figure 4:
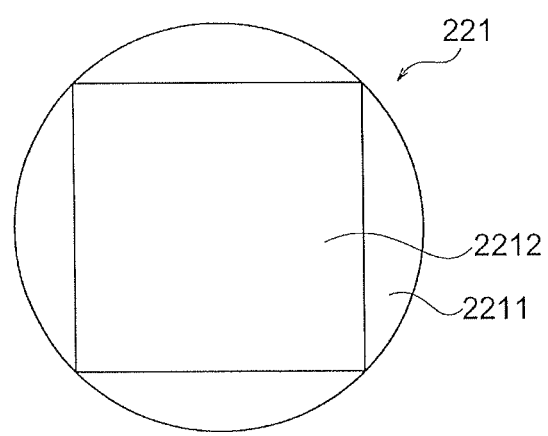
FIG. 4 is a front view which shows one of the capture pixels 221 enlarged.
Figure 6:
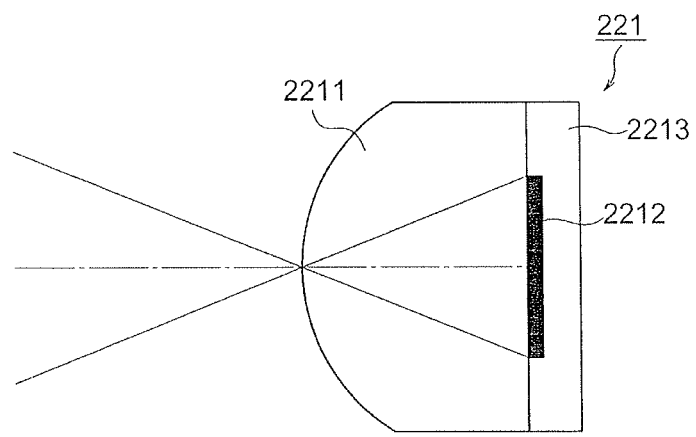
FIG. 6 is a cross-sectional view which shows one of the capture pixels 221 enlarged.

FIG. 4 is a front view which shows one of the capture pixels 221 enlarged, while FIG. 6 is a cross-sectional view. One capture pixel 221 is comprised of a microlens 2211, a photoelectric converter 2212, and a not shown color filter. As shown by the cross-sectional view of FIG. 6, the photoelectric converter 2212 is built into the surface of the semiconductor circuit board 2213 of the image pickup device 22 while the microlens 2211 is formed at the surface of the same. The photoelectric converter 2212 is shaped to receive by the microlens 2211 a captured bundle of light which passes through the exit pupil of the capture optical system (for example, F1.0) and receives the captured bundle of light.

Further, at three locations of the center of the imaging plane of the image pickup device 22 and symmetric positions at the right and left from the center, instead of the above-mentioned capture pixels 221, focus detection pixel strings 22a, 22b, and 22c which are comprised of focus detection pixels 222a and 222b arrayed are provided. Further, as shown in FIG. 3, one focus detection pixel string is comprised of a plurality of focus detection pixels 222a and 222b arranged alternately while adjoining each other in a row (22a, 22c, and 22c). In the present embodiment, the focus detection pixels 222a and 222b are densely arranged without provision of gaps at the positions of the green pixels G and blue pixels B of the Bayer arrangement of the capture pixels 221.

Note that, the positions of the focus detection pixel strings 22a to 22c which are shown in FIG. 2 are not limited to just the illustrated positions. The strings may be arranged at any single position or two positions and, further, may be arranged at positions of four or more locations. Further, at the time of actual focus detection, a photographer can manually operate the operating unit 28 so as to select the desired focus detection pixel string as the focus detection position from the plurality of arranged focus detection pixel strings 22a to 22c.

Figure 5A:
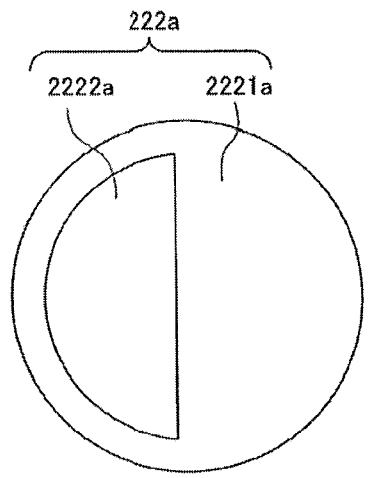
Figure 5B:
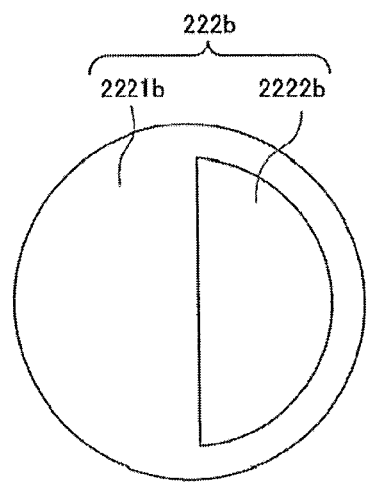
FIG. 5B is a front view which shows one of the focus detection pixels 222b enlarged.
Figure 7A:
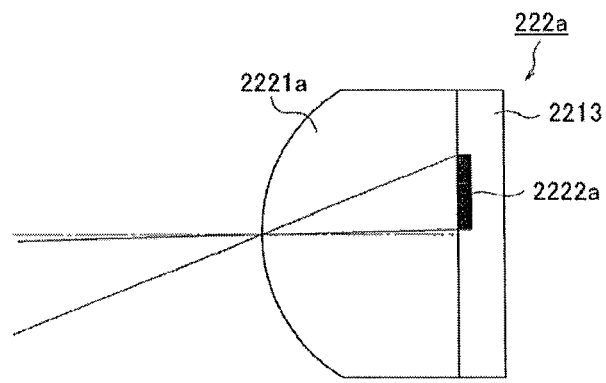
Figure 7B:
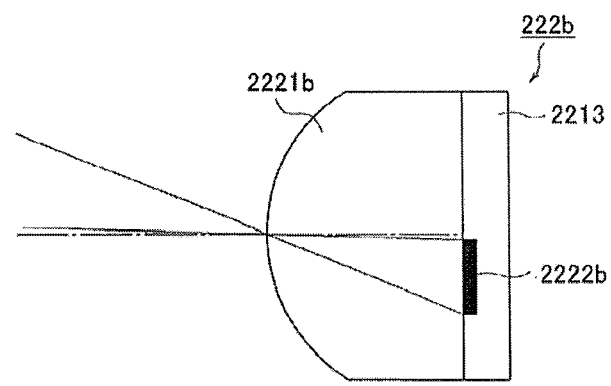
FIG. 7B is a cross-sectional view which shows one of the focus detection pixels 222b enlarged.

FIG. 5A is a front view which shows one of the focus detection pixels 222a enlarged, while FIG. 7A is a cross-sectional view of a focus detection pixel 222a. Further, FIG. 5B is a front view which shows one of the focus detection pixels 222b enlarged, while FIG. 7B is a cross-sectional view of the focus detection pixel 222b. The focus detection pixel 222a, as shown in FIG. 5A, is comprised of a microlens 2221a and a semicircular shape photoelectric converter 2222a. As shown in the cross-sectional view of FIG. 7A, photoelectric converters 2222a are built into the surface of the semiconductor circuit board 2213 of the image pickup device 22 and microlenses 2221a are formed at their surfaces. Further, each focus detection pixel 222b, as shown in FIG. 5B, is comprised of a microlens 2221b and a photoelectric converter 2222b. As shown by the cross-sectional view of FIG. 7B, the photoelectric converter 2222b is built into the surface of the semiconductor circuit board 2213 of the image pickup device 22 and the microlens 2221b is formed at its surface. Further, these focus detection pixels 222a and 222b, as shown in FIG. 3, are arranged alternately while adjoining each other in a row, whereby the focus detection pixel strings 22a to 22c which are shown in FIG. 2 are formed.

Note that, the photoelectric converters 2222a and 2222b of the focus detection pixels 222a and 222b are shaped so as to receive the light beam which pass through a predetermined region of the exit pupil of the capture optical system (for example, F2.8) by the microlenses 2221a and 2221b. Further, the focus detection pixels 222a and 222b are not provided with color filters. The spectral characteristics are a combination of the spectral characteristics of the photodiode performing the photoelectric conversion and the spectral characteristics of the not shown infrared cut filter. However, it is also possible to provide one of the color filters the same as the capture pixels 221, for example, a green filter.

Further, the photoelectric converters 2222a and 2222b of the focus detection pixels 222a and 222b which are shown in FIG. 5A and FIG. 5B were made semicircular shapes, but the shapes of the photoelectric converters 2222a and 2222b are not limited to this. They may be made other shapes, for example, elliptical shapes, rectangular shapes, or polygonal shapes.

Here, the so-called phase difference detection system which uses the pixel outputs of the above-mentioned focus detection pixels 222a and 222b as the basis to detect the focus state of the capture optical system will be explained.

Figure 8:
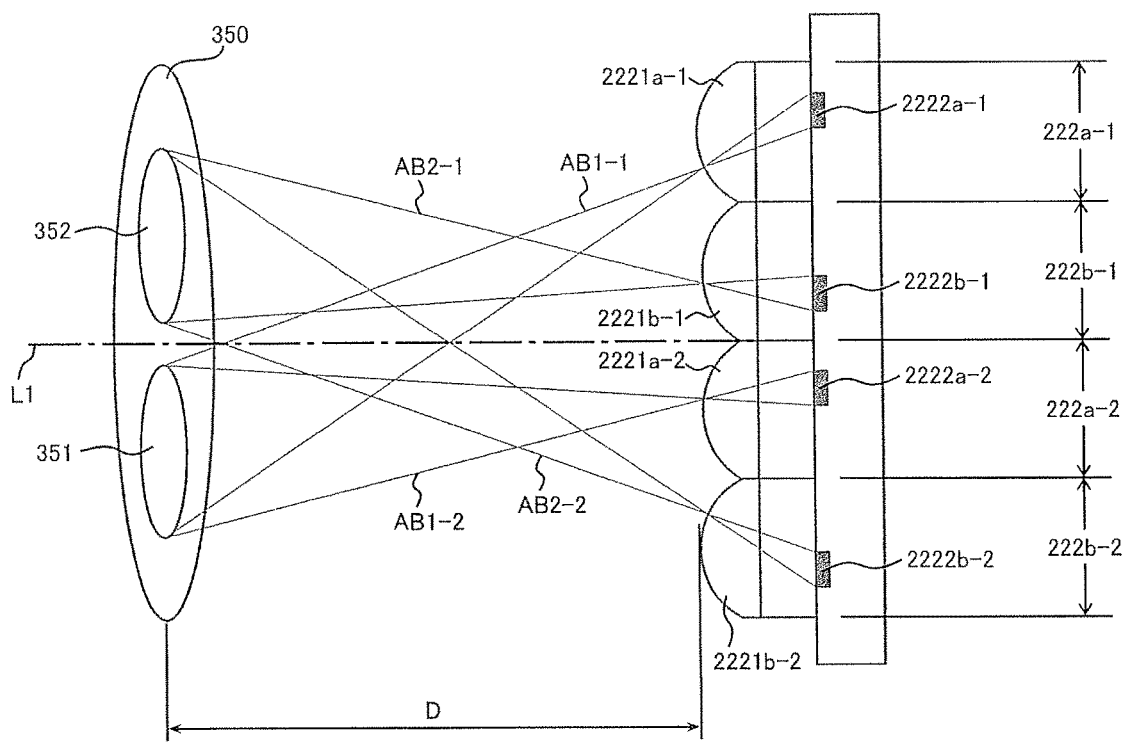
FIG. 8 is a cross-sectional view along the line VIII-VIII of FIG. 3.

FIG. 8 is a cross-sectional view along the line VIII-VIII of FIG. 3 and shows that the focus detection pixels 222a-1, 222b-1, 222a-2, and 222b-2 which are arranged near the capture optical axis L1 and adjoin each other receive the light beam AB1-1, AB2-1, AB1-2, and AB2-2 which are emitted from the distance measuring pupils 351 and 352 of the exit pupil 350. Note that, in FIG. 8, among the plurality of focus detection pixels 222a and 222b, only the ones which are positioned near the capture optical axis L1 are illustrated, but the other focus detection pixels other than the focus detection pixels which are shown in FIG. 8 are also similarly configured to receive the light beam which are emitted from the pair of distance measuring pupils 351 and 352.

Here, the "exit pupil 350" is an image which is set at a position a distance D in front of the microlenses 2221a and 2221b of the focus detection pixels 222a and 222b which are arranged at the predetermined focal plane of the capture optical system. The distance D is a value which is unambiguously determined in accordance with the curvature and refractive index of the microlens, the distance between the microlens and the photoelectric converter, etc. This distance D is called the distance measuring pupil distance. Further, the "distance measuring pupils 351 and 352" mean images of the photoelectric converters 2222a and 2222b which are projected by the microlenses 2221a and 2221b of the focus detection pixels 222a and 222b.

Note that, in FIG. 8, the direction of arrangement of the focus detection pixels 222a-1, 222b-1, 222a-2, and 222b-2 matches the direction of alignment of the pair of distance measuring pupils 351 and 352.

Further, as shown in FIG. 8, the microlenses 2221a-1, 2221b-1, 2221a-2, and 2221b-2 of the focus detection pixels 222a-1, 222b-1, 222a-2, and 222b-2 are arranged near a predetermined focal plane of the capture optical system. Further, the shapes of the photoelectric converters 2222a-1, 2222b-1, 2222a-2, and 2222b-2 which are arranged behind the microlenses 2221a-1, 2221b-1, 2221a-2, and 2221b-2 are projected at the exit pupils 350 separated by exactly the measured distance D from the microlenses 2221a-1, 2221b-1, 2221a-2, and 2221b-2. The projected shapes form the distance measuring pupils 351 and 352.

That is, the relative positional relationships of the microlenses and photoelectric converters at the focus detection pixels are determined so the projected shapes of the photoelectric converters of the focus detection pixels (distance measuring pupils 351 and 352) match on the exit pupil 350 at the measuring distance D. Due to this, the projection directions of the photoelectric converters at the focus detection pixels are determined.

As shown in FIG. 8, the photoelectric converter 2222a-1 of the focus detection pixel 222a-1 outputs a signal corresponding to the strength of the image which is formed on the microlens 2221a-1 by the light beam AB1-1 which pass through the distance measuring pupil 351 and head toward the microlens 2221a-1. Similarly, the photoelectric converter 2222a-2 of the focus detection pixel 222a-2 outputs a signal corresponding to the strength of the image which is formed on the microlens 2221a-2 by the light beam AB1-2 which pass through the distance measuring pupil 351 and head toward the microlens 2221a-2.

Further, the photoelectric converter 2222b-1 of the focus detection pixel 222b-1 outputs a signal corresponding to the strength of the image which is formed on the microlens 2221b-1 by the light beam AB2-1 which pass through the distance measuring pupil 352 and head toward the microlens 2221b-1. Similarly, the photoelectric converter 2222b-2 of the focus detection pixel 222b-2 outputs a signal corresponding to the strength of the image which is formed on the microlens 2221b-2 by the light beam AB2-2 which pass through the distance measuring pupil 352 and head toward the microlens 2221b-2.

Further, by arranging pluralities of the above-mentioned two types of focus detection pixels 222a and 222b in a line as shown in FIG. 3 and grouping the outputs of the photoelectric converters 2222a and 2222b of the focus detection pixels 222a and 222b in output groups which correspond to the distance measuring pupil 351 and the distance measuring pupil 352, data is obtained relating to the strength distribution of the pair of images which the bundles of focus detection rays which pass through the distance measuring pupils 351 and the distance measuring pupils 352 form on the focus detection pixel string. Further, by processing this strength distribution data by correlation processing, phase difference detection processing, or other image deviation detection processing, it is possible to detect the amount of image deviation due to the so-called phase difference detection system.

Further, by processing the obtained amount of image deviation by conversion corresponding to the distance between centers of gravity of the pair of distance measuring pupils, it is possible to find the deviation of the current focal plane (meaning the focal plane at the focus detection position corresponding to the position of the microlens array on a predetermined focal plane) from the predetermined focal plane, that is, the amount of defocus.

Note that, the processing of the amount of image deviation by the phase difference detection system and the processing of the amount of defocus based on this are performed by the camera controller 21.

Further, the camera controller 21 reads out the outputs of the capture pixels 221 of the image pickup device 22 and uses the read out pixel outputs as the basis for processing the focal evaluation value. This focal evaluation value can be found, for example, by extracting the high frequency components of the image outputs from the capture pixels 221 of the image pickup device 22 using a high frequency pass filter and integrating the same. Further, it can also be found by using two high frequency pass filters with different cutoff frequencies to extract the high frequency components and integrating them.

Further, the camera controller 21 sends the lens controller 37 a control signal to drive the focus lens 32 by a predetermined sampling interval (distance), finds focal evaluation values at the different positions, and finds the position of the focus lens 32 where the focal evaluation value becomes maximum as the focal position, that is, performs focus detection by the contrast detection system. Note that, when driving the focus lens 32 while calculating the focal evaluation value and the focal evaluation value rises twice, then further drops twice, this focal position can, for example, be found by interpolation or other processing using these focal evaluation values.

Figure 9:
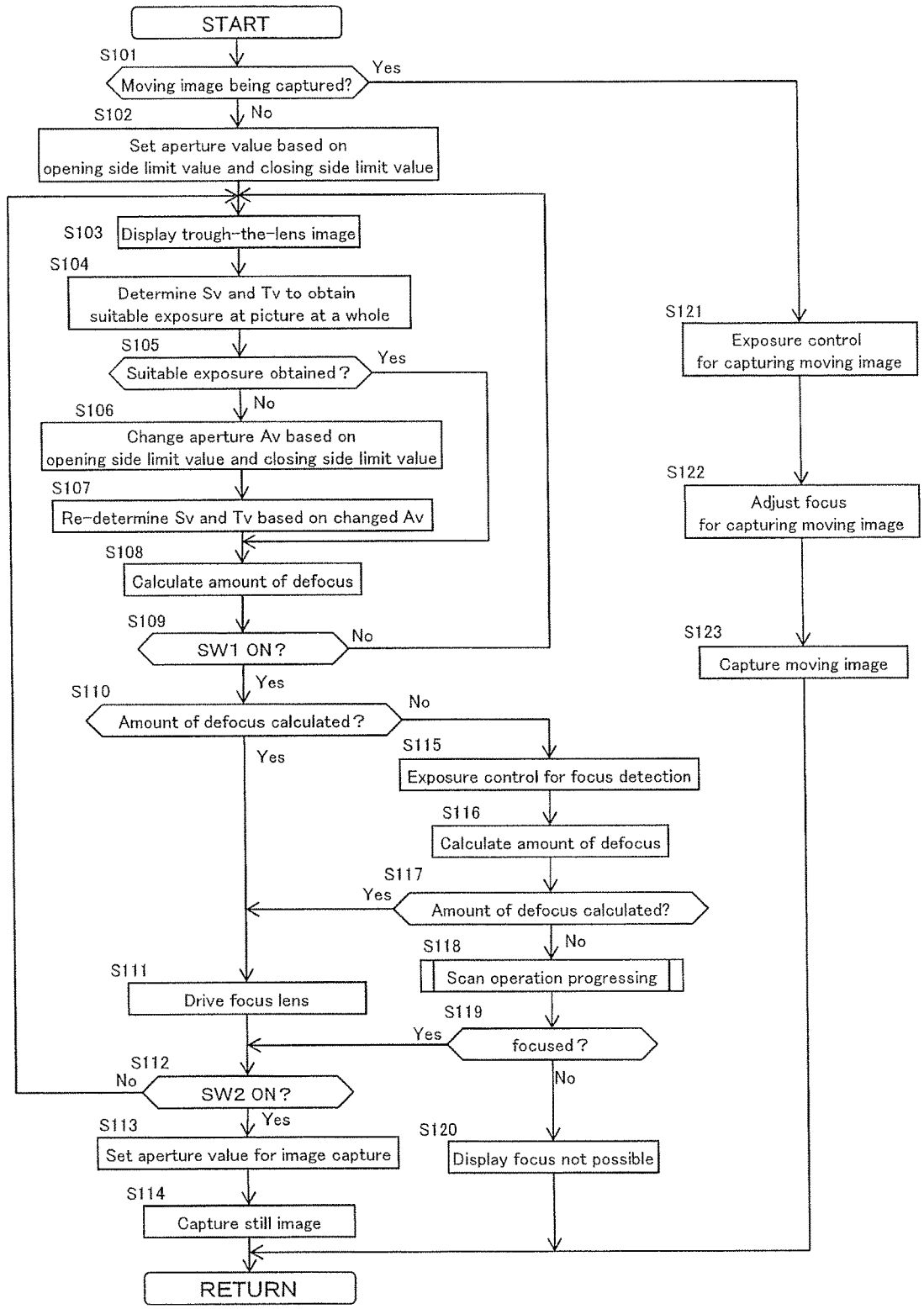
FIG. 9 is a flow chart which shows the operation of a camera according to a first embodiment.

Next, an example of operation of the camera 1 according to the first embodiment will be explained. FIG. 9 is a flow chart which shows an example of operation of the camera 1 according to the present embodiment. Note that, the following operation is started by the power of the camera 1 being turned on.

First, at step S101, the camera controller 21 is used to judge if a moving image is being captured. In the present embodiment, the camera controller 21 can judge that a moving image is being captured when, for example, the photographer presses a moving image capture button which is provided at the operating unit 28 and the moving image starts to be captured or when, in the moving image capture mode, the photographer presses a button for stating capture of the moving image (for example, shutter release button) and the moving image starts to be captured. When it is judged that a moving image is being captured, the routine proceeds to step S121, while when it is judged that a moving image is not being captured, the routine proceeds to step S102.

At step S102, the camera controller 21 is used to perform processing to set the aperture value of the optical system (F-value) at the aperture value for focus detection. Specifically, the camera controller 21, first, receives the limit value of the opening side of the aperture value of the optical system at the time of detection of the focus state of the optical system as the opening side limit value from the lens controller 37 and acquires the limit value of the closing side of the aperture value of the optical system at the time of detection of the focus state of the optical system as the closing side limit value from the memory 29. Note that, in the present embodiment, the opening side limit value is stored as the number of closing steps from the open aperture value in the memory 39, so the camera controller 21 uses the open aperture value and the number of closing steps from the open aperture value as the basis to find the limit value of the opening side (F-value) of the aperture value of the optical system at the time of focus detection as the opening side limit value.

Figure 10:
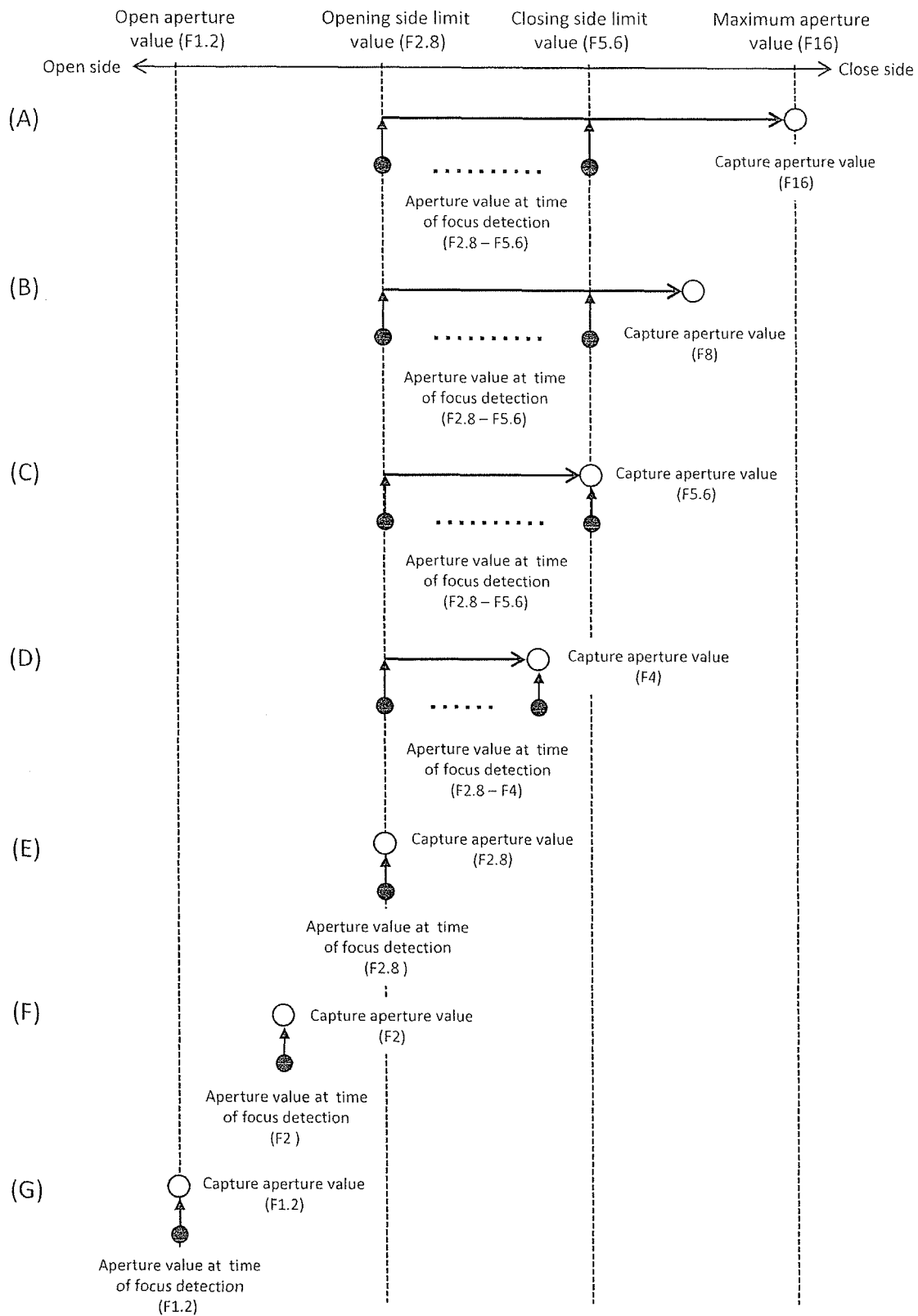
FIG. 10 is a view which shows an example of the relationship between an aperture value at the time of focus detection which was set at the first embodiment and a capture aperture value.

Further, the camera controller 21 uses the acquired opening side limit value and closing side limit value as the basis to set the aperture value of the optical system for focus detection. Specifically, the camera controller 21 sets the aperture value of the optical system at the closing side limit value when the capture aperture value which is set for capturing an image is a value at the closing side from the closing side limit value. Here, FIG. 10 is a view which shows an example of the relationship between the aperture value which is set for focus detection and the capture aperture value. Note that, the example which is shown in FIG. 10 shows a lens barrel 3 with an open aperture value of F1.2 and a maximum aperture value (maximum F-value) of F16 where the opening side limit value is acquired as F2.8 and the closing side limit value is acquired as F5.6. For example, in the example which is shown in FIG. 10A, the capture aperture value is set to F16 and the capture aperture value F16 is a value at the closing side from the closing side limit value F5.6, so the camera controller 21 sets the aperture value of the optical system at the closing side limit value F5.6. Further, in the example which is shown in FIG. 10B, the capture aperture value is F8, so in the same way as FIG. 10A, the camera controller 21 sets the aperture value of the optical system at the closing side limit value F5.6.

Further, the camera controller 21 sets the aperture value of the optical system at the capture aperture value when the capture aperture value which was set for capturing an image is a value the same as the closing side limit value or a value at the opening side from the closing side limit value. For example, in the example which is shown in FIG. 10C, the capture aperture value is the same F5.6 as the closing side limit value, so the camera controller 21 sets the aperture value of the optical system at the capture aperture value F5.6. Further, in the example which is shown in FIG. 10D, the capture aperture value is set at F4 and the capture aperture value F4 is a value at the opening side from the closing side limit value F5.6, so the camera controller 21 sets the aperture value of the optical system at the capture aperture value F4. Similarly, in the examples which are shown in FIGS. 10E to 10G as well, in the same way as in FIG. 10D, the capture aperture value is a value at the opening side from the closing side limit value, so the camera controller 21 sets the aperture value of the optical system at the capture aperture value.

At step S103, a through-the-lens image is generated by the camera controller 21 and the through-the-lens image is displayed by the electronic viewfinder 26 of the viewing optical system. Specifically, the image pickup device 22 is used for an exposure operation and the camera controller 21 is used to read the pixel data of the capture pixels 221. Further, the camera controller 21 uses the read pixel data as the basis to generate a through-the-lens image. The generated through-the-lens image is sent to the liquid crystal drive circuit 25 and is displayed at the electronic viewfinder 26 of the viewing optical system. Further, due to this, it is possible for a user to visually confirm the moving image of the object through the eyepiece 27.

At step S104, the camera controller 21 is used to split the captured picture into a plurality of regions and measure the light for each split region, that is, perform multi-pattern photometry, and calculate the brightness value By of the captured picture as a whole. Further, the camera controller 21 uses the calculated brightness value By of the captured picture as a whole as the basis to change at least one of the light receiving sensitivity Sv and exposure time Tv so that a suitable exposure is obtained at the captured picture as a whole. Note that, at step S104, the aperture Av corresponding to the aperture value which was set at step S102 is left fixed while at least one of the light receiving sensitivity Sv and exposure time Tv is changed. Further, the changed light receiving sensitivity Sv and exposure time Tv are used as the basis to, for example, set the shutter speed of the shutter 23, the sensitivity of the image pickup device 22, etc. so as to control the exposure of the image pickup device 22.

At step S105, the camera controller 21 is used to judge if suitable exposure is obtained at the captured picture as a whole by the exposure control of step S104. When changing just the light receiving sensitivity Sv and or exposure time Tv is not enough to obtain suitable exposure of the captured picture as a whole, the routine proceeds to step S106, while when changing just one of the light receiving sensitivity Sv and exposure time Tv is enough to obtain suitable exposure of the captured picture as a whole, the routine proceeds to step S108.

At step S106, since it is judged that just change of the light receiving sensitivity Sv and exposure time Tv is not enough to obtain suitable exposure at the captured picture as a whole, the camera controller 21 is used to change the aperture Av. Specifically, the camera controller 21 uses the brightness value By of the captured picture as a whole as the basis to change the aperture Av so that the aperture value of the optical system becomes in a range between the opening side limit value and the closing side limit value when the capture aperture value is a value at the closing side from the closing side limit value. For example, in the example which is shown in FIG. 10A, the capture aperture value F16 is a value at the closing side from the closing side limit value F5.6, so the camera controller 21 changes the aperture Av so that the aperture value of the optical system becomes in the range from the opening side limit value F2.6 to the closing side limit value F5.6 and performs exposure control so that suitable exposure is obtained at the captured picture as a whole. The same is true for the example which is shown in FIG. 10B.

Further, the camera controller 21 uses the brightness value By of the captured picture as a whole as the basis to change the aperture Av so that the aperture value of the optical system becomes in a range between the opening side limit value and the capture aperture value when the capture aperture value is a value the same as the closing side limit value or a value at the opening side from the closing side limit value. For example, in the example which is shown in FIG. 10C, the capture aperture value F5.6 is a value the same as the closing side limit value F5.6, so the camera controller 21 changes the aperture Av so that the aperture value of the optical system becomes one in a range from the opening side limit value F2.6 to the capture aperture value F5.6. Further, in the example which is shown in FIG. 10D, the capture aperture value F4 is a value at the opening side from the closing side limit value F5.6, so the camera controller 21 changes the aperture Av so that the aperture value of the optical system becomes one in a range from the opening side limit value F2.6 to the capture aperture value F4.

Note that, when the capture aperture value is the same value as the opening side limit value or a value at the opening side from the opening side limit value, the camera controller 21 leaves the aperture value of the optical system as the capture aperture value. For example, in the example which is shown in FIG. 10E, the capture aperture value F2.6 is a value the same as the opening side limit value F2.6, so the camera controller 21 leaves the aperture value of the optical system as the capture aperture value F2.6. The same is true in the examples which are shown in FIGS. 10F to 10G as well. Further, in the present embodiment, when it is possible to change the aperture Av within the range of a predetermined aperture value, the camera controller 21, for example, as shown in FIGS. 10A to 10D, changes the aperture Av to the opening side with some margin so that it is not necessary to again change the aperture Av even when the brightness value By of the captured picture as a whole again changes.

At step S107, the camera controller 21 is used to determine the light receiving sensitivity Sv and exposure time Tv so that suitable exposure is obtained at the captured picture as a whole by the aperture Av which was changed at step S106. Specifically, the camera controller 21, in the same way as step S104, measures the light at the captured picture as a whole by multi-pattern photometry and calculates the brightness value By of the captured picture as a whole. Further, the camera controller 21 uses the calculated brightness value By and the aperture Av which was changed at step S106 as the basis to determine the light receiving sensitivity Sv and exposure time Tv giving suitable exposure at the captured picture as a whole and uses the determined light receiving sensitivity Sv and exposure time Tv and the aperture Av which was changed at step S106 as the basis to control exposure for the image pickup device 22.

Further, at step S108, the camera controller 21 is used to perform processing to calculate the amount of defocus by the phase difference detection system. Specifically, first, the image pickup device 22 is used to receive the light beam from the optical system, then the camera controller 21 is used to read the pair of image data corresponding to the pair of images from the focus detection pixels 222a and 222b which form the three focus detection pixel strings 22a to 22c of the image pickup device 22. In this case, a configuration is also possible where when, due to manual operation of the photographer, a specific focus detection position is selected, only the data from the focus detection pixels corresponding to that focus detection position is read out. Further, the camera controller 21 uses the read pair of image data as the basis to perform image deviation detection processing (correlation processing), calculates the shift amount at the focus detection positions corresponding to the three focus detection pixel strings 22a to 22c, and, furthermore, converts the shift amount to an amount of defocus. Further, the camera controller 21 evaluates the reliability of the calculated amount of defocus. For example, the camera controller 21 uses the degree of match or contrast etc. of the pair of image data as the basis to judge the reliability of the amount of defocus.

At step S109, the camera controller 21 is used to judge if the shutter release button which was provided at the operating unit 28 was half pressed (first switch SW1 on) or not. When the shutter release button was half pressed, the routine proceeds to step S110, while when the shutter release button was not half pressed, the routine returns to step S103 and the display of the through-the-lens image, exposure control, and calculation of the amount of defocus are repeatedly performed until the shutter release button is half pressed.

At step S110, the camera controller 21 is used to judge if the amount of defocus could be calculated by the phase difference detection system. When the amount of defocus could be calculated, it is judged that the distance could be measured and the routine proceeds to step S111, while when the amount of defocus could not be calculated, it is judged that the distance could not be measured and the routine proceeds to step S115. Note that, in the present embodiment, even when it is possible to calculate the amount of defocus, if the reliability of the calculated amount of defocus is low, it is treated as if the amount of defocus could not be calculated and the routine proceeds to step S115. In the present embodiment, for example, when the contrast of the object is low, when the object is an ultra low brightness object, when the object is an ultra high brightness object, etc., it is judged that the reliability of the amount of defocus is low.

At step S111, the camera controller 21 uses the amount of defocus when was calculated at step S108 as the basis to calculate the amount of drive of the lens which is required for driving the focus lens 32 to the focal position and send the calculated lens drive amount through the lens controller 37 to the focus lens drive motor 36. Due to this, the focus lens drive motor 36 is used to drive the focus lens 32 based on the calculated lens drive amount.

At step S112, the camera controller 21 is used to judge if the shutter release button has been full pressed (second switch SW2 on). When the second switch SW2 is on, the routine proceeds to step S113, while when the second switch SW2 is not on, the routine returns to step S103.

At step S113, to capture the image, the camera controller 21 is used to perform processing which sets the aperture value of the optical system at the capture aperture value. For example, in the example which is shown in FIG. 10A, for capturing the image, the camera controller 21 changes the aperture value of the optical system from the aperture value at the time of focus detection (in the range from the opening side limit value F2.8 to the closing side limit value F5.6) to the capture aperture value F16. In the same way, in the examples which are shown in FIGS. 10B to 10G as well, the aperture value of the optical system is changed from the aperture value for focus detection to the capture aperture value for capturing the image. Further, at the following step S114, the image pickup device 22 is used to capture the image by the aperture value which was set at step S113, and the captured image data of the image is stored in the memory 24.

On the other hand, when it was judged at step S110 that the amount of defocus could not be calculated, the routine proceeds to step S115 for exposure suitable for focus detection. At step S115, the camera controller 21 is used for exposure control for focus detection so that exposure suitable for focus detection is obtained. Specifically, the camera controller 21 uses the output of the image pickup device 22 as the basis to measure the light by spot photometry in predetermined regions including the focus detection areas (focus detection pixel strings 22a, 22b, and 22c shown in FIG. 2) and to calculate the brightness values SpotBv in predetermined regions including the focus detection areas. Further, the camera controller 21 uses the calculated brightness values SpotBv as the basis to determine the light receiving sensitivity Sv, exposure time Tv, and aperture Av so that exposure suitable for focus detection (for example, exposure one step brighter than suitable exposure) is obtained. Note that, in the exposure control for focus detection of step S115, in the same way as steps S104 to S107 as well, the camera controller 21 changes the light receiving sensitivity Sv and the exposure time Tv with priority. Only when just change of the light receiving sensitivity Sv and the exposure time Tv is not enough to obtain exposure suitable for focus detection, the opening side limit value and closing side limit value which were acquired at step S102 are used as the basis to change the aperture Av. That is, using the camera controller 21, as shown in the examples which are shown in FIGS. 10A to 10B, when the capture aperture value is a value at the closing side from the closing side limit value, the brightness values SpotBv in predetermined regions including the focus detection areas are used as the basis to change the aperture Av so that the aperture value of the optical system becomes in a range between the opening side limit value and the closing side limit value. Further, as shown in FIGS. 10C to 10D, when the capture aperture value is a value the same as the closing side limit value or a value at the opening side from the closing side limit value, the brightness values SpotBv in predetermined regions including the focus detection areas are used as the basis to change the aperture value Av so that the aperture value of the optical system becomes in a range between the opening side limit value and the capture aperture value. Furthermore, as shown in FIGS. 10E to 10G, when the capture aperture value is the same value as the opening side limit value or a value at the opening side from the opening side limit value, the aperture value of the optical system is left as the capture aperture value.

At step S116, the camera controller 21 uses the image data which was obtained by exposure suitable for focus detection as the basis to calculate the amount of defocus. At the following step S117, the camera controller 21 uses the image data which was obtained by exposure suitable for focus detection as the basis to judge if the amount of defocus could be calculated. When the amount of defocus could be calculated, the routine proceeds to step S111 where the calculated amount of defocus is used as the basis for processing for driving the focus lens 32. On the other hand, when the amount of defocus could not be calculated even when using the image data which was obtained by exposure suitable for focus detection, the routine proceeds to step S118 where the later explained scan operation processing is performed. Note that, at step S117 as well, in the same way as step S110, even when the amount of defocus could be calculated, when the reliability of the calculated amount of defocus is low, it is treated as if the amount of defocus could not be calculated.

Figure 11:
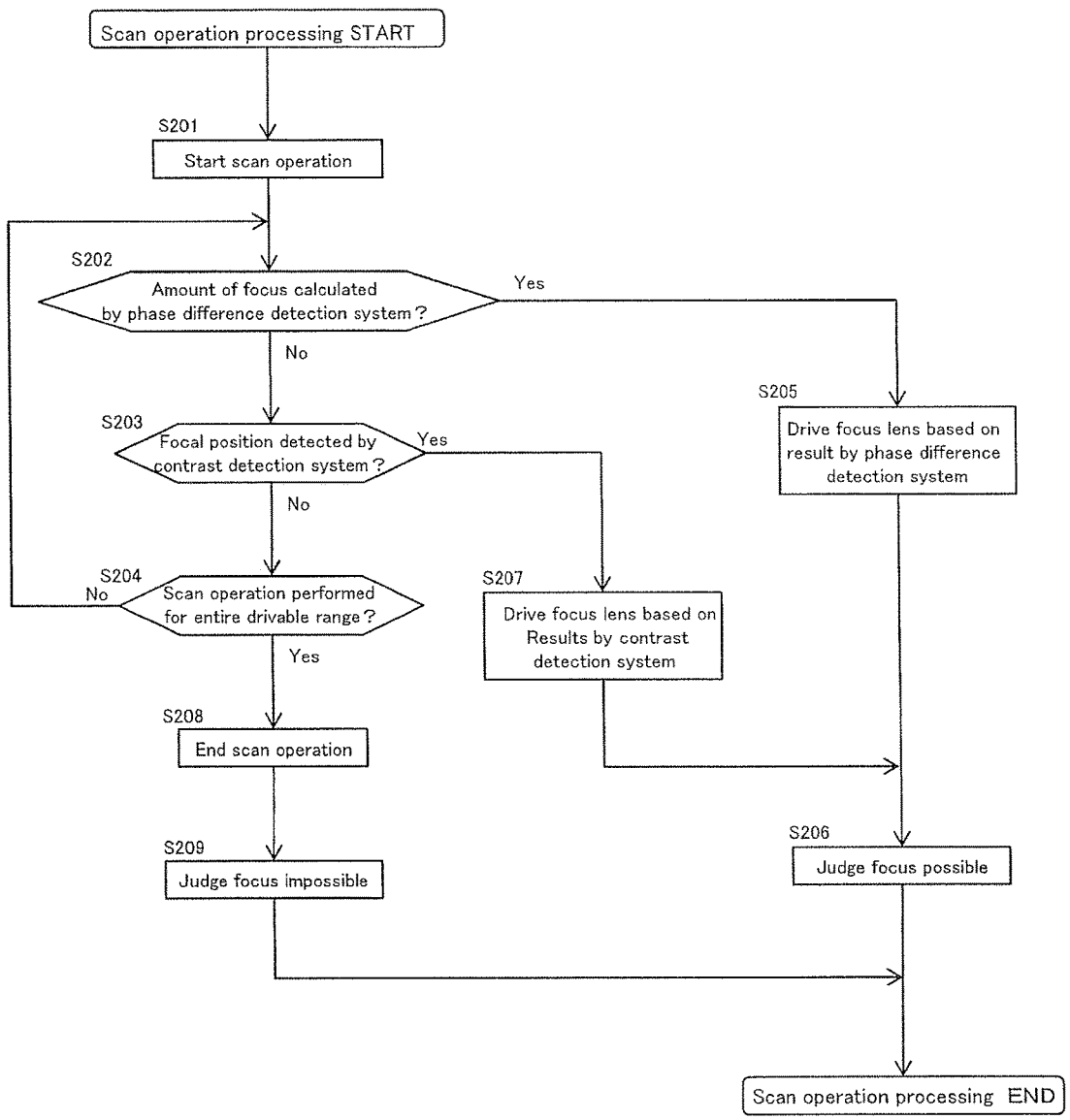
FIG. 11 is a flow chart which shows scan operation processing of step S118.

At step S118, the camera controller 21 is used to perform scan operation processing for performing a scan operation. Here, the "scan operation" is an operation using the focus lens drive motor 36 to drive the focus lens 32 for scanning while using the camera controller 21 to calculate the amount of defocus by the phase difference detection system and calculate the focal evaluation value at the same time at a predetermined interval and, due to this, detecting the focal position by the phase difference detection system and detecting the focal position by the contrast detection system at the same time at a predetermined interval. Below, referring to FIG. 11, scan operation processing according to the present embodiment will be explained. Note that, FIG. 11 is a flow chart for the scan operation processing according to the present embodiment.

First, at step S201, the camera controller 21 is used to perform processing for starting the scan operation. Specifically, the camera controller 21 sends the lens controller 37 a scan drive stats instruction, whereupon the lens controller 37 uses the instruction from the camera controller 21 as the basis to drive the focus lens drive motor 36 and drive the focus lens 32 along the optical axis L1 for scanning. Note that, the direction for drive for scanning is not particularly limited. It is also possible to perform the scan drive of the focus lens 32 from the infinite end to the near end or to perform it from the near end to the infinite end.

Further, the camera controller 21 drives the focus lens 32 while reading pairs of image data corresponding to pairs of images from the focus detection pixels 222a and 222b of the image pickup device 22 at predetermined intervals, uses this as the basis to calculate the amount of defocus by the phase difference detection system and evaluate the reliability of the amount of defocus calculated, drives the focus lens 32 while reading the pixel outputs from the capture pixels 221 of the image pickup device 22 at predetermined intervals, uses this as the basis to calculate a focal evaluation value, and thereby acquires focal evaluation values at different focus lens positions so as to detect the focal position by the contrast detection system.

At step S202, the camera controller 21 is used to perform a scan operation and judge as a result if the amount of defocus could be calculated by the phase difference detection system. When the amount of defocus could be calculated, it is judged that the distance could be measured and the routine proceeds to step S205, while when the amount of defocus could not be calculated, it is judged that the distance could not be calculated and the routine proceeds to step S203.

At step S203, the camera controller 21 is used to perform a scan operation and judge as a result if the focal position could be detected by the contrast detection system. When the focal position could be detected by the contrast detection system, the routine proceeds to step S207, while when the focal position could not be detected, the routine proceeds to step S204.

At step S204, the camera controller 21 is used to judge if the scan operation was performed for the entire region of the drivable range of the focus lens 32. When the scan operation could not be performed for the entire region of the drivable range of the focus lens 32, the routine returns to step S202 where steps S202 to S204 are repeated so as to perform a scan operation, that is, drive the focus lens 32 for scanning while calculating the amount of defocus by the phase difference detection system and detect the focal position by the contrast detection system at the same time at predetermined intervals. On the other hand, when the scan operation has been finished for the entire region of the range of drivability of the focus lens 32, the routine proceeds to step S208.

Further, when, as a result of performance of the scan operation, it is judged at step S202 that the phase difference detection system can be used to calculate the amount of defocus, the routine proceeds to step S205. At step S205, a focusing operation is performed based on the amount of defocus which was calculated by the phase difference detection system.

That is, at step S205, the camera controller 21 is used for processing to stop the scan operation, then the calculated amount of defocus is used to calculate the amount of drive of the lens which is required for driving the focus lens 32 to the focal position and the calculated lens drive amount is sent through the lens controller 37 to the lens drive motor 36. Further, the lens drive motor 36 uses the lens drive amount which was calculated by the camera controller 21 as the basis to drive the focus lens 32 to the focal position. When the drive operation of the focus lens 32 to the focal position is completed, the routine proceeds to step S206. At step S206, the camera controller 21 is used to judge focus.

Further, when, as a result of the scan operation, at step S203, it is judged that the contrast detection system can be used to detect the focal position, the routine proceeds to step S207 where a drive operation of the focus lens 32 is performed based on the focal position which was detected by the contrast detection system.

That is, the camera controller 21 is used to perform processing to stop the scan operation, then the focal position which was detected by the contrast detection system is used as the basis to perform lens drive processing to drive the focus lens 32 to the focal position. Further, when the drive operation of the focus lens 32 to the focal position is finished, the routine proceeds to step S206 where the camera controller 21 is used to judge focus.

On the other hand, when, at step S204, it is judged that the scan operation has finished for the entire region of the drivable range of the focus lens 32, the routine proceeds to step S208. At step S208, processing is performed to end the scan operation since the result of the scan operation shows that focus detection is not possible by either the phase difference detection system or the contrast detection system. Next, the routine proceeds to step S209 where the camera controller 21 is used to judge that focusing is not possible.

Further, after the scan operation processing of step S118 ends, the routine proceeds to step S119 where the camera controller 21 uses the result of focus judgment of the scan operation processing as the basis to judge if focusing was possible. When it is judged that focusing was possible in the scan operation processing (step S206), the routine proceeds to step S112. On the other hand, when it is judged that focusing was not possible (step S209), the routine proceeds to step S120. At step S120, the fact of focusing being impossible is displayed. The fact of focusing being impossible is displayed by, for example, the electronic viewfinder 26.

Note that, when it is judged at step S101 that a moving image is being captured, the routine proceeds to step S121. At step S121, the camera controller 21 is used for exposure control so as to obtain exposure suitable for capturing a moving image. Specifically, the camera controller 21 gives priority to the appearance of the moving image, so measures the light by multi-pattern photometry so as to calculate the brightness value By of the captured picture as a whole and uses the calculated brightness value By as the basis to determine the light receiving sensitivity Sv and exposure time Tv so that suitable exposure is obtained at the captured picture as a whole. In particular, during capture of a moving image, the aperture Av is left fixed and only the light receiving sensitivity Sv and exposure time Tv are changed for exposure control.

Further, at step S122, the camera controller 21 is used to detect the focus state of the optical system and to adjust the focus by the focus lens 32 in accordance with the detected focus state. Specifically, the camera controller 21 uses the captured image data as the basis to calculate the amount of defocus and judge if the amount of defocus could be calculated at steps S111 and S115 to S120. Further, when the amount of defocus was calculated, the calculated amount of defocus is used as the basis to drive the focus lens 32, while when the amount of defocus was not calculated, the scan operation processing is performed. Further, the routine proceeds to step S123 where the image pickup device 22 is used to capture the moving image. The image data of the moving image which is captured by the camera controller 21 is stored in the memory 24.

In the above way, in the present embodiment, the limit value of the opening side of the aperture value of the optical system at the time of focus detection is stored as the opening side limit value in the lens barrel 3. Further, the limit value of the closing side of the aperture value of the optical system at the time of focus detection is stored as the closing side limit value in the camera body 2. Further, the camera controller 21 uses the opening side limit value which was received from the lens barrel 3 and the closing side limit value which was acquired from the memory 29 as the basis to set the aperture value of the optical system at the time of focus detection. Specifically, when the capture aperture value at the time of capturing the image is a value at the closing side from the closing side limit value, the aperture value of the optical system at the time of focus detection is set in a range between the opening side limit value and the closing side limit value. In this way, in the present embodiment, by limiting the aperture value of the optical system at the time of focus detection to a value at the closing side from the opening side limit value, even when changing the aperture value of the optical system from the aperture value at the time of focus detection to the capture aperture value for capturing an image so as to capture an image, the amount of movement of the image plane of the optical system accompanying a change of the aperture value of the optical system can be made a predetermined amount or less. As a result, it is possible to make the focus position which was detected at the time of focus detection within the range of the depth of field of the optical system at the time of capture of an image and possible to capture an image focused on an object.

Further, in the present embodiment, when the aperture value at the time of capture of an image is a value at the closing side from the closing side limit value, by limiting the aperture value of the optical system at the time of focus detection to a value at the opening side from the closing side limit value, it is possible to effectively prevent the occurrence of vignetting at the time of focus detection and possible to suitably detect the focus state of the optical system. Furthermore, in the present embodiment, when the capture aperture value is a value at the opening side from the closing side limit value, by setting the aperture value of the optical system at the time of focus detection within a range between the opening side limit value and the capture aperture value, it is possible to limit the aperture value of the optical system at the time of focus detection so as not to become a value at the closing side from the capture aperture value. Due to this, when capturing an image, the depth of field at the time of capture of the image ends up becoming shallower than the depth of field at the time of focus detection. At the time of capture of the image, it is possible to effectively prevent an object focused at the time of focus detection from ending up deviating from the depth of field of the optical system. As a result, it is possible to capture an image focused on an object well.

Second Embodiment

Figure 12:
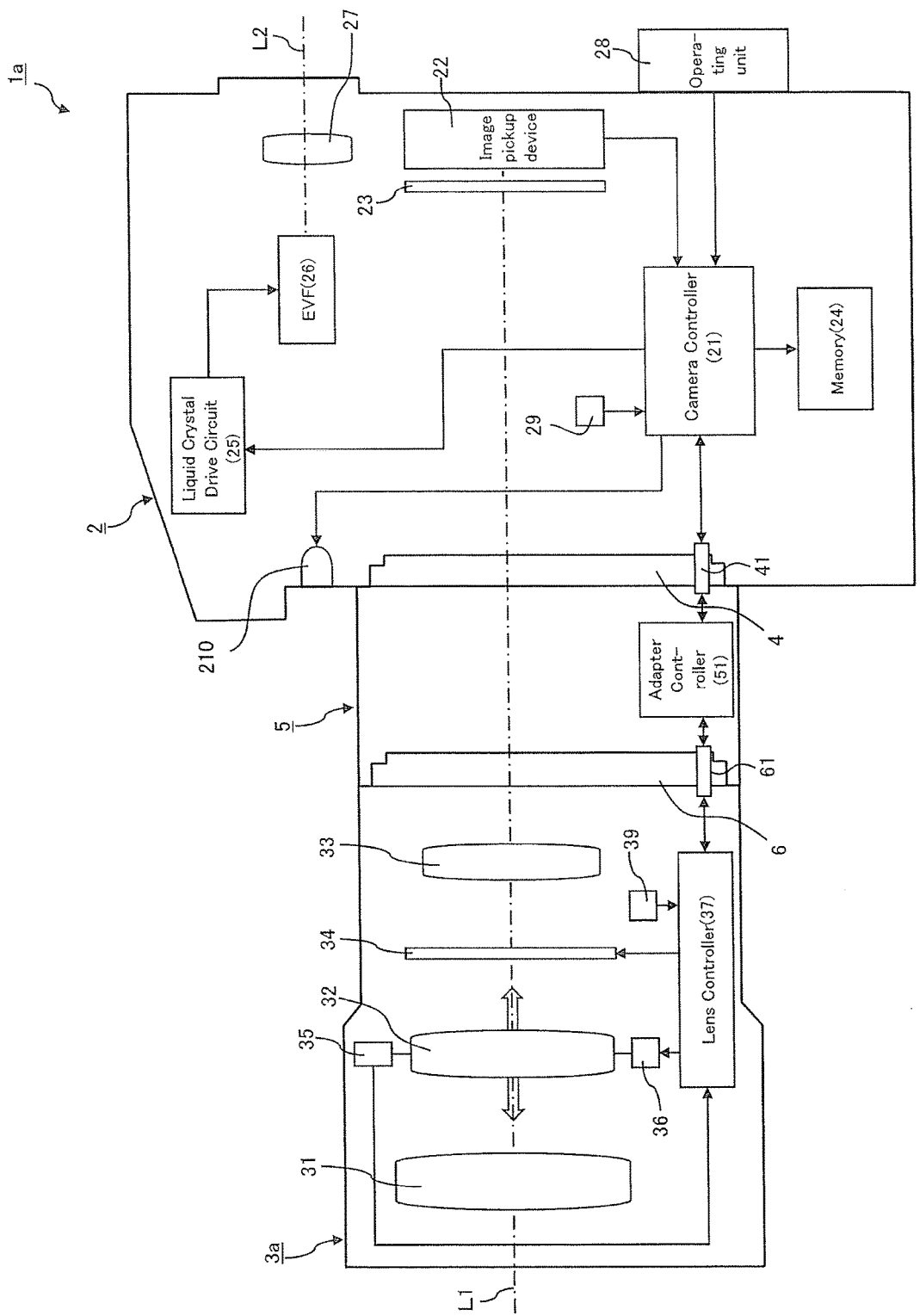
FIG. 12 is a block diagram which shows a camera according to a second embodiment.

Next, a second embodiment of the present invention will be explained based on the drawings. The camera 1a according to the second embodiment, as shown in FIG. 12, has a configuration similar to the camera 1 according to the first embodiment except for the fact that the lens barrel 3a is mounted to the camera body 2 through a lens adapter 5 and performs a similar operation to the camera 1 according to the first embodiment except for the points explained below.

That is, the camera 1a according to the second embodiment can mount the lens barrel 3a at the camera body 2 through the lens adapter 5. Here, the lens barrel 3a has a configuration similar to the lens barrel 3 of the first embodiment except for the fact that it does not store the opening side limit value in the memory 39. Further, in the second embodiment, for example, by the lens barrel 3a being mounted at the camera body 2 through the lens adapter 5, the adapter controller 51 sends the camera controller 21 and lens controller 37 a signal which shows that the lens adapter 5 has been mounted. Due to this, it is possible to transfer the aperture value of the optical system and other information between the lens controller 37 and the camera controller 21 through an electrical signal contact 41 which is provided at the mount 4 and an electrical signal contact 61 which is provided at the mount 6.

Figure 13:
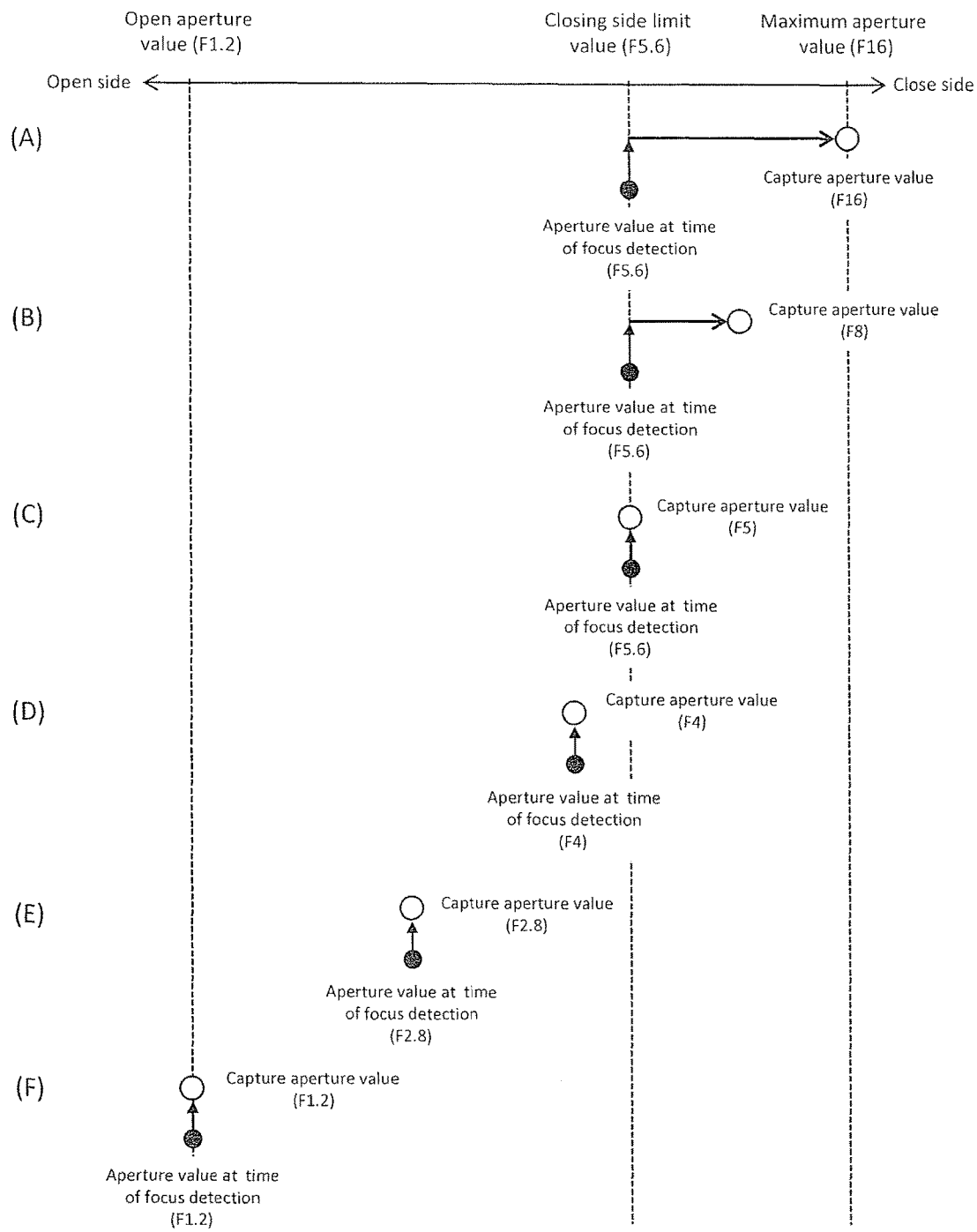
FIG. 13 is a view which shows an example of the relationship between an aperture value at the time of focus detection which was set at the second embodiment and a capture aperture value.

Next, an example of the operation of the camera 1a according to the second embodiment will be explained with reference to FIG. 13. FIG. 13 is a view which shows an example of the relationship between the aperture value which is set at the time of focus detection and the capture aperture value in the second embodiment. Further, the example which is shown in FIG. 13 shows the situation where the open aperture value is F1.2 and the maximum aperture value (maximum F-value) is F16 and the camera controller 21 is used for exposure control in focus detection based on only the closing side limit value without using the opening side limit value.

In the second embodiment, when the capture aperture value for capturing an image is a value at the closing side from the closing side limit value, the camera controller 21 sets the aperture value of the optical system at the closing side limit value for focus detection and then sets the aperture value of the optical system at the capture aperture value for image capture. For example, in the example which is shown in FIG. 13A, the capture aperture value is F16 and the capture aperture value is the value at the closing side from the closing side limit value F5.6, so the aperture value of the optical system is set at the closing side limit value F5.6 for focus detection. Further, when capturing an image, the aperture value of the optical system is changed from the closing side limit value F5.6 to the capture aperture value F16 for capture of the image. In the same way, in the example which is shown in FIG. 13B as well, the capture aperture value F8 is a value at the closing side from the closing side limit value F5.6, the focus detection is performed by a closing side limit value F5.6, and the image is captured by the capture aperture value F8.

Further, when the capture aperture value is a value the same as the closing side limit value or a value at the opening side from the closing side limit value, the camera controller 21 sets the aperture value of the optical system at the capture aperture value for focus detection and, further, leaves the aperture value of the optical system set at the capture aperture value for capture of an image. For example, in the example which is shown in FIG. 13C, the capture aperture value is the same F5.6 as the closing side limit value, so the camera controller 21 sets the aperture value of the optical system at the capture aperture value F5.6 for focus detection and, further, leaves the capture aperture value F5.6 as is for capture of the image. Further, in the example which is shown in FIG. 13D, the capture aperture value is F4 and the capture aperture value is a value at the opening side from the closing side limit value F5.6, so the camera controller 21 sets the aperture value of the optical system at the capture aperture value F4 for focus detection and, further, leaves the set capture aperture value as is for capture of the image. The same is true in the examples of the situations which are shown in FIGS. 13E and 13F.

In the above way, in the second embodiment, when not acquiring the opening side limit value from the lens controller 37, when the capture aperture value is a value the same as the closing side limit value or a value at the opening side from the closing side limit value, as shown in FIGS. 13C to 13F, the aperture value of the optical system is set to the capture aperture value for focus detection and, further, is left set at capture aperture value for capture of the image. Due to this, in the present embodiment, from the time of focus detection to the time of capture of an image, the aperture value of the optical system is not changed, so the position of the image plane of the optical system is not changed at the time of focus detection and at the time of capture of an image. The focal position which was detected in the focus detection becomes within the range of the depth of field of the optical system at the time of capture of an image and an image which is focused at the object can be captured.

Third Embodiment

Next, a third embodiment of the present invention will be explained based on the drawings. In the third embodiment, in the camera 1 which is shown in FIG. 1, a similar operation is performed as in the camera 1 according to the first embodiment except for using the later explained variable amount of the aperture value as the basis to control the aperture value at the time of focus detection.

Figure 14:
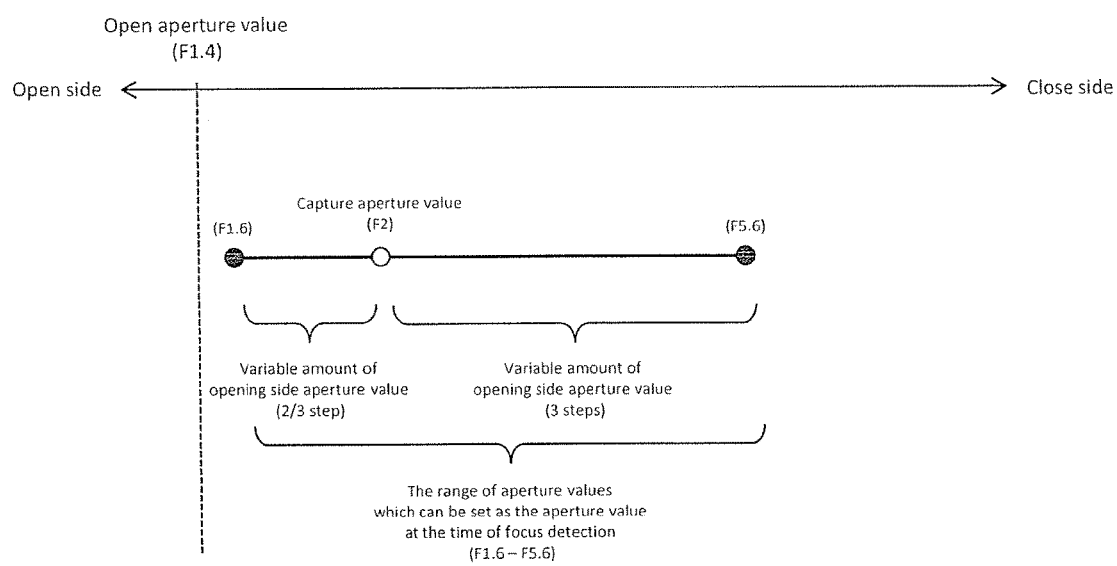
FIG. 14 is a view for explaining a variable amount of the aperture value in a third embodiment.

In the third embodiment, the lens controller 37, as shown in FIG. 14, stores the range of aperture values which can be set as the aperture value of the optical system at the time of focus detection in the memory 39 as the variable amount of the aperture value from the capture aperture value. Here, for the image capture after focus detection, when changing the aperture value of the optical system from, for example, the aperture value F1.4 at the time of focus detection to the capture aperture value F2 for image capture, sometimes movement of the image plane accompanying a change of the aperture value causes the focal position which was detected at the time of focus detection to end up deviating from the depth of field of the optical system at the time of capture of the image and an image focused at the object at the time of focus detection cannot be captured. In particular, the more to the opening side the aperture value of the optical system, this trend becomes greater. In such a case, by making the aperture value of the optical system at the time of focus detection not F1.4, but, for example, as shown in FIG. 14, F1.6 closer to the capture aperture value than F1.4, sometimes it is possible to suppress the amount of movement of the image plane accompanying change of the aperture value and possible to capture an image focused on the object. For example, in the example which is shown in FIG. 14, the aperture value at the time of focus detection can be set to the range of F1.6 to F5.6 so that the amount of movement of the image plane accompanying change of the aperture value in this way becomes a predetermined amount enabling good capture of the image or less. In this case, the memory 39 stores the number of closing step 2/3 for making the capture aperture value F2 the aperture value F1.6 as the variable amount of the aperture value at the opening side from the capture aperture value and stores the number of closing steps 3 for making the capture aperture value F2 the aperture value F5.6 as the variable amount of the aperture value at the closing side from the capture aperture value. In this way, the variable amount of the aperture value expresses as the number of closing steps the amount of the aperture value by which the aperture value of the optical system can be changed from the capture aperture value at the time of focus detection.

Note that, the variable amount of the aperture value differs for each capture aperture value. The memory 39 stores the variable amount of the aperture value for each capture aperture value. Further, as shown in FIG. 14, if comparing the variable amount of the aperture value at the opening side and the variable amount of the aperture value at the closing side, the variable amount of the aperture value at the opening side tends to become smaller than the variable amount of the aperture value at the closing side. This is because, as explained above, the more to the opening side the aperture value of the optical system, the greater the movement of the image plane accompanying a change of the aperture value tends to become.

The camera controller 21 acquires the variable amount of the aperture value corresponding to the current capture aperture value from the lens controller 37 and uses the acquired variable amount of the aperture value as the basis to set the aperture value at the time of focus detection. Note that, the method of control of the aperture value at the time of focus detection will be explained later.

Figure 15:
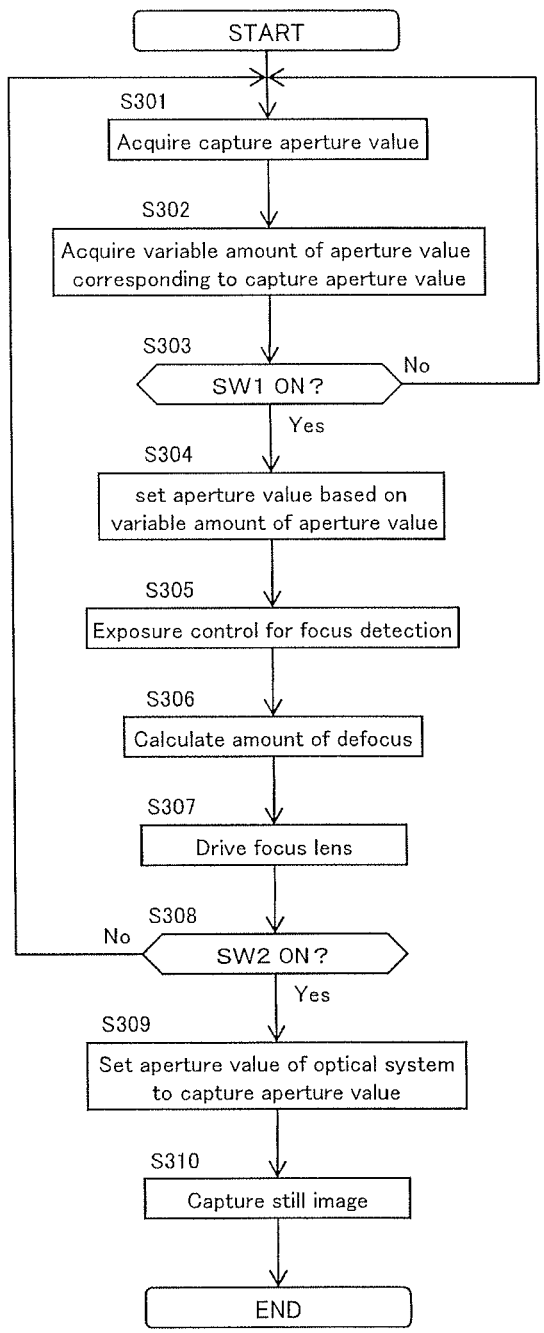
FIG. 15 is a flow chart which shows the operation of a camera according to the third embodiment.

Next, an example of the operation of the camera 1 according to the third embodiment will be explained. FIG. 15 is a flow chart which shows an example of operation of the camera 1 according to the present embodiment. Note that, the following operation is started by the power of the camera 1 being turned on.

As shown in FIG. 15, first, at step S301, the camera controller 21 is used to acquire the current capture aperture value. Further, at step S302, the camera controller 21 is used to acquire a variable amount of the aperture value corresponding to the current capture aperture value which is acquired at step S301. Here, the variable amount of the aperture value is stored for each capture aperture value in the memory 39 of the lens barrel 3. For this reason, the camera controller 21 acquires the variable amount of the aperture value corresponding to the capture aperture value from the memory 39 through the lens controller 37.

For example, as shown in FIG. 14, to make the amount of movement of the image plane accompanying a change of the aperture value a predetermined amount enabling the image to be captured well or less, when the aperture value of the optical system at the time of focus detection can be set for example, in the range of F1.6 to F5.8 corresponding to the capture aperture value F2, the number of closing step 2/3 for making the capture aperture value F2 the aperture value F1.6 is acquired as the variable amount of the aperture value at the opening side, while the number of closing steps 3 for making the capture aperture value F2 the aperture value F5.8 is acquired from the memory 39 as the variable amount of the aperture value at the closing side.

At step S303, the camera controller 21 is used to judge if the shutter release button which is provided at the operating unit 28 is half pressed (first switch SW1 on). When the shutter release button is half pressed, the routine proceeds to step S304. On the other hand, when the shutter release button is not half pressed, the routine proceeds to step S301. Until the shutter release button is half pressed, the acquisition of the capture aperture value and the acquisition of the variable amount of the aperture value corresponding to the acquired capture aperture value are repeatedly performed.

At step S304, the camera controller 21 uses at the variable amount of the aperture value which was acquired at step S302 as the basis to set the aperture value of the optical system. Specifically, the camera controller 21 sets the aperture value of the optical system for focus detection in the range of the variable amount of the aperture value from the capture aperture value. For example, as shown in FIG. 14, when, corresponding to the capture aperture value F2, 2/3 step is acquired as the variable amount of the aperture value at the opening side and 3 steps are acquired as the variable amount of the aperture value at the closing side, the camera controller 21 can set the aperture value of the optical system to become an aperture value suitable for focus detection in the range between the aperture value F1.6 opened by a 2/3 step to the opening side from the capture aperture value F2 and the aperture value F5.8 closed by 3 steps to the closing side from the capture aperture value F2, that is, in the range from F1.6 to F5.8. For example, when the brightness of the object is low, the camera controller 21 can set the aperture value of the optical system at an aperture value at the opening side in F1.6 to F5.8. Further, when broadening the range of detection at the time of focus detection in the optical axis direction, it is possible to set the aperture value of the optical system at the aperture value at the closing side in F1.6 to F5.8.

At steps S305 to S307, in the same way as steps S115, S116, and S111 of the first embodiment, after the exposure control for focus detection, the amount of defocus is calculated. The drive operation of the focus lens 32 is started based on the calculated amount of defocus.

Further, at steps S308 to S310, in the same way as steps S112 to S114 of the first embodiment, it is judged if the shutter release button is full pressed (second switch SW2 on). When the second switch SW2 is on, the aperture value of the optical system is set at the capture aperture value, then the image pickup device 22 is used for capture of the image, and the image data of the captured image is stored in the memory 24. Note that, when the second switch SW2 is not on, the routine returns to step S301.

As explained above, in the third embodiment, as shown in FIG. 14, at the time of focus detection, the range of the aperture value which can be set as the aperture value of the optical system is stored in the memory 39 of the lens barrel 3 as the variable amount of the aperture value from the capture aperture value, that is, the variable amount of the aperture value. The camera controller 21 acquires the variable amount of the aperture value corresponding to the current capture aperture value from the lens barrel 3 and sets the aperture value of the optical system at the time of focus detection, as shown in FIG. 14, to the range of the variable amount of the aperture value with respect to the current capture aperture value. In this way, by setting the aperture value of the optical system at the time of focus detection within the range of the variable amount of the aperture value with respect to the capture aperture value, even if changing the aperture value of the optical system from the aperture value at the time of focus detection to the capture aperture value, it is possible to make the amount of movement of the image plane accompanying a change of the aperture value a predetermined amount or less and as a result it is possible to make the focal position which was detected by the focus detection within a range of the depth of field of the optical system at the time of capture of an image and to capture an image focused on the object.

Figure 16:
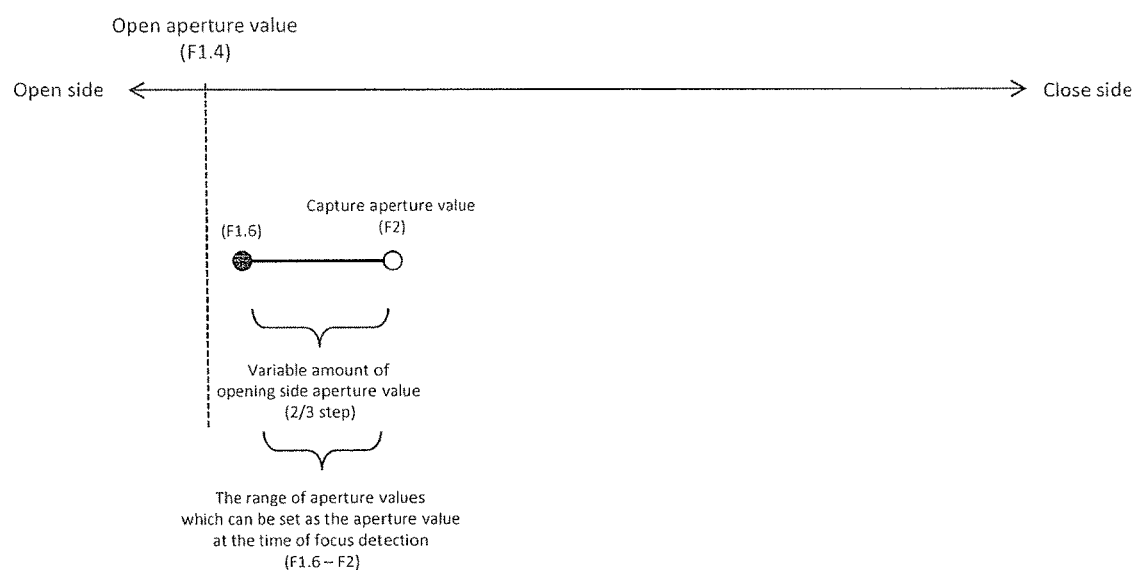
FIG. 16 is a view for explaining another example of the variable amount of the aperture value.

Note that, in the third embodiment, as shown in FIG. 14, the configuration was shown in which the variable amount of the aperture value is set to the opening side and closing side from the capture aperture value, but as shown in FIG. 16, the variable amount of the aperture value may also be set to just the opening side from the capture aperture value. For example, in the example which is shown in FIG. 16, the camera controller 21 can set the aperture value of the optical system to become an aperture value suitable for focus detection in the range between the aperture value F1.6 opened by 2/3 step at the opening side from the capture aperture value F2 and the capture aperture value F2. Note that, FIG. 16 is a view for explaining another example of the variable amount of the aperture value.

Fourth Embodiment

Figure 17:
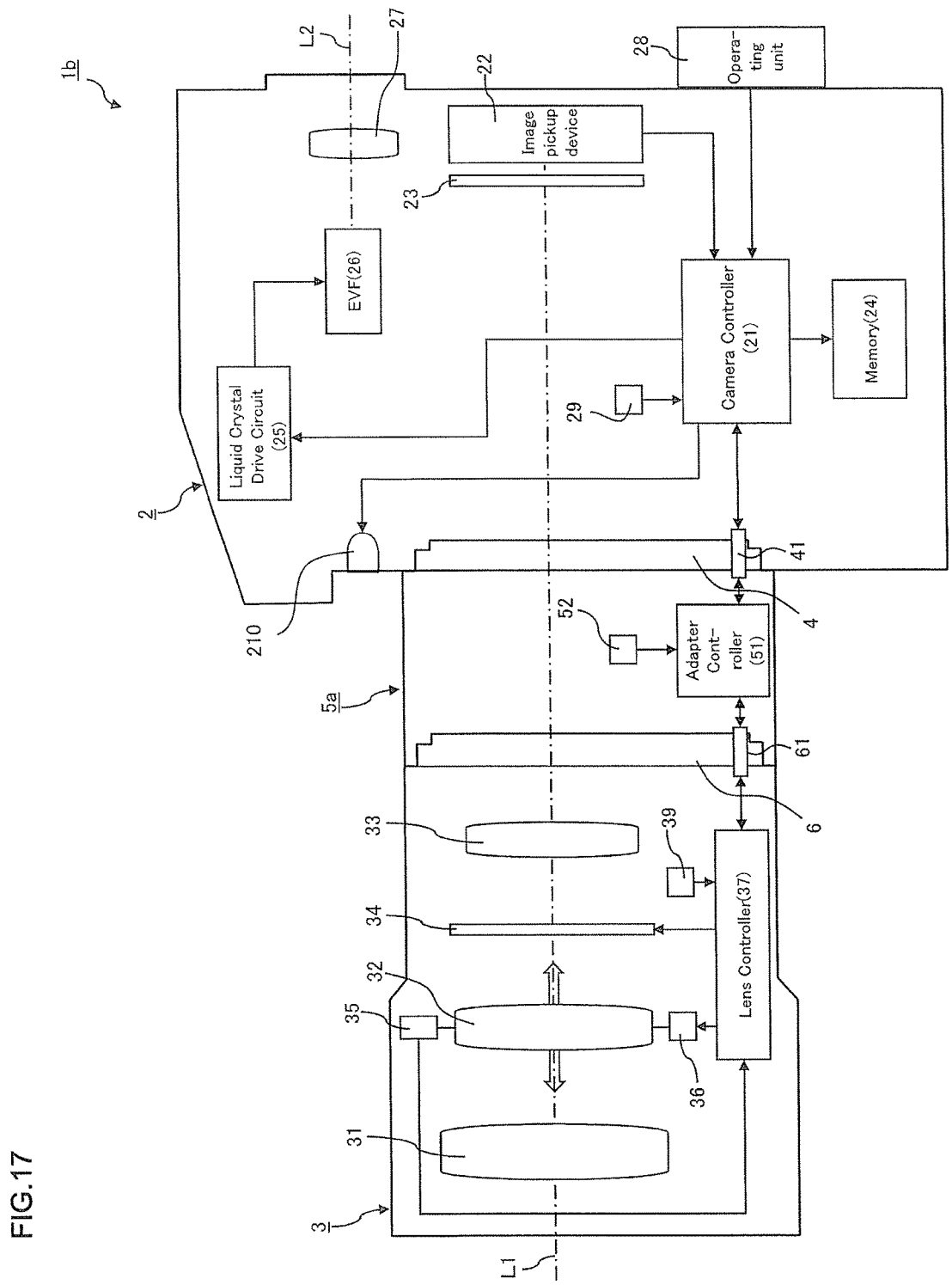
FIG. 17 is a block diagram which shows a camera according to a fourth embodiment.

Next, a fourth embodiment of the present invention will be explained with reference to the drawings. The camera 1b according to the fourth embodiment, as shown in FIG. 17, has a configuration similar to the camera 1 according to the first embodiment other than the lens barrel 3 being mounted at the camera body 2 through the lens adapter 5a. It operates in the same way as the camera 1 according to the first embodiment other than on the points explained below.

FIG. 17 is a view of the configuration of principal parts which show a camera 1b according to the fourth embodiment. The camera 1b of the fourth embodiment is comprised of a camera body 2, lens barrel 3, and lens adapter 5a. The camera body 2 and the lens barrel 3 are detachably coupled through a lens adapter 5a.

In the fourth embodiment, as shown in FIG. 17, between the lens barrel 3 and the camera body 2, a lens adapter 5a is interposed for mounting the lens barrel 3 at the camera body 2. The adapter controller 51 receives lens information from the lens controller 37 through an electrical signal contact 51 which is provided at the mount 6 and sends the lens controller 37 the amount of defocus, aperture size, and other information which it received from the camera controller 21. Further, the adapter controller 51 receives the amount of defocus, aperture size, or other information from the camera controller 21 through the electrical signal contact 41 which is provided at the mount 4 and sends the lens information which was received from the lens controller 37 to the camera controller 21. In this way, in the present embodiment, lens information etc. are transferred between the camera controller 21 and the lens controller 37 through the lens adapter 5a.

The memory 52 of the lens adapter 5a stores in advance as the opening side limit value the limit value of the opening side of the aperture value of the optical system at the time of detection of the focus state of the optical system. Here, for example, when making the aperture value at the time of detection of the focus state of the optical system F1.4 and making the aperture value at the time of capture of an image F2.8, if changing the aperture value of the optical system from the aperture value F1.4 at the time of focus detection to the capture aperture value F2.8 for performing the image capture after focus detection, sometimes movement of the image plane accompanying a change of the aperture value causes the focus position which was detected at the time of focus detection to end up deviating from the depth of field of the optical system at the time of capture of the image and it is not possible to capture a focused object for an object focused at the time of focus detection. In particular, the more to the opening side the aperture value of the optical system, the greater this trend. Therefore, in this case, for example, by limiting the aperture value at the opening side at the time of detection of the focus state of the optical system not at F1.4, but up to F2, it is possible to suppress the amount of movement of the image plane accompanying a change of the aperture value. Even when changing the aperture value of the optical system from the aperture value at the time of detection of the focus state to the capture aperture value, it is possible to capture an image focused on the object. The opening side limit value, in this way, is the limit value of the opening side of the aperture value of the optical system which enables an image to be captured well even when changing the aperture value of the optical system from the aperture value at the time of focus detection to the capture aperture value and becomes a value corresponding to the lens barrel 3 and unique to the lens barrel 3.

In the present embodiment, the opening side limit value is stored from the memory 52 of the lens adapter 5a for each type of the lens barrel 3. The adapter controller 51 uses the lens information which was received from the lens barrel 3 as the basis to identify the type of the lens barrel 3 and thereby acquires the opening side limit value corresponding to the type of the lens barrel 3. Further, the adapter controller 51 sends the opening side limit value which was acquired corresponding to the type of the lens barrel 3 from the adapter controller 51 to the camera controller 21. Note that, the adapter controller 51 acquires the predetermined opening side limit value which is stored in the memory 52 and sends the acquired predetermined opening side limit value to the camera controller 21 when it is not possible to identify the type of the lens barrel 3.

Further, the opening side limit value is stored in the memory 52 as the number of closing steps from the open aperture value. For example, when the opening side limit value is an aperture value (F-value) of F2, if the open aperture value is F1.2 and the number of closing steps of the aperture 34 for changing the aperture value of the optical system from the open aperture value F1.2 to the opening side limit value F2 is 2 steps, the adapter controller 51 stores the opening side limit value as 2 steps. In this way, by storing the opening side limit value as the number of closing steps from the open aperture value, for example, even when the lens position of the zoom lens is changed, it is possible to use the open aperture value corresponding to the lens position of the zoom lens as the basis to find the opening side limit value corresponding to the lens position of the zoom lens. There is no need to store the open aperture value for each lens position of the zoom lens. Note that, the above-mentioned open aperture value, opening side limit value, and number of closing steps are examples. The invention is not limited to these values.

Figure 18:
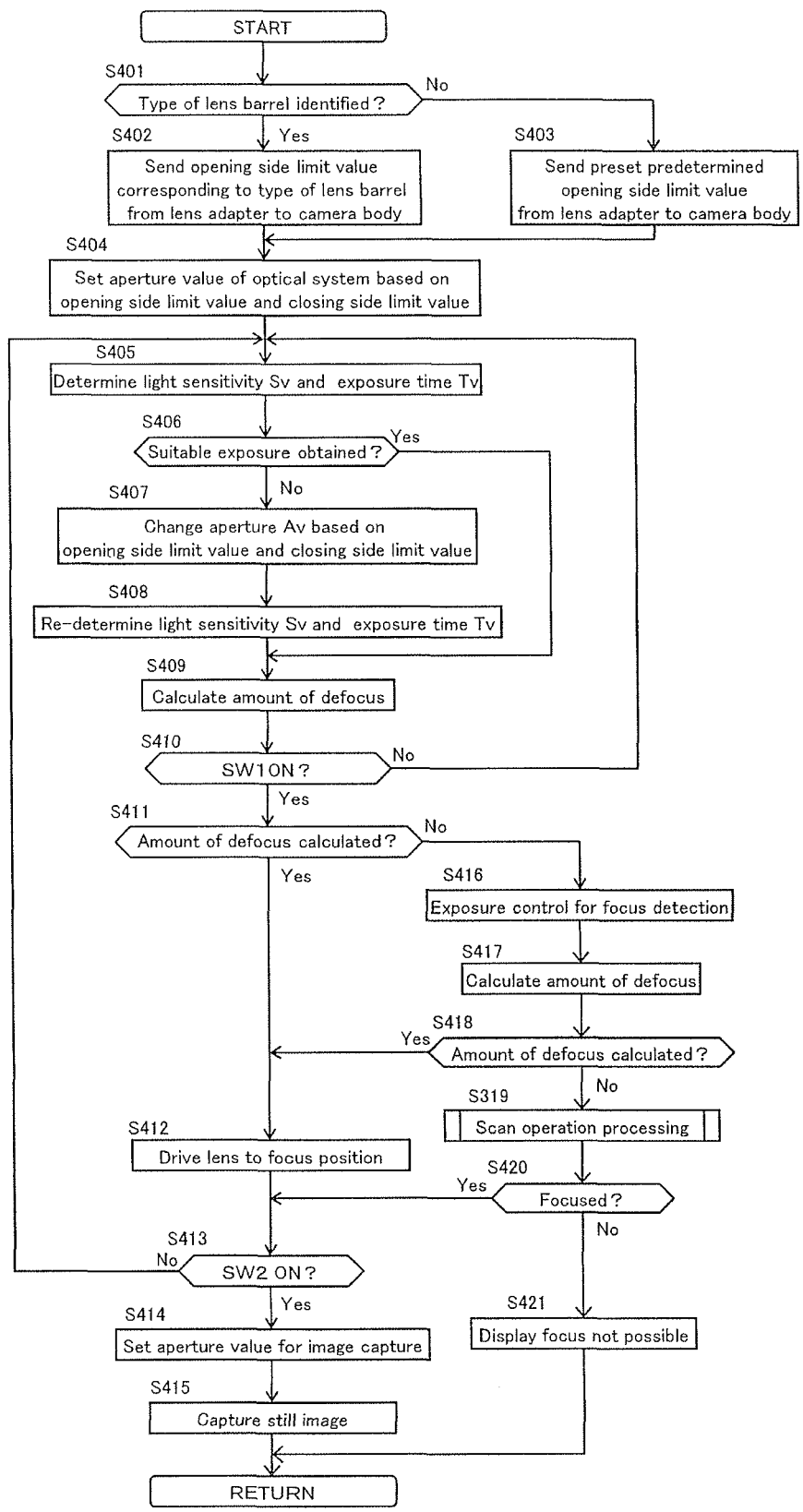
FIG. 18 is a flow chart which shows the operation of a camera according to the fourth embodiment.

Next, an example of the operation of the camera 1b according to the fourth embodiment will be explained. FIG. 18 is a flow chart which shows an example of the operation of the camera 1b according to the fourth embodiment. Note that, the following operation is started by the power of the camera 1b being turned on.

First, at steps S401 to S403, the adapter controller 51 of the mount adapter 5a is used to perform processing for sending the opening side limit value which is stored in the memory 52 to the camera body 2.

Specifically, first, at step S401, the adapter controller 51 is used to identify the type of the lens barrel 3 and to judge if the type of the lens barrel 3 was able to be identified or not. The method for identifying the type of the lens barrel 3 is not particularly limited, but, for example, the memory 52 of the lens adapter 5a stores identification information for identifying the type of the lens barrel 3, and the adapter controller 51 is used to receive from the lens controller 37 lens information including identification information for identifying the type of the lens barrel 3. Further, the adapter controller 51 can compare the identification information of the lens barrel 3 which was received from the lens controller 37 and the identification information of the lens barrel 3 which was stored in the memory 52 of the lens adapter 5a so as to identify the type of the lens barrel 3. When it was possible to identify the type of the lens barrel 3, the routine proceeds to step S402, while when it was not possible to identify the type of the lens barrel 3, the routine proceeds to step S403.

At step S402, the type of the lens barrel 3 is identified, so the adapter controller 51 is used to acquire the opening side limit value which corresponds to the type of the lens barrel 3 from the memory 52 of the lens adapter 5a and to send the acquired opening side limit value to the camera controller 21.

On the other hand, when it was judged at step S401 that it was not possible to identify the type of the lens barrel 3, the routine proceeds to step S403. At step S403, since the type of the lens barrel 3 could not be identified, the adapter controller 51 is used to acquire the preset predetermined opening side limit value from the memory 52 of the lens adapter 5a and to send it to the camera controller 21.

At step S404, the camera controller 21 is used for processing to set the aperture value of the optical system (F-value) to the aperture value for focus detection. Specifically, the camera controller 21 first receives from the adapter controller 51 as the opening side limit value the limit value of the opening side of the aperture value of the optical system at the time of detection of the focus state of the optical system and acquires from the memory 29 as the closing side limit value the limit value of the closing side of the aperture value of the optical system at the time of detection of the focus state of the optical system. Note that, in the present embodiment, the opening side limit value is stored as the number of closing steps from the open aperture value in the memory 52 of the lens adapter 5a, so the camera controller 21 uses the open aperture value and the number of closing steps from the open aperture value as the basis to find the limit value of the opening side (F-value) of the aperture value of the optical system at the time of focus detection as the opening side limit value.

Further, the camera controller 21 uses the acquired opening side limit value and closing side limit value as the basis to set the aperture value of the optical system for focus detection. Specifically, the camera controller 21 sets the aperture value of the optical system at the closing side limit value when the capture aperture value which was set for capturing the image is a value at the closing side from the closing side limit value. For example, in the example which is shown in FIG. 10, the case is shown where in a lens barrel 3 in which the open aperture value is F1.2 and the maximum aperture value (maximum F-value) is F16, the opening side limit value is acquired as F2.8 and the closing side limit value is acquired as F5.6. For example, in FIG. 10A, the capture aperture value is set to F16, and the capture aperture value F16 is a value at the closing side from the closing side limit value F5.6, so the camera controller 21 sets the aperture value of the optical system at the closing side limit value F5.6. Further, at FIG. 10B, the capture aperture value is F8, so, in the same way as in FIG. 10A, the camera controller 21 sets the aperture value of the optical system at the closing side limit value F5.6.

Further, when the capture aperture value which was set for the main capture of the image is the same value as the closing side limit value or a value at the opening side from the closing side limit value, the camera controller 21 sets the aperture value of the optical system at the capture aperture value. For example, at FIG. 10C, the capture aperture value is the same F5.6 as the closing side limit value, so the camera controller 21 sets the aperture value of the optical system at the capture aperture value F5.6. Further, at FIG. 10D, the capture aperture value is set at F4, and the capture aperture value F4 is a value at the opening side from the closing side limit value F5.6, so the camera controller 21 sets the aperture value of the optical system at the capture aperture value F4. Similarly, in FIGS. 10E to 10G as well, in the same way as FIG. 10D, the capture aperture value is a value at the opening side from the closing side limit value, so the camera controller 21 sets the aperture value of the optical system at the capture aperture value.

At step S405, in the same way as step S104 of the first embodiment, at least one of the light receiving sensitivity Sv and the exposure time Tv is changed so that suitable exposure is obtained at the captured picture as a whole.

Further, at step S406, the camera controller 21 is used to judge if suitable exposure has been obtained at the captured picture as a whole by the exposure control of step S405. When just a change of the light receiving sensitivity Sv and exposure time Tv is not enough for suitable exposure of the captured picture as a whole, the routine proceeds to step S407, while when a change of at least one of the light receiving sensitivity Sv and e exposure time Tv is enough for suitable exposure of the captured picture as a whole, the routine proceeds to step S409.

At step S407, when it is judged that just a change of the light receiving sensitivity Sv and exposure time Tv is not enough for obtaining suitable exposure at the captured picture as a whole, the camera controller 21 is used to change the aperture Av. Specifically, the camera controller 21 uses the brightness value By of the captured picture as a whole as the basis to change the aperture Av so that the aperture value of the optical system becomes in a range between the opening side limit value and the closing side limit value when the capture aperture value is a value at the closing side from the closing side limit value. For example, in FIG. 10A, the capture aperture value F16 is a value at the closing side from the closing side limit value F5.6, so the camera controller 21 changes the aperture Av so that the aperture value of the optical system becomes in the range from the opening side limit value F2.8 to the closing side limit value F5.6 and performs exposure control so that suitable exposure is obtained at the captured picture as a whole. Note that, the same is also true of FIG. 10B.

Further, the camera controller 21 uses the brightness value By of the captured picture as a whole as the basis to change the aperture Av so that the aperture value of the optical system becomes one in a range between the opening side limit value and the capture aperture value when the capture aperture value is a value the same as the closing side limit value or a value at the opening side from the closing side limit value. For example, in FIG. 10C, the capture aperture value F5.6 is a value the same as the closing side limit value F5.6, so the camera controller 21 changes the aperture Av so that the aperture value of the optical system becomes in the range from the opening side limit value F2.8 to the capture aperture value F5.6. Further, in FIG. 10D, the capture aperture value F4 is a value at the opening side from the closing side limit value F5.6, so the camera controller 21 changes the aperture Av so that the aperture value of the optical system becomes in a range from the opening side limit value F2.8 to the capture aperture value F4.

Note that, the camera controller 21 leaves the aperture value of the optical system as the capture aperture value when the capture aperture value is the same value as the opening side limit value or a value at the opening side from the opening side limit value. For example, at FIG. 10E, the capture aperture value F2.8 is a value the same as the opening side limit value F2.8, so the camera controller 21 leaves the aperture value of the optical system as the capture aperture value F2.8. Note that, the same is true in FIGS. 10F to 10G as well. Further, in the present embodiment, for example, as shown in FIGS. 10A to 10D, when it is possible to change the aperture Av within the range of a predetermined aperture value, the camera controller 21, for example, as shown in FIGS. 10A to 10D, changes the aperture Av to the opening side with some margin so that it is not necessary to again change the aperture Av even when the brightness value By of the captured picture as a whole again changes.

Note that the processing of steps S408 to S421 is similar to the processing of steps step S107 to S120 of the first embodiment, so the explanation will be omitted.

As explained above, in the fourth embodiment, the limit value of the opening side of the aperture value of the optical system at the time of focus detection is stored as the opening side limit value in the memory 52 of the lens adapter 5a. The adapter controller 51 uses the lens information which was received from the lens barrel 3 as the basis to confirm the type of the lens barrel 3 and sends the opening side limit value corresponding to the lens barrel 3 to the camera controller 21. Due to this, the camera controller 21 uses the opening side limit value which was received from the adapter controller 51 and the closing side limit value which was acquired from the memory 29 as the basis to set the aperture value of the optical system at the time of focus detection. Specifically, in the fourth embodiment, for example, as shown in FIGS. 10A to 10D, when the aperture value at the time of capture of an image is at the closing side from the opening side limit value, by limiting the aperture value of the optical system at the time of focus detection to the closing side from the opening side limit value, it is possible to make the amount of movement of the image plane of the optical system accompanying a change of the aperture value of the optical system a predetermined amount or less even when changing the aperture value of the optical system from the aperture value at the time of focus detection to the capture aperture value for capturing an image and as a result it is possible to make the focal position which was detected at focus detection within the range of the depth of field of the optical system at the time of capture of an image, so it is possible to capture an image focused on the object.

Further, in the fourth embodiment, as shown in FIGS. 10A to 10B, when the aperture value at the time of capture of an image is a value at the closing side from the closing side limit value, it is possible to limit the aperture value of the optical system at the time of focus detection to a value at the opening side from the closing side limit value so as to effectively prevent the occurrence of vignetting at the time of focus detection and it is possible to suitably detect the focus state of the optical system. Furthermore, in the present embodiment, as shown in FIGS. 10A to 10G, by limiting the aperture value of the optical system at the time of focus detection so as not to become a value at the closing side from the capture aperture value, when capturing an image, the depth of field at the time of capture of the image ends up becoming shallower than the depth of field at the time of focus detection. At the time of capture of the image, it is possible to effectively prevent an object focused at the time of focus detection from ending up deviating from the depth of field of the optical system. As a result, it is possible to capture an image focused on an object well.

Fifth Embodiment

Figure 19:
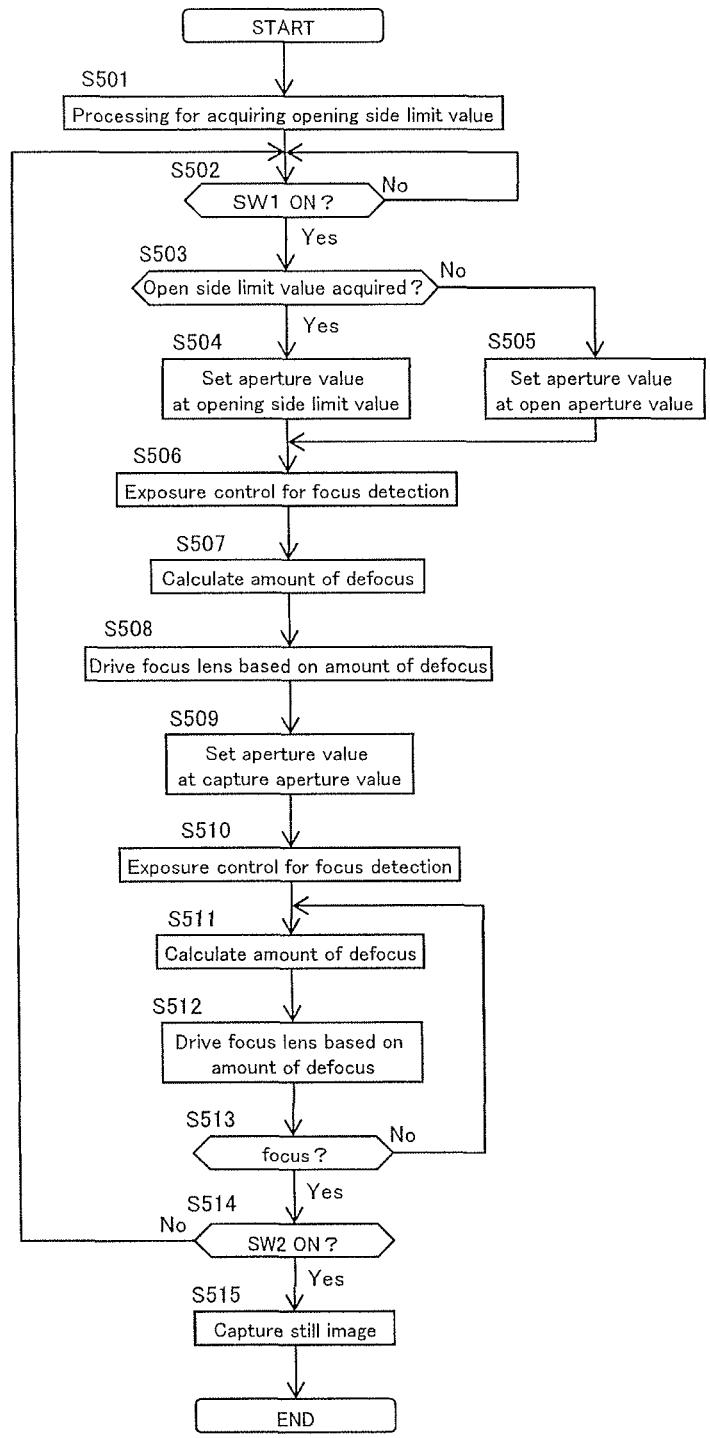
FIG. 19 is a flow chart which shows the operation of a camera according to a fifth embodiment.

Next, a fifth embodiment of the present invention will be explained with reference to the drawings. In the fifth embodiment, the camera 1b which is shown in FIG. 1 operates in the same way as the camera 1 according to the first embodiment other than operating as shown in FIG. 19. FIG. 19 is a flow chart which shows the operation of the camera 1 according to the fifth embodiment. Note that, the operation of the camera 1 which is shown in FIG. 19 is stated by the power of the camera 1 being turned on.

In the fifth embodiment as well, as shown in FIG. 19, first, at step S501, the camera controller 21 is used to acquire the opening side limit value. Specifically, the camera controller 21 acquires as the opening side limit value from the lens controller 37 the limit value of the opening side of the aperture value of the optical system at the time of detection of the focus state of the optical system. Note that, the opening side limit value is stored in the memory 39 as the number of closing steps from the open aperture value, so the camera controller 21 uses the open aperture value and the number of closing steps from the open aperture value as the basis to find the limit value of the opening side of the aperture value of the optical system (F-value) at the time of focus detection as the opening side limit value.

At step S502, the camera controller 21 is used to judge if the shutter release button which was provided at the operating unit 28 is half pressed (first switch SW1 on). When the shutter release button is half pressed, the routine proceeds to step S503. On the other hand, when the shutter release button is not half pressed, the routine stands by at step S502.

At step S503, the camera controller 21 is used to judge if the opening side limit value could be acquired at step S501. When it is judged that the opening side limit value could be acquired, the routine proceeds to step S504, while when it is judged that the opening side limit value could not be acquired, the routine proceeds to step S505. Here, the lens barrel 3 according to the present embodiment stores the opening side limit value in the memory 39, while the camera controller 21 acquires the opening side limit value through the lens controller 37, so the routine proceeds to step S504. On the other hand, depending on the type of the lens barrel, sometimes the lens barrel does not store the opening side limit value. When using such a lens barrel, the camera controller 21 cannot acquire the opening side limit value from the lens barrel. In this case, it is judged that the opening side limit value cannot be acquired and the routine proceeds to step S505.

Figure 20:
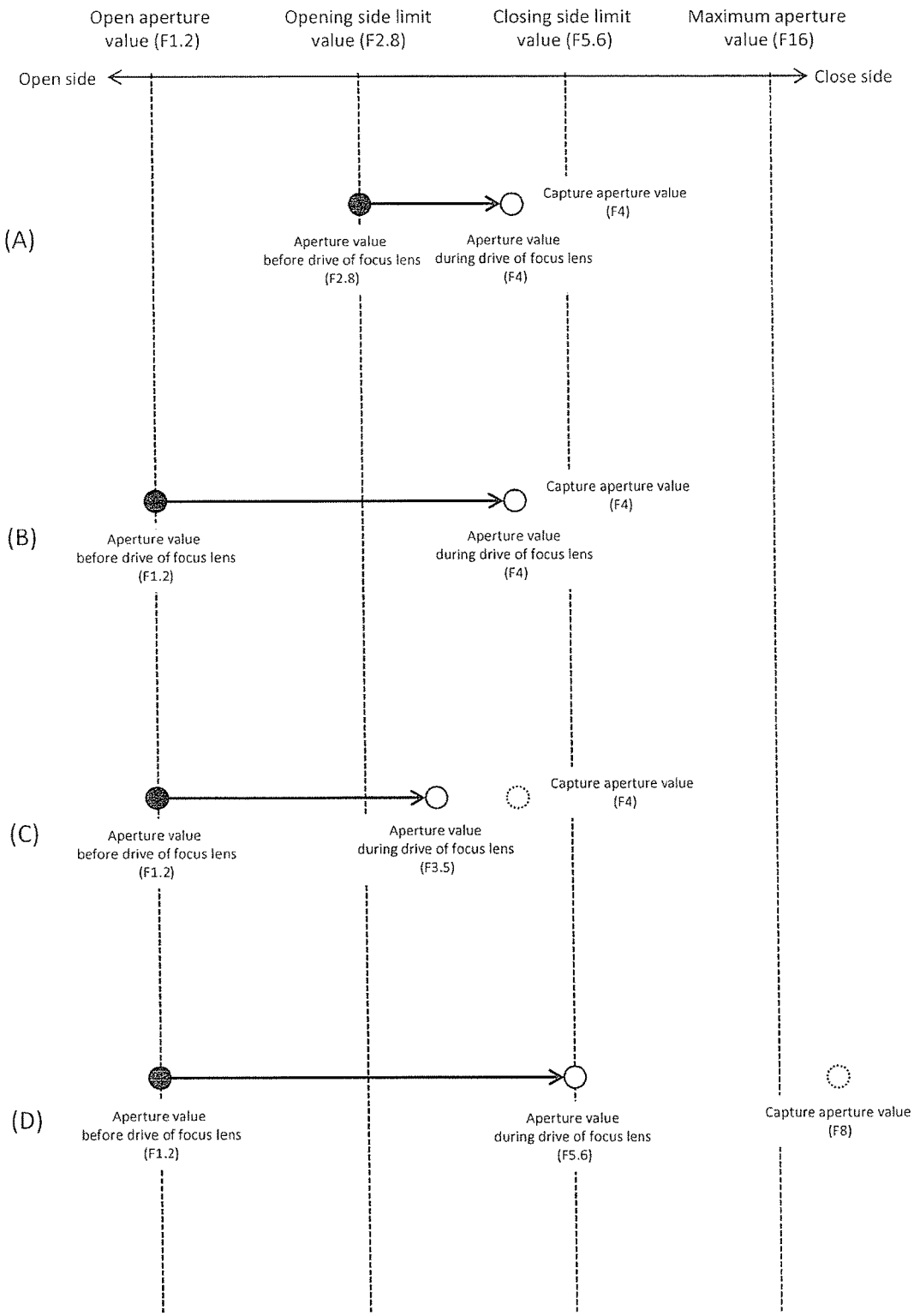
FIG. 20 is a view which shows an example of the relationship between an aperture value at the time of focus detection which was set at the fifth embodiment and a capture aperture value.

At step S504, the opening side limit value is acquired, so the camera controller 21 is used to set the aperture value of the optical system (F-value) at the opening side limit value. Here, FIG. 20 is a view which shows one example of the relationship between the aperture value which is set for focus detection at the fifth embodiment and the capture aperture value. Note that, in the example which is shown in FIG. 20, the situation is shown where in a lens barrel 3 with an open aperture value of F1.2 and a maximum aperture value (maximum F-value) of F16, the opening side limit value is acquired as F2.8. At step S504, the opening side limit value is acquired, so as shown in FIG. 20A, the aperture value of the optical system is set to the opening side limit value F2.8.

On the other hand, when it was judged at step S503 that the opening side limit value could not be acquired, the routine proceeds to step S505. The camera controller 21 is used to set the aperture value of the optical system (F-value) at the open aperture value. For example, at step S505, as shown in FIG. 20B, the aperture value of the optical system is set at the open aperture value F1.2.

At steps S506 to S508, in the same way as steps S115, S116, and S111 of the first embodiment, exposure control for focus detection is performed, processing for calculation of the amount of defocus is performed, and the calculated amount of defocus is used as the basis to start the drive operation of the focus lens 32.

Further, if the drive operation of the focus lens 32 is started, the routine proceeds to step S509. At step S509, the camera controller 21 is used to set the aperture value of the optical system at the capture aperture value. For example, at FIG. 20A, at step S504, the aperture value of the optical system is set at the opening side aperture value F2.8, but at step S509, the aperture value of the optical system is set at the capture aperture value F4. Further, at FIG. 20B, at step S505, the aperture value of the optical system is set at the open aperture value F1.2, but at step S509, the aperture value of the optical system is set at the capture aperture value F4.

At step S510, in the same way as in step S506, the camera controller 21 is used for exposure control for focus detection. Specifically, the camera controller 21 calculates the brightness value SpotBv in a predetermined region which includes the focus detection area, uses the calculated brightness value SpotBv and the capture aperture value which corresponds to the aperture Av which was set at step S509 as the basis to determine the light receiving sensitivity Sv and the exposure time Tv, and uses the determined light receiving sensitivity Sv and exposure time Tv as the basis to set the shutter speed of the shutter 23, the capture sensitivity of the image pickup device 22, etc. Note that, at step S510 as well, in the same way as step S506, by leaving the aperture Av corresponding to the capture aperture value which was set at step S509 as is and changing the light receiving sensitivity Sv and exposure time Tv, exposure control is performed for the image pickup device 22.

Further, at step S511, the amount of defocus is calculated in the state where the aperture value of the optical system is set at the capture aperture value. At the following step S512, the amount of defocus which was calculated at step S511 is used as the basis to drive the focus lens 32.

At step S513, the camera controller 21 is used to judge focusing. Specifically, the camera controller 21 judges whether the absolute value of the calculated amount of defocus is a predetermined value or less. When the absolute value of the calculated amount of defocus is a predetermined value or less, it is judged that the focus state of the optical system is a focused state and the routine proceeds to step S514, while when the absolute value of the calculated amount of defocus is larger than the predetermined value, it is judged that the image is not focused and the routine proceeds to step S511 where the calculation of the amount of defocus and the drive of the focus lens 32 based on the calculated amount of defocus are repeated.

When it is judged that the image has been focused at step S513, the routine proceeds to step S514 where the camera controller 21 is used to judge if the shutter release button has been fully pressed (second switch SW2 is on). When the second switch SW2 is on, the routine proceeds to step S515, while when the second switch SW2 is not on, the routine returns to step S502.

At step S515, the image pickup device 22 is used to capture an image, and the captured image data is stored at the memory 24. Note that, in the present embodiment, at step S509, the aperture value of the optical system is set at the capture aperture value, so the image is captured with that capture aperture value.

In this way, in the fifth embodiment, when it is not possible to acquire an opening side limit value from the lens barrel 3, the aperture value of the optical system is set at the open aperture value to perform focus detection and the results of this focus detection by the open aperture value are used as the basis to start the drive operation of the focus lens 32 and change the aperture value of the optical system from the open aperture value to the capture aperture value for focus detection during the drive operation of the focus lens 32. In this way, in the present embodiment, first, the aperture value of the optical system is set at the open aperture value for focus detection, it is possible to suitably detect the focus state of the optical system whereby even when the brightness of the object is low. If setting the aperture value of the optical system at the capture aperture value for focus detection during the drive operation of the focus lens 32, it is possible to effectively prevent a change in the image plane accompanying a change of the aperture value from causing an object which was focused at the focus detection to end up losing focus at the time of capture and possible to suitably capture an image focused on an object.

Further, in the fifth embodiment, when it is possible to obtain an opening side limit value from the lens barrel 3, the aperture value of the optical system is set not at the open aperture value, but at the opening side limit value for focus detection. Due to this, in the fifth embodiment, it is possible to make the amount of movement of the image plane of the optical system in the case of changing the aperture value of the optical system from the opening side limit value to the capture aperture value a predetermined amount or less and possible to make the focus position which was detected by the opening side limit value within a range of the depth of field at the time of capture. For this reason, in the present embodiment, even if it is not possible to detect the focal position by the capture aperture value, it is possible to capture an image focused on the object.

Sixth Embodiment

Figure 21:
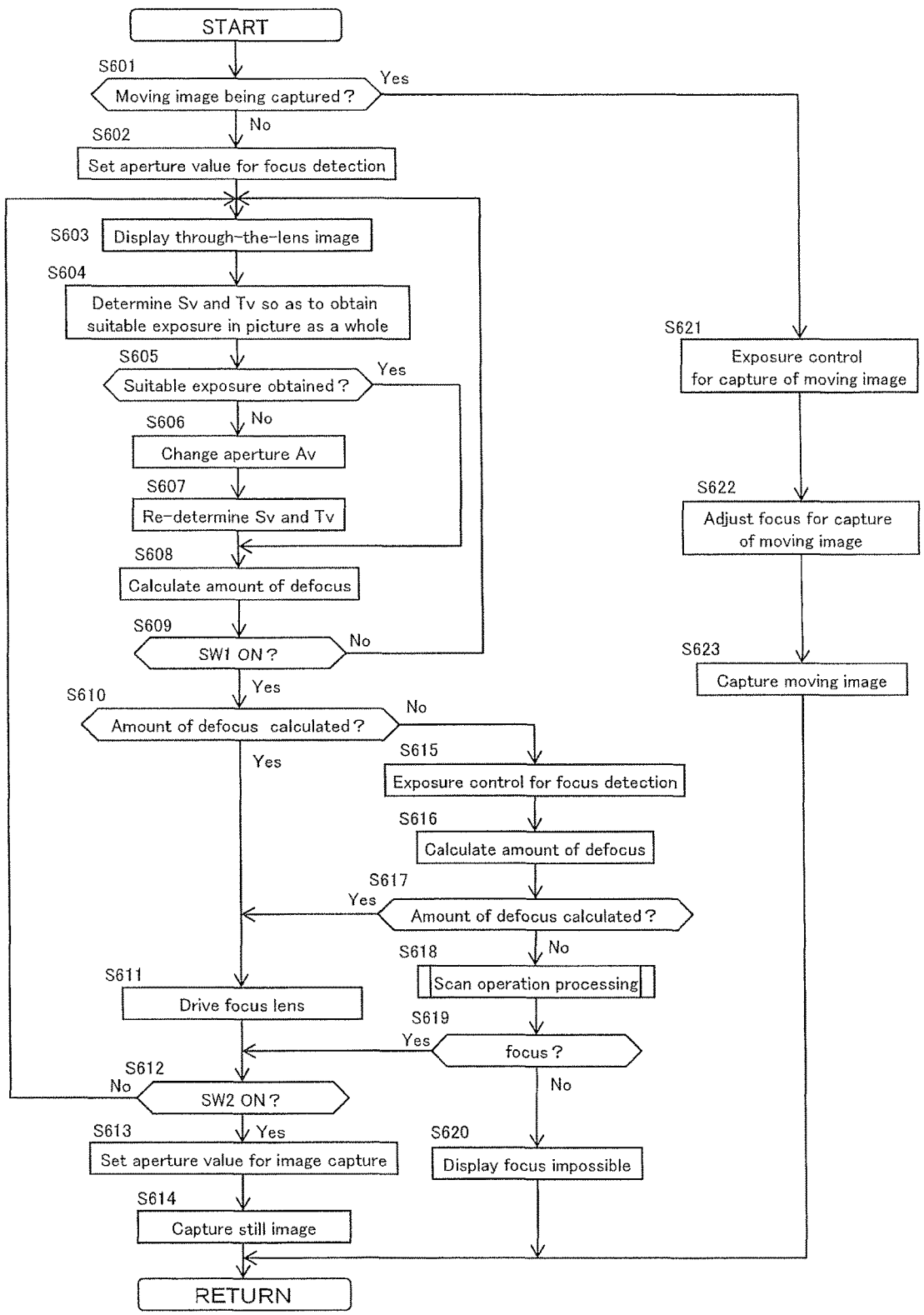
FIG. 21 is a flow chart which shows the operation of a camera according to a sixth embodiment.

Next, a sixth embodiment of the present invention will be explained based on the drawings. In the sixth embodiment, in the camera 1 which is shown in FIG. 1, the same operation as the camera 1 according to the first embodiment is performed other than the operations such as shown in FIG. 21. FIG. 21 is a flow chart which shows the operation of the camera 1 according to the sixth embodiment. Note that, the operation of the camera 1 which is shown in FIG. 21 is started by the power of the camera 1 being turned on.

In the sixth embodiment, as shown in FIG. 21, first, at step S601, in the same way as step S101 of the first embodiment, it is judged if a moving image is being captured. When it is judged that a moving image is being captured, the routine proceeds to step S621, while when it is judged that a moving image is not being captured, the routine proceeds to step S602.

At step S602, the camera controller 21 is used to perform processing for setting the aperture value of the optical system (F-value) at the aperture value for focus detection. Specifically, the camera controller 21 sets the aperture value of the optical system at an aperture value suitable for focus detection when the capture aperture value which was set for capturing an image is larger (closer) than the aperture value suitable for focus detection enabling a good precision of focus detection to be obtained. For example, when the aperture value which is suited for focus detection is F5.6 and the capture aperture value is F16, the camera controller 21 sets the aperture value of the optical system at the aperture value F5.6 which is suited for focus detection. Further, when the capture aperture value is less than the aperture value which is suited for focus detection, the camera controller 21 sets the aperture value of the optical system at the capture aperture value. For example, when the aperture value which is suited for focus detection is F5.6 and the capture aperture value is F4.0, the camera controller 21 sets the aperture value of the optical system at the capture aperture value F4.0. The set aperture value is sent from the camera controller 21 to the lens controller 37, while the size of the aperture 34 is adjusted in accordance with the set aperture value. Note that, when a photographer selects an aperture priority mode, manual exposure mode, or other exposure setting mode, the camera controller 21 sets the capture aperture value which was set by the photographer as it is as the aperture value of the optical system.

At step S603, in the same way as step S103 of the first embodiment, a through-the-lens image is generated and the through-the-lens image is displayed. Further, at steps S604 and S605, in the same way as steps S104, S105 of the first embodiment, at least one of the light receiving sensitivity Sv and exposure time Tv in the exposure control values is changed so as to obtain suitable exposure at the captured picture as a whole and it is judged if suitable exposure is obtained at the captured picture as a whole. When just a change of the light receiving sensitivity Sv and the exposure time Tv is not enough for suitable exposure of the captured picture as a whole, the routine proceeds to step S606, while when change of at least one of the light receiving sensitivity Sv and exposure time Tv gives suitable exposure at the captured picture as a whole, the routine proceeds to step S608.

At step S606, it is judged that suitable exposure cannot be obtained at the captured picture as a whole by just changing the light receiving sensitivity Sv and exposure time Tv, so the camera controller 21 is used to change the aperture Av. Specifically, the camera controller 21 uses the brightness value By of the captured picture as a whole as the basis to calculate the aperture Av and changes the aperture value of the optical system to a value corresponding to the calculated aperture Av. Further, in the present embodiment, the camera controller 21 changes the aperture Av so that the aperture value of the optical system becomes within the range of the capture aperture value or less. Further, the camera controller 21 changes the aperture Av in the direction where the aperture value of the optical system becomes smaller (direction where aperture size becomes larger) with some margin so that it is not necessary to again change the aperture Av even when the brightness value By of the captured picture as a whole again changes.

The processing of steps S607 to S620 are similar to the processing of steps S107 to S120 of the first embodiment, so the explanation will be omitted.

Note that, when it is judged at step S601 that a moving image is being captured, the routine proceeds to step S621. At step S621, the camera controller 21 is used for exposure control so as to obtain exposure suitable for capturing a moving image. Specifically, the camera controller 21 measures the light by multi-pattern photometry since it gives priority to the appearance of the moving image, calculates the brightness value By of the captured picture as a whole, and uses the calculated brightness value By as the basis to determine the light receiving sensitivity Sv and exposure time Tv so as to obtain suitable exposure at the captured picture as a whole. In particular, during capture of a moving image, the aperture Av is left fixed and only the light receiving sensitivity Sv and exposure time Tv are changed for exposure control.

Further, at step S622, the camera controller 21 is used to detect the focus state of the optical system and the focus is adjusted by the focus lens 32 in accordance with the detected focus state. Specifically, the camera controller 21 uses the captured image data as the basis to calculate the amount of defocus and judge if the amount of defocus could be calculated in the same way as steps S611 and S615 to S619. Further, when the amount of defocus is calculated, the calculated amount of defocus is used as the basis to drive the focus lens 32, while when the amount of defocus could not be calculated, scan operation processing is performed. Further, the routine proceeds to step S623 where the image pickup device 22 is used to capture a moving image, and the image data of the moving image which is captured by the camera controller 21 is stored in the memory 24.

In the above way, in the sixth embodiment, when the capture aperture value for capturing an image is larger than a predetermined aperture value suitable for focus detection, the aperture 34 is controlled so that the aperture value of the optical system becomes an aperture value suitable for focus detection and the focus state of the optical system is detected by the aperture value suitable for focus detection. Due to this, in the sixth embodiment, the following effects can be exhibited. That is, in the past, the aperture value at the time of capture of an image sometimes became smaller than the aperture value at the time of focus detection. In such a case, sometimes the depth of field when capturing an image became shallower than the depth of field at the time of focus detection, the object which was focused at the time of focus detection ends up deviating from the depth of field of the optical system at the time of capturing the image, and it was not possible to capture an image focused at the object. As opposed to this, in the present embodiment, since the aperture value of the optical system becomes an aperture value suitable for focus detection, the aperture value at the time of capture of an image becomes larger than the aperture value at the time of focus detection, so the depth of field at the time of capture of the image becomes deeper than the depth of field at the time of focus detection. As a result, the object which was focused at the time of focus detection becomes within the depth of field of the optical system even at the time of capturing an image, so it is possible to capture an image focused at the object.

Further, in the sixth embodiment, the light receiving sensitivity Sv and exposure time Tv in the exposure control values are changed with priority for exposure control. Further, when the desired exposure cannot be obtained with just a change of the light receiving sensitivity Sv and exposure time Tv, the aperture Av is changed for exposure control. Due to this, in the sixth embodiment, it is possible to effectively prevent the aperture value of the optical system from being changed corresponding to a change of the aperture Av, so the following effects can be exhibited. That is, change of the aperture value of the optical system accompanies mechanical operation of the aperture 34, so at the time of focus detection, by changing the light receiving sensitivity Sv and exposure time Tv with priority, it is possible to shorten the time which is required for focus detection. Further, to obtain a brightness suitable for focus detection at the time of focus detection by the phase difference detection system, sometimes a plurality of image data obtained for each predetermined time period are added and the added image data is used as the basis to calculate the amount of defocus. Here, the conversion coefficient for converting the amount of deviation of the image based on the image data to the amount of defocus is a value corresponding to the aperture value of the optical system, so if the aperture value of the optical system ends up changing at the time of focus detection, sometimes the added image data cannot be used as the basis to suitably calculate the amount of defocus. Even in such a case, according to the present embodiment, it is possible to change the light receiving sensitivity Sv and exposure time Tv with priority to suitably calculate the amount of defocus, so it is possible to improve the precision of focus detection. Furthermore, when displaying a through-the-lens image or when capturing a moving image, if the aperture value of the optical system is changed, for example, sometimes the depth of field ends up changing, the object ends up becoming blurred, and the appearance of the image otherwise ends up falling. In such a case, it is possible to change the light receiving sensitivity Sv and exposure time Tv with priority to improve the appearance of the through-the-lens image and moving image. In particular, when capturing a moving image, the aperture value of the optical system is set as the capture aperture value, so it is possible to capture a moving image well. Further, in the sixth embodiment, even if the brightness of the object changes, it is possible to change the aperture Av in the exposure control values with a margin so that it is not necessary to again change the aperture value of the optical system and thereby lower the frequency of change of the aperture value of the optical system and possible to improve the appearance of the through-the-lens image or moving image.

Seventh Embodiment

Figure 22:
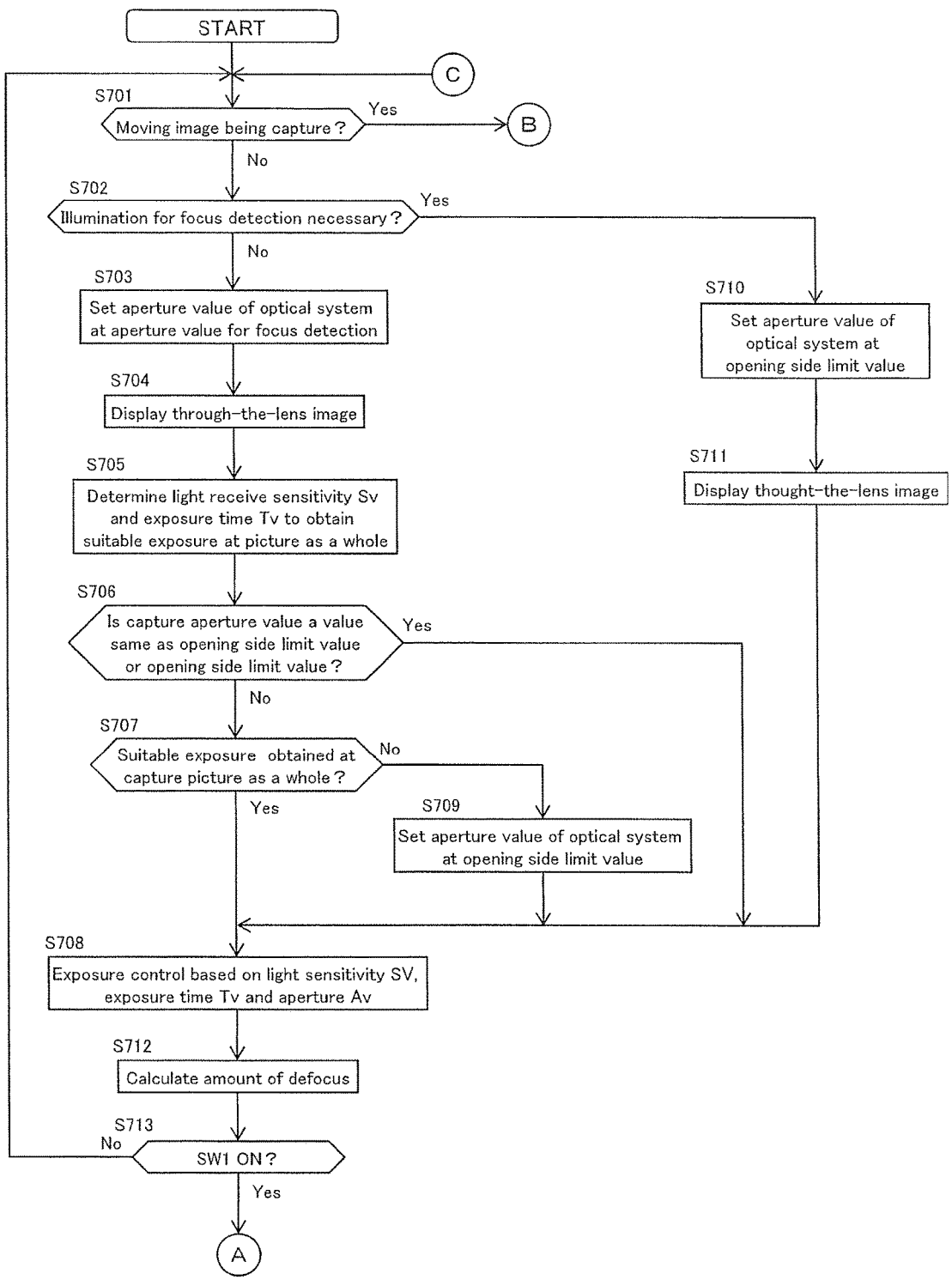
FIG. 22 is a flow chart (part 1) which shows the operation of a camera according to a seventh embodiment.
Figure 23:
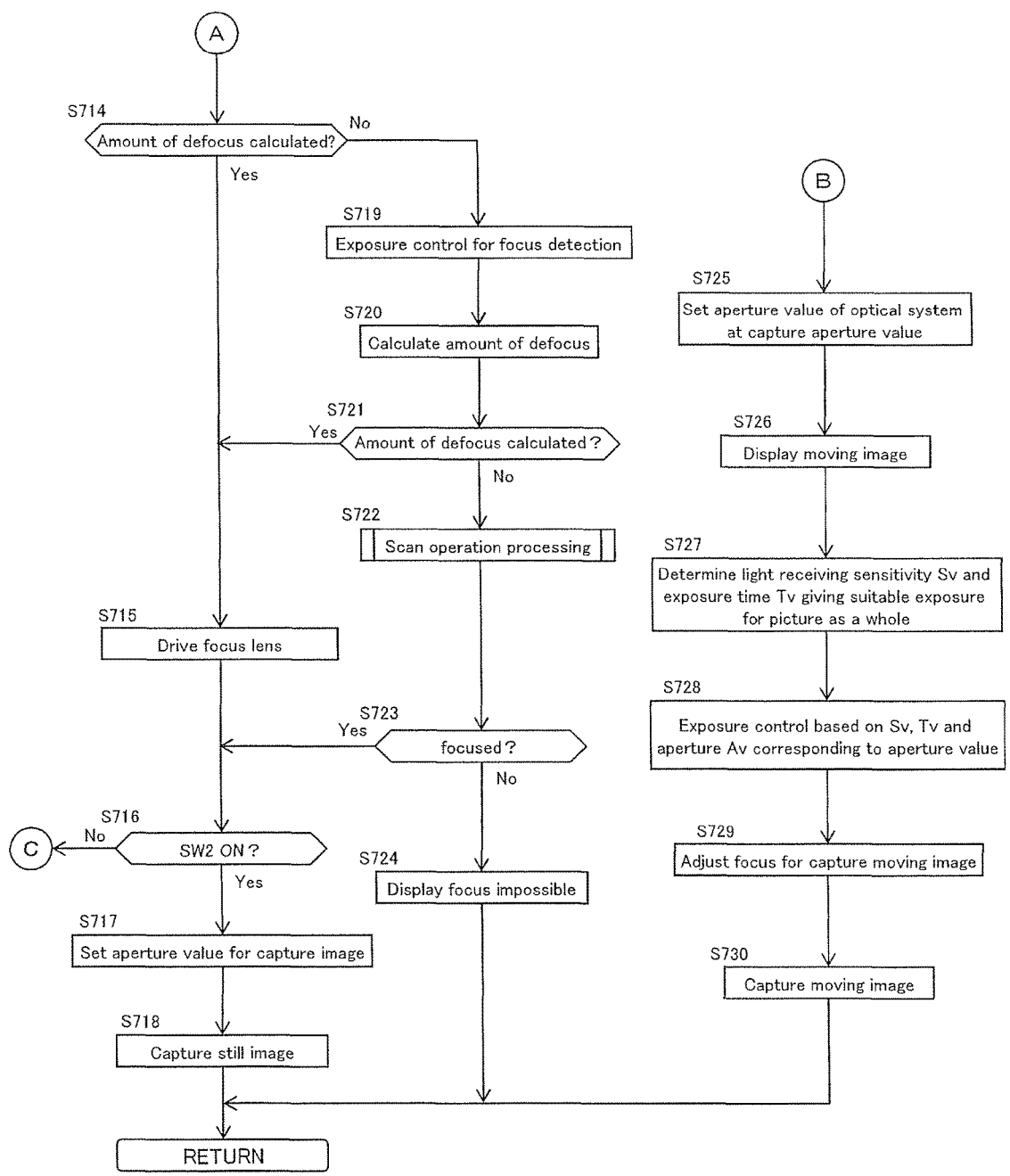
FIG. 23 is a flow chart (part 2) which shows the operation of a camera according to a seventh embodiment.

Next, the seventh embodiment of the present invention will be explained based on the drawings. In the seventh embodiment, in the camera 1 which is shown in FIG. 1, a similar operation as with the camera 1 according to the first embodiment is performed except for the operation such as shown in FIG. 22 and FIG. 23. FIG. 22 and FIG. 23 are flow charts which show the operation of the camera 1 according to the seventh embodiment. Note that, the operation of the camera 1 which is shown in FIG. 22 and FIG. 23 is started by the power of the camera 1 being turned on.

In the seventh embodiment, as shown in FIG. 22, first, at step S701, in the same way as step S101 of the first embodiment, it is judged if a moving image is being captured. When it is judged that a moving image is being captured, the routine proceeds to step S725 which is shown in FIG. 23, while when it is judged that a moving image is not being captured, the routine proceeds to step S702.

At step S702, the camera controller 21 is used to detect the brightness of the object based on the output of the image pickup device 22 and judge if emission of illumination light for focus detection is required by the detected brightness of the object. For example, when the brightness of the object is less than a predetermined brightness value for suitable focus detection, the camera controller 21 can judge that the brightness of the object is not sufficient for detection of the focus state of the optical system and the light 210 has to emit illumination light for focus detection. When it is judged that emission of illumination light for focus detection is necessary, the routine proceeds to step S710, while when it is judged that emission of illumination light for focus detection is not necessary, the routine proceeds to step S703.

At step S703, in the same way as step S102 of the first embodiment, the opening side limit value is acquired from the lens barrel 3, the closing side limit value is acquired from the memory 29, and the acquired opening side limit value and closing side limit value are used as the basis to set the aperture value of the optical system for focus detection. Further, at steps S704 and S705, in the same way as steps S103 and S104 of the first embodiment, the through-the-lens image is displayed, then the light receiving sensitivity Sv and the exposure time Tv are determined so that suitable exposure is obtained at the captured picture as a whole.

Further, at step S706, the camera controller 21 is used to judge if the capture aperture value is the same value as the opening side limit value or a value at the opening side from the opening side limit value. When the capture aperture value is the same value as the opening side limit value or a value at the opening side from the opening side limit value, the routine proceeds to the later explained step S708, while when the capture aperture value is not the same value as the opening side limit value or a value at the opening side from the opening side limit value, the routine proceeds to step S707. For example, in the example which is shown in FIGS. 10A to 10D, the capture aperture value is a value at the closing side from the opening side limit value, so the routine proceeds to step S707. On the other hand, in the example which is shown in FIGS. 10E to 10G, the capture aperture value is the same value as the opening side limit value or a value at the closing side from the opening side limit value, so the routine proceeds to step S708.

At step S707, the camera controller 21 is used to judge if suitable exposure is obtained at the captured picture as a whole based on the aperture Av which corresponds to the aperture value which was set at step S703 and the light receiving sensitivity Sv and the exposure time Tv which were determined at step S705. When it is judged that suitable exposure is obtained at the captured picture as a whole, the routine proceeds to step S708. At step S708, the camera controller 21 uses the aperture Av corresponding to the aperture value which was set at step S703 and the light receiving sensitivity Sv and exposure time Tv which are determined at step S705 as the basis for exposure control for the image pickup device 22.

On the other hand, when it is judged at step S707 that suitable exposure is not obtained at the captured picture as a whole, the routine proceeds to step S709. At step S709, the camera controller 21 is used to set the aperture value of the optical system at the opening side limit value so that suitable exposure is obtained at the captured picture as a whole. Further, at the following step S708, the camera controller 21 uses the aperture Av corresponding to the aperture value of the optical system (opening side limit value) which was set at step S709 as the basis to determine the light receiving sensitivity Sv and exposure time Tv giving suitable exposure at the captured picture as a whole and uses the determined light receiving sensitivity Sv and exposure time Tv and the aperture Av corresponding to the aperture value of the optical system (opening side limit value) which was set at step S709 as the basis for control of exposure of the image pickup device 22. For example, in the example which is shown in FIG. 10A, at step S703, the closing side limit value F5.6 is set as the aperture value of the optical system for focus detection, but when suitable exposure of the captured picture as a whole cannot be obtained with an aperture value of the optical system of F5.6, at this step S709, the aperture value of the optical system is set at the opening side limit value F2.8. Note that, in the present embodiment, at step S709, the aperture value of the optical system is set to the opening side limit value, but the invention is not limited to this. For example, the aperture value of the optical system may be set to an aperture value of a value in the range between the closing side limit value and the opening side limit value by which suitable exposure can be obtained at the captured picture as a whole.

Further, when, at step S706, it is judged that the capture aperture value is the same value as the opening side limit value or a value at the opening side from the opening side limit value, the routine proceeds to step S708. Here, as explained above, when it is judged that the capture aperture value is the same value as the opening side limit value or a value at the opening side from the opening side limit value, as shown in the example which is shown in FIGS. 10E to 10G, at step S703, the aperture value of the optical system for focus detection is set at the capture aperture value. For this reason, in this case, at step S708, the camera controller 21 uses the brightness value By of the captured picture as a whole and the aperture value of the optical system which is set at step S703, that is, the aperture Av which corresponds to the capture aperture value, as the basis to determine the light receiving sensitivity Sv and the exposure time Tv by which suitable exposure is obtained at the captured picture as a whole and uses the determined light receiving sensitivity Sv and exposure time Tv and the aperture Av which corresponds to the aperture value of the optical system (capture aperture value) as the basis to control exposure for the image pickup device 22.

Furthermore, when it was judged at step S702 that illumination for focus detection was necessary, the routine proceeds to step S710. At step S710, the camera controller 21 is used to set the aperture value of the optical system at the opening side limit value. Further, at the following step S711, in the same way as step S704, the through-the-lens image starts to be displayed, then the routine proceeds to step S708 where the light 210 is used for emission of illumination light for focus detection, the brightness value By which was obtained by emission of the illumination light and the aperture Av corresponding to the aperture value of the optical system (opening side limit value) which was set at step S710 are used as the basis to determine the light receiving sensitivity Sv and exposure time Tv, and the determined light receiving sensitivity Sv and exposure time Tv and the aperture Av corresponding to the aperture value of the optical system (opening side limit value) are used as the basis for control of exposure of the image pickup device 22.

The processing of the following steps S712 to S724 is similar to the processing of steps S108 to S120 of the first embodiment, so its explanations will be omitted.

Further, when it is judged at step S701 which is shown in FIG. 22 that a moving image is being captured, the routine proceeds to step S725 which is shown in FIG. 23. At step S725, the camera controller 21 is used to give priority to the appearance of the moving image and set the aperture value of the optical system at the capture aperture value, and, at the following step S726, the image data of the moving image which is captured by the image pickup device 22 is displayed through the camera controller 21 on the electronic viewfinder 26. Further, at step S727, the camera controller 21 is used to measure the light by multi-pattern photometry, and the calculated brightness value By of the captured picture as a whole and aperture Av corresponding to the aperture value (capture aperture value) which was set at step S725 are used as the basis to determine the light receiving sensitivity Sv and exposure time Tv so as to obtain suitable exposure at the captured picture as a whole.

At step S728, the camera controller 21 uses the light receiving sensitivity Sv and exposure time Tv which were determined at step S727 and the aperture Av corresponding to the aperture value (capture aperture value) which was set at step S725 as the basis for control of exposure for the image pickup device 22. Further, at step S729, the camera controller 21 is used for detection of the focus state of the optical system and for adjustment of the focus of the focus lens 32 corresponding to the detected focus state. Specifically, the camera controller 21 uses the image data which was obtained by the exposure which was set at step S728 as the basis to calculate the amount of defocus and judge if amount of defocus could be calculated. When the amount of defocus is calculated, the calculated amount of defocus is used as the basis to drive the focus lens 32, while when the amount of defocus is not calculated, scan operation processing is performed in the same way as step S722. Further, the routine proceeds to step S730 where the image pickup device 22 and the camera controller 21 are used to capture a moving image.

Next, the operation of the camera 1 of the seventh embodiment will be explained based on FIG. 10. For example, in the example which is shown in FIG. 10A, the capture aperture value F16 is a value at the closing side from the closing side limit value F5.6, so first the aperture value of the optical system is set at the closing side limit value F5.6 (step S703). Further, when it is judged that suitable exposure can be obtained in the state setting the aperture value of the optical system at the closing side limit value F5.6 (step S707=Yes), exposure control for focus detection is performed by a closing side limit value F5.6 before the shutter release button is half pressed (step S708), while when it is judged that suitable exposure cannot be obtained in the state setting the aperture value of the optical system at the closing side limit value F5.6 (step S707=No), the aperture value of the optical system is changed to the opening side limit value F2.8 (step S709) and exposure control for focus detection is performed by an opening side limit value F2.8 before the shutter release button is half pressed (step S708). Further, after the shutter release button is half pressed, the focus lens 32 is driven based on the amount of defocus which was calculated before the shutter release button was half pressed without performing exposure control for focus detection (step S715). Note that, when the reliability of the amount of defocus is low and the amount of defocus cannot be calculated (step S714=No), the aperture value of the optical system is changed in the range between the closing side limit value and opening side limit value, and the changed aperture value is used as the basis for exposure control for focus detection (step S719). After the focus is adjusted by the focus lens 32, the aperture value of the optical system is changed to the capture aperture value F16 (step S717) and a still image is captured by the capture aperture value F16 (step S718). Note that, the same thing is done in the example which is shown in FIG. 10B as well.

Further, in the example which is shown in FIG. 10D, the capture aperture value F4 is a value at the opening side from the closing side limit value F5.6, so, first, the aperture value of the optical system is set to the capture aperture value F4 (step S703). Further, when it is judged that suitable exposure is obtained in the state setting the aperture value of the optical system at the capture aperture value F4 (step S707=Yes), exposure control for focus detection is performed by the capture aperture value F4 before the shutter release button is half pressed (step S708). On the other hand, when it is judged that suitable exposure is not obtained in the state setting the aperture value of the optical system at the capture aperture value F4 (step S707=No), the aperture value of the optical system is changed to the opening side limit value F2.8 (step S709) and exposure control for focus detection is performed by the opening side limit value F2.8 before the shutter release button is half pressed (step S708). Further, after the shutter release button is half pressed, the focus lens 32 is driven based on the amount of defocus which was calculated before the shutter release button was half pressed without performing exposure control for focus detection (step S715). Note that, when the reliability of the amount of defocus is low and the amount of defocus cannot be calculated (step S714=No), the aperture value of the optical system is changed within the range of the capture aperture value and the opening side limit value, and the changed aperture value is used as the basis for exposure control for focus detection (step S719). Further, after the focus is adjusted by the focus lens 32, the aperture value of the optical system is changed to the capture aperture value F4 (step S717) and a still image is captured by the capture aperture value F4 (step S718). Note that, in the example which is shown in FIGS. 10C and 10E as well, the same thing is done as in the example which is shown in FIG. 10D.

Furthermore, in the example which is shown in FIG. 10F, the capture aperture value F2 is a value at the opening side from the opening side limit value F2.8, so, first, the aperture value of the optical system is set to the capture aperture value F2 (step S703). Further, in the example which is shown in FIG. 10F, at step S706, it is judged that the capture aperture value is a value at the opening side from the opening side limit value (step S706=Yes) and, before the shutter release button is half pressed, exposure control for focus detection is performed by the capture aperture value F2 (step S708). Further, after the shutter release button is half pressed, exposure control for focus detection is not performed. The focus lens 32 is driven based on the amount of defocus which is calculated before the shutter release button is half pressed (step S715). After adjusting the focus by the focus lens 32, the aperture value of the optical system is left as the capture aperture value F2 (step S717) and a still image is captured by the capture aperture value F2 (step S718). Note that, in the example which is shown in FIGS. 10E and 10G as well, a similar routine is performed as in the example which is shown in FIG. 10F.

As explained above, in the seventh embodiment, before the shutter release button is half pressed, the opening side limit value and the closing side limit value are used as the basis to set the aperture value of the optical system to an aperture value suitable for focus detection, and the set aperture value of the optical system is used for exposure control for focus detection. Due to this, in the seventh embodiment, in the interval after the shutter release button is half pressed to when the focus lens 32 starts to be driven, the time which is required for exposure control for focus detection (for example, including the time for driving the aperture 34 in accordance with the aperture value suitable for focus detection and the time after completion of the drive of the aperture 34 to stabilization of exposure) can be eliminated. The time from when the shutter release button is half pressed to when the focus lens 32 is driven can be shortened.

For example, when the capture aperture value is a value at the closing side from the closing side limit value, as the mentioned aperture value suitable for focus detection, camera controller 21 can set a aperture value of the optical system at a value near the closing limit value within the range between the closing side limit value and the opening side limit value as the mentioned aperture value suitable for focus detection. In this case, since the value at near closing limit value is near the capture aperture value, it is possible to give precise auto-focus control in a situation similar to the time of capturing a image.

Further, as the mentioned aperture value suitable for focus detection, camera controller 21 can set a aperture value of the optical system at a value near the opening limit value within the range between the closing side limit value and the opening side limit value. In this case, it is possible to give precise auto-focus control in a bright situation.

Further, as the mentioned aperture value suitable for focus detection, camera controller 21 can set a aperture value of the optical system at a predetermined value within the range between the closing side limit value and the opening side limit value the predetermined value can be stored in memory 29 or memory 39. In this case, when the predetermined value stored in the memory 29,39 is a value suitable for general capturing images, it is possible to give precise auto-focus control suitable for general capturing images.

Furthermore, camera controller 21 can change aperture value for focus detection corresponding to the state of the capturing a image such as the result of scene recognition, the capture mode (scenery capture mode, sport capture mode, portrait capture mode, etc.), and the brightness of object. So that, it is possible to give precise auto-focus control suitable for the state of the capturing image.

Further, in the seventh embodiment, when the reliability of the amount of defocus is low even after the shutter release button is half pressed, the aperture value of the optical system can be changed within the range between the closing side limit value and the opening side limit value suitable for focus detection so as to suitably calculate the amount of defocus and as a result the focus detection by the phase difference detection system can be suitably performed. Furthermore, in the seventh embodiment, when it is necessary to emit illumination light for focus detection, it is possible to set the aperture value of the optical system at the opening side limit value so as to set the aperture value of the optical system to an aperture value which is better suited to focus detection. In addition, in the present embodiment, when capturing a moving image, it is possible to fix the aperture value of the optical system at the capture aperture value so as to capture a moving image with a good appearance.

Note that, the embodiments which were explained above were described for facilitating understanding of the present invention and were not described for limiting the present invention. Therefore, the elements which were disclosed in the above embodiments include all design changes and equivalents which fall under the technical scope of the present invention.

For example, in the above-mentioned embodiments, the shutter release button which was provided at the operating unit 28 was half pressed so as to start the adjustment of focus by the focus lens 32, but the invention is not limited to this configuration. For example, it is also possible to connect a PC to the camera 1 and have the camera 1 receive a signal from the PC so as to start up the adjustment of focus by the focus lens 32 or to have the camera 1 receive a signal from a remote controller corresponding to the camera 1 so as to start up the adjustment of focus by the focus lens 32. In this case, for example, at step S110 of the first embodiment, it is also possible to judge if a signal for starting up the adjustment of focus by the focus lens 32 has been received from the PC or remote controller.

Further, in the above-mentioned third embodiment, the configuration is illustrated where when changing the aperture value of the optical system from the aperture value at the time of focus detection to the capture aperture value when capturing the image, the variable amount of the aperture value is set so that the amount of movement of the image plane accompanying a change of the aperture value becomes a predetermined amount enabling good capture of an image or less, but in addition to this configuration, it is also possible to limit the aperture value of the closing side at the variable amount of the aperture value so as to effectively prevent occurrence of vignetting.

Furthermore, in the above-mentioned fifth embodiment, the configuration is illustrated where when acquiring the opening side limit value from the lens barrel 3, as shown in FIG. 20A, the aperture value of the optical system is set at the opening side limit value for focus detection, and the aperture 34 is closed so that the aperture value of the optical system becomes the capture aperture value during the drive operation of the focus lens 32 based on the results of focus detection, but, for example, a configuration is also possible where even when acquiring the opening side limit value from the lens barrel 3, the aperture value of the optical system is set at the open aperture value for focus detection, and the aperture 34 is closed so that the aperture value of the optical system becomes the same value as the opening side limit value or a value at the closing side from the opening side limit value during the drive operation of the focus lens 32 based on the results of focus detection. For example, as shown in FIG. 20C, even when the opening side limit value could be acquired as F2.8, the aperture value of the optical system is set to the open aperture value F1.2 for focus detection. Further, the aperture 34 is closed for focus detection so that the aperture value of the optical system becomes the same value as opening side limit value F2.8 or a value at the closing side from the opening side limit value F2.8 during the drive operation of the focus lens 32 based on the results of this focus detection. For example, in FIG. 20C, the aperture value of the optical system is set at a value at the closing side from the opening side limit value, that is, F3.5, for focus detection during drive operation of the focus lens 32. Further, when capturing an image, the aperture value of the optical system is set at capture aperture value F4 for capturing an image. Due to this, it is possible to make the amount of movement of the image plane at the time of shifting from focus detection to image capture a predetermined amount or less and possible to capture an image focused on the object.

Further, in the above-mentioned fifth embodiment, the configuration was illustrated where when the opening side limit value could be acquired from the lens barrel 3, the aperture value of the optical system is set at the opening side limit value for focus detection, but a configuration is also possible where, in addition to this configuration, when the focus state of the optical system could not be detected in the state where the aperture value of the optical system is made the opening side limit value, the aperture value of the optical system is changed to the open aperture value for focus detection. Due to this, even when the brightness of the object is low etc., the focus state of the optical system can be more suitably detected.

In addition, in the above-mentioned fifth embodiment, the configuration is illustrated where the limit value of the opening side of the aperture value of the optical system at the time of focus detection is acquired as the opening side limit value, but in addition to this, for example, the limit value of the closing side of the aperture value of the optical system at the time of focus detection is stored in advance as the closing side limit value in the memory which is provided at the camera controller 21 and this closing side limit value is used as the basis for focus detection. Note that, the closing side limit value can effectively prevent occurrence of vignetting at the time of focus detection, for example, and can be made the value at the most closing side among the aperture values able to give good precision of focus detection. For example, as shown in FIG. 20D, in a situation where the closing side limit value is stored as F5.6 and the capture aperture value is set at F8, the capture aperture value F8 is a value at the closing side from the closing side limit value, that is, F5.6. In such a case, it is possible to limit the aperture value of the optical system during the drive operation of the focus lens 32 to the closing side limit value F5.6 for focus detection so as to effectively prevent the occurrence of vignetting at the time of focus detection and possible to suitably detect the focus state of the optical system. Note that, in this case, after focus detection, the aperture value of the optical system is set at the capture aperture value F8 and the image is captured at the set capture aperture value.

Further, in the above-mentioned fifth embodiment, the configuration is illustrated where when setting the aperture value of the optical system at the opening side limit value or open aperture value for focus detection and using the results of this focus detection as the basis to start the drive operation of the focus lens 32, the aperture value of the optical system is immediately set at the capture aperture value, but, for example, a configuration is also possible where the aperture 34 is gradually closed so as to gradually change the aperture value of the optical system from the opening side limit value or open aperture value to the capture aperture value during the drive operation of the focus lens 32. Further, when storing the closing side limit value and the capture aperture value is a value at the closing side from the closing side limit value, a configuration is also possible where the aperture 34 is gradually closed so as to gradually change the aperture value of the optical system from the opening side limit value or open aperture value to the closing side limit value during the drive operation of the focus lens 32.

In addition, in the above-mentioned fifth embodiment, a configuration is possible where the camera controller 21 uses the brightness of the object as the basis to operate the above-mentioned camera 1 only when it is judged necessary to emit illumination light by the light 210.

Further, in the above-mentioned seventh embodiment, the configuration is illustrated where the amount of defocus is calculated before the shutter release button which was provided at the operating unit 28 is half pressed and where when the photographer half presses the shutter release button, the amount of defocus which was calculated before the shutter release button is half pressed is used as the basis to drive the focus lens 32, but the invention is not limited to this configuration. For example, a configuration is also possible where when, regardless of whether the shutter release button is half pressed or not, the capture mode which drive the focus lens 32 based on the calculated amount of defocus is selected, the calculated amount of defocus is used as the basis to drive the focus lens 32 from before the shutter release button is half pressed.

Further, in the above-mentioned embodiments, the configuration was illustrated of storing in advance the opening side limit value in the memory of the lens controller 37, but the invention is not limited to this configuration. For example, a configuration is also possible where, when the lens controller 37 does not store the opening side limit value or when the opening side limit value cannot be acquired from the lens controller 37, the opening side limit value may be determined by the camera controller 21.

Furthermore, in the above-mentioned seventh embodiment, it is preferable to configure the system so as to set the aperture value of the optical system at an aperture value suitable for focus detection from before the shutter release button is half pressed even when the focus detection area is outside of the region on the picture at which focus detection is possible by the phase difference detection system when setting the aperture value of the optical system at step S703. Due to this, for example, when the focus detection area returns to the region on the picture at which focus detection is possible by the phase difference detection system from outside the region and right after that the shutter release button is half pressed, it is possible to quickly focus on the object.

In addition, in the above-mentioned seventh embodiment, the configuration is illustrated of setting the aperture value of the optical system to the aperture value for focus detection and performing exposure control for focus detection before the shutter release button is half pressed, but, for example, when connecting a PC to the camera 1 and having the camera 1 receive a signal from the PC so as to start the adjustment of focus by the focus lens 32 or when having the camera 1 receive a signal from a remote controller corresponding to the camera 1 so as to start the adjustment of focus by the focus lens 32, it is possible to set the aperture value of the optical system at the aperture value for focus detection and perform exposure control for focus detection from before receiving a signal for starting focus adjustment by the focus lens 32 from the PC or remote controller.

Further, in the above-mentioned embodiment, a configuration is illustrated where the light 210 is provided at the camera body 2, but the invention is not limited to this configuration. For example, a configuration is also possible where a strobe device which can be connected to the camera body 2 is provided and the illumination light for focus detection is emitted from the strobe device.

Further, in the above-mentioned embodiment, the electromagnetic aperture which is electrically controlled by camera body 2 is provided. For example, a configuration is also possible where an aperture which is mechanically controlled by camera body 2 using machine paths such as a lever component is provided.

Note that, the camera 1 of the above-mentioned embodiment is not particularly limited. For example, the present invention may be applied to a digital video camera, single lens reflex digital camera, digital camera with a built-in lens, camera for a mobile phone, or other optical device.

REFERENCE NOTATION LIST 1, 1a, 1b . . . digital camera
2 . . . camera body
21 . . . camera controller
22 . . . image pickup device
221 . . . capture pixel
222a, 222b . . . focus detection pixel
28 . . . operating unit
210 . . . light
3 . . . lens barrel
32 . . . focus lens
36 . . . focus lens drive motor
37 . . . lens controller
5, 5a . . . lens adapter
51 . . . adapter controller
52 . . . memory

What is claimed is:

1. An exchangeable lens which can be directly or indirectly detachably attached to a camera, the lens comprising:
an optical system including an aperture; and
a driver which drives the aperture so that an aperture value of the aperture for detecting a focal position of the optical system becomes a first aperture value or less when the aperture value for capturing an image is larger than the first aperture value, and the aperture value of the aperture for detecting the focal position of the optical system becomes a value equal to or smaller than the aperture value for capturing the image when the aperture value for capturing the image is the first aperture value or less.

2. The exchangeable lens as set forth in claim 1, wherein the driver drives the aperture so that the aperture value for detecting the focal position of the optical system becomes the first aperture value when the aperture value for capturing an image is larger than the first aperture value.

3. The exchangeable lens as set forth in claim 1, wherein the driver drives the aperture so that the aperture value of the aperture for detecting the focal position of the optical system becomes a minimum aperture value when the camera captures a dark object.

4. The exchangeable lens as set forth in claim 1, wherein the driver drives the apertures so that the aperture value of the aperture for detecting the focal position of the optical system becomes the aperture value of the aperture for capturing a moving image when the camera captures the moving image.

5. The exchangeable lens as set forth in claim 4, wherein the driver drives the apertures so that the aperture value of the aperture for detecting the focal position of the optical system becomes the first aperture value or less when the camera captures a still image capture and the aperture value of the aperture for capturing the still image capture is larger than the first aperture value and so that the aperture value of the aperture for detecting the focal position of the optical system becomes a value equal to or smaller than the aperture value of the aperture for capturing the still image capture when the aperture value of the aperture for capturing the still image capture is the first aperture value or less.

6. The exchangeable lens as set forth in claim 1, further comprising a memory which stores information of the first aperture value.

7. The exchangeable lens as set forth in claim 1, further comprising a transmitter which sends information of a minimum aperture value of the aperture to the camera.

8. A mount adapter which can be detachably attached to a camera and/or an exchangeable lens which has an optical system including an aperture, the mount adapter comprising:
a driver which drives the aperture so that an aperture value of the aperture for detecting a focal position of the optical system becomes a first aperture value or less when the aperture value for capturing an image is larger than the first aperture value, and the aperture value of the aperture for detecting the focal position of the optical system becomes a value equal to or smaller than the aperture value for capturing the image when the aperture value for capturing the image is the first aperture value or less.

9. The mount adapter as set forth in claim 8, wherein the driver drives the aperture so that the aperture value for detecting the focal position of the optical system becomes the first aperture value when the aperture value for capturing an image is larger than the first aperture value.

10. The mount adapter as set forth in claim 8, the driver drives the aperture so that the aperture value of the aperture for detecting the focal position of the optical system becomes a minimum aperture value when the camera captures a dark object.

11. The mount adapter as set forth in claim 8, wherein the driver drives the apertures so that the aperture value of the aperture for detecting the focal position of the optical system becomes the aperture value of the aperture for capturing a moving image when the camera captures the moving image.

12. The mount adapter as set forth in claim 11, wherein the driver drives the apertures so that the aperture value of the aperture for detecting the focal position of the optical system becomes the first aperture value or less when the camera captures a still image capture and the aperture value of the aperture for capturing the still image capture is larger than the first aperture value and so that the aperture value of the aperture for detecting the focal position of the optical system becomes a value equal to or smaller than the aperture value of the aperture for capturing the still image capture when the aperture value of the aperture for capturing the still image capture is the first aperture value or less.

13. The mount adapter as set forth in claim 8, further comprising a memory which stores information of the first aperture value.

14. The mount adapter as set forth in claim 8, further comprising:
   a receiver which receives information of a minimum aperture value of the aperture from a exchangeable lens and;
   a transmitter which sends the information of the minimum aperture value of the aperture to the camera.

15. A camera comprising:
   an imaging sensor which captures an image by an optical system including an aperture and outputs a signal;
   a detector which detects a focal position where an image by the optical system is focused in the imaging sensor based on the signal; and
   a controller which sets an aperture value of the aperture for detecting the focal position by the detector to a first aperture value or less when the aperture value for capturing an image by the imaging sensor is larger than the first aperture value, and the aperture value of the aperture for detecting the focal position by the detector to a value equal to or smaller than the aperture value for capturing the image by the imaging sensor when the aperture value for capturing the image by the imaging sensor is the first aperture value or less.

16. The camera as set forth in claim 15, wherein
   the controller sets the aperture value for detecting the focal position by the detector to the first aperture value when the aperture value for capturing an image by the imaging sensor is larger than the first aperture value.

17. The camera as set forth in claim 15, wherein
   the controller sets the aperture value of the aperture for detecting the focal position by the detector to a minimum aperture value when the signal output from the imaging sensor is smaller than a predetermined value.

18. The camera as set forth in claim 15, wherein
   the controller controls the aperture value of the aperture for detecting the focal position by the detector on the basis of the signal output from the imaging sensor when the signal output from the imaging sensor is smaller than a predetermined value.

19. The camera as set forth in claim 15, comprising the selecting unit which is configured to be able to select a moving image capture or a still image capture by the imaging sensor, wherein
   the controller which sets the aperture value of the aperture for detecting the focal position of the optical system to the aperture value of the aperture for capturing a moving image by the imaging sensor when the selecting unit selects the moving image capture.

20. The camera as set forth in claim 19, wherein
   the controller sets the aperture value of the aperture for detecting the focal position of the optical system to the first aperture value or less when the selecting units selects the still image capture and the aperture value of the aperture for capturing the still image capture is larger than the first aperture value and sets the aperture value of the aperture for detecting the focal position of the optical system to a value equal to or smaller than the aperture value of the aperture for capturing the still image capture when the aperture value of the aperture for capturing the still image capture is the first aperture value or less.

21. The camera as set forth in claim 15, further comprising a memory which stores information of the first aperture value.

22. The camera as set forth in claim 15, further comprising:
   a detaching unit configured to be able to detach an exchangeable lens or a mount adapter to be coupled to the camera, the camera including the aperture, the mount adapter including a driver which drives the aperture; and
   a transmitter which sends information of a minimum aperture value of the aperture to the camera.

23. An exchangeable lens which can be directly or indirectly detachably attached to a camera or an accessory through the camera, the lens comprising:
   an optical system including an aperture; and
   a driver which drives the aperture so that an aperture value of the aperture for detecting a focal position of the optical system becomes in a range of a second aperture value or more and the first aperture value or less when the aperture value for capturing an image is larger than the first aperture value, the second aperture value being larger than a minimum aperture value and smaller than the first aperture value.

24. The exchangeable lens as set forth in claim 23, wherein
   the driver drives the aperture so that the aperture value for detecting the focal position of the optical system becomes the first aperture value when the aperture value for capturing the image is larger than the first aperture value.

25. The exchangeable lens as set forth in claim 23, wherein
   the driver drives the aperture so that the aperture value for detecting the focal position of the optical system becomes in a range of the second aperture value or more and the first value or less when the aperture value for capturing the image is in the range of the second aperture value or more and the first value or less.

26. The exchangeable lens as set forth in claim 23, wherein
   the driver drives the aperture so that the aperture value for detecting the focal position of the optical system becomes a third aperture value when the aperture value for capturing the image is the third aperture value, and the third aperture value is smaller than or equal to the first aperture value and is larger than or equal to the second aperture value.

27. The exchangeable lens as set forth in claim 23, wherein
   the driver drives the aperture so that the aperture value for detecting the focal position of the optical system is less than the second aperture value when the aperture value for capturing the image is smaller than the second aperture value.

28. The exchangeable lens as set forth in claim 23, wherein
   the driver drives the aperture so that the aperture value for detecting the focal position of the optical system becomes a third aperture value when the aperture value for capturing the image is the third aperture value which is smaller than the second aperture value.

29. A camera comprising:
an imaging sensor which captures an image by an optical system which includes an aperture and outputs a signal;
a detector which detects a focused position where an image by the optical system is focused in the imaging sensor based on the signal; and
a controller which sets an aperture value of the aperture for detecting the focal position by the detector in a range of a second aperture value or more and the first aperture value or less when the aperture value for capturing an image by the imaging sensor is larger than the first aperture value, the second aperture value being larger than a minimum aperture value and smaller than the first aperture value.

30. The camera as set forth in claim 29, wherein
the controller sets the aperture value for detecting the focal position by the detector to the first aperture value when the aperture value for capturing an image by the imaging sensor is larger than the first aperture value.

31. The camera as set forth in claim 29, wherein
the controller sets the aperture value for detecting the focal position by the detector in a range of the second aperture value or more and the first value or less when the aperture value for capturing the image by the imaging sensor is in the range of the second aperture value or more and the first value or less.

32. The camera as set forth in claim 29, wherein
the controller sets the aperture value for detecting the focal position by the detector to a third aperture value when the aperture value for capturing the image by the imaging sensor is the third aperture value, and the third aperture value is smaller than or equal to the first aperture value and is larger than or equal to the second aperture value.

33. The camera as set forth in claim 29, wherein
the controller sets the aperture value for detecting the focal position by the detector to a aperture value smaller than the second aperture value when the aperture value for capturing the image by the imaging sensor is smaller than the second aperture value.

34. The camera as set forth in claim 29, wherein
the controller sets the aperture value for detecting the focal position by the detector to a third aperture value when the aperture value for capturing the image by the imaging sensor is the third aperture value which is smaller than the second aperture value.

\* \* \* \* \*